United States Patent [19]

Reynolds et al.

[11] Patent Number: 4,885,785

[45] Date of Patent: Dec. 5, 1989

[54] CUTOFF CONTROL SYSTEM

[75] Inventors: Bruce A. Reynolds, Sussex; Alexander Brengauz, Whitefish Bay, both of Wis.

[73] Assignee: Quad/Tech, Inc., Pewaukee, Wis.

[21] Appl. No.: 115,939

[22] Filed: Oct. 30, 1987

Related U.S. Application Data

[63] Continuation-in-part of Ser. No. 925,329, Oct. 31, 1986.

[51] Int. Cl.[4] .................... G06K 9/00

[52] U.S. Cl. .................... 382/8; 250/571; 382/34; 382/42

[58] Field of Search .................... 382/1, 8, 34, 50; 250/571, 559; 364/565, 569, 571; 400/611; 226/17, 24; 209/583

[56] References Cited

U.S. PATENT DOCUMENTS

| | | | |
|---|---|---|---|
| 2,576,529 | 11/1951 | McKenney | 226/31 |
| 3,872,434 | 3/1975 | DuVall | 382/50 |
| 3,915,090 | 10/1975 | Horst et al. | 101/426 |
| 3,922,539 | 11/1975 | Carnes | 235/183 |
| 4,243,925 | 1/1981 | Gnuechtel | 250/548 |
| 4,449,240 | 5/1984 | Yoshida | 382/50 |
| 4,512,256 | 4/1985 | Schriber | 101/181 |
| 4,532,596 | 7/1985 | Pugsley | 364/469 |
| 4,541,337 | 9/1985 | Schaul | 101/227 |
| 4,561,103 | 12/1985 | Horiguchi et al. | 382/34 |
| 4,677,680 | 6/1987 | Harima et al. | 382/34 |
| 4,685,139 | 8/1987 | Masuda et al. | 382/34 |
| 4,719,575 | 1/1988 | Gnuechtel | 364/469 |
| 4,736,446 | 4/1988 | Reynolds et al. | 382/8 |

FOREIGN PATENT DOCUMENTS

| | | |
|---|---|---|
| 0079153 | 5/1983 | European Pat. Off. . |
| 84104516 | 4/1984 | European Pat. Off. . |
| 1075199 | 2/1957 | Fed. Rep. of Germany . |
| 1292420 | 4/1969 | Fed. Rep. of Germany . |
| 2344819 | 1/1975 | Fed. Rep. of Germany . |
| 2643481A | 3/1978 | Fed. Rep. of Germany . |
| 1041804 | 6/1953 | France . |
| 58-205766 | 11/1983 | Japan . |

OTHER PUBLICATIONS

Descriptive brochure entitled, "Register Guidance System III, from Quad/Tech, Fully Automated Register Control", produced by Quad/Tech.

Descriptive brochure entitled, "Quad/Tech Register Guidance System III", produced by Quad/Tech.

A photocopy of a brochure entitled "Quad/Tech Cutoff Control"(4 sheets).

*Primary Examiner*—Leo H. Boudreau

*Assistant Examiner*—Joseph Mancuso

*Attorney, Agent, or Firm*—Foley & Lardner

[57] ABSTRACT

The invention provides a cutoff control system having a capture range equal to the length of the image (signature) which is highly tolerant of spurious transitions, such as lateral shifting and instantaneous interruptions of the web. A highly pipelined hardware correlation unit, cooperating with several high speed RAM devices having independent address generators, is used to cross-correlate new patterns with a reference pattern. An illustrated system for relating a cyclical machine operation to the position of images on a web includes position adjustment means (24,30,84) responsive to control signals for varying the effective position of the machine operation along the moving web, means (34,40,50) for generating image signatures indicative of the image at respective sampling intervals during the matching operation cycle for respective machine cycles, means (56,58,68,72) for selectively generating reference pattern indicia from a first image signature and for selectively generating comparative indicia from a successive image signature, means (71) for generating correlation cooeficients in accordance with the differences between the reference pattern and shifted versions of the comparative indicia, means (68,69,70) for processing the correlation coefficients to determine which of the comparative indicia produced the largest correlation coeficient and generating an indicating signal in response thereto, and means (80) for generating the control signals to the position adjustment means in accordance with the indicating signal.

33 Claims, 41 Drawing Sheets

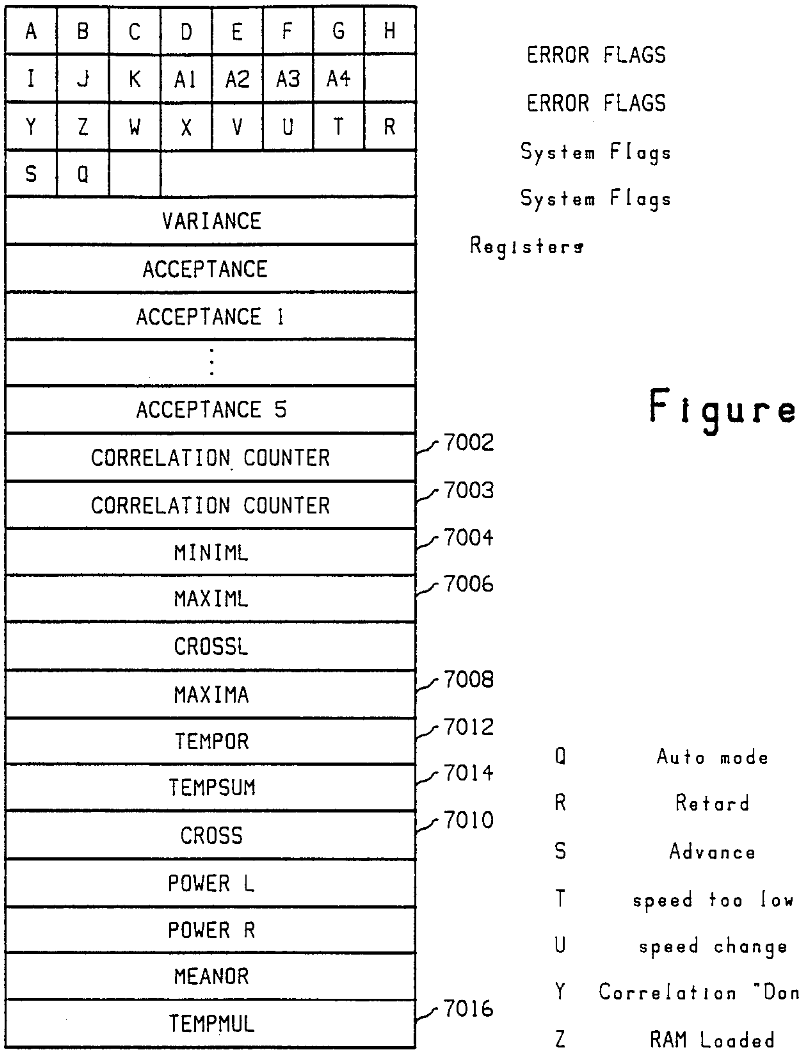

Figure 2A

| | | | |
|---|---|---|---|
| A | Memory error | Q | Auto mode |
| B | ROM error | R | Retard |
| C | EEPROM error | S | Advance |
| D | Gain error | T | speed too low |
| E | Correlation error | U | speed change |
| F | A/D converter error | Y | Correlation "Done" |
| G | ADC/DAC loop error | Z | RAM Loaded |
| H | Symmetry error (noise high) | K | position error |
| | | J | computation error |
| | | I | Pause |
| | | W | advance |
| | | X | retard |
| | | V | Locked |
| | | A1 | Mark not found |
| | | A2 | Black-on-white |
| | | A3 | Calibrate |
| | | A4 | Acceptance error |

(RAM 62)

(RAM 64)

CUTOFF CONTROL SYSTEM

CROSS REFERENCES TO RELATED APPLICATION

This is a continuation-in-part application of U.S. Patent application Ser. No. 925,329 filed by the present inventors on Oct. 31, 1986.

BACKGROUND OF THE INVENTION

The present invention relates generally to the field of web-fed printing presses and specifically to an improved system for precisely controlling the relative position of a cutoff device with respect to images or signatures on a moving web as the web moves through a web-fed printing press system.

In a web-fed printing press, a web of material, typically paper, is fed from a storage mechanism, such as a reel stand, to one or more printing units which imprint the web with images (signatures). The imprinted web is then typically driven through respective processing units such as a dryer unit and/or coating equipment. The web is then fed to a cutting apparatus for separating the respective repeating signatures on the web. The cutting apparatus typically comprises a pair of cooperating cutting cylinders bearing one or more cutting blades. The cutting cylinders are rotated in synchronism with the printing units so that the blades intersect the moving web at predetermined points, e.g., between the repeating signatures (images). It is necessary that the cutting blades intersect the moving web on a repetitive basis in precise coordinated relationship with the repetition of the imprinted signatures on the web. However, various conditions of the printing system, such as, for example, web tension, splices and influence from folders, slitters, imprinters, gluers and other processing equipment cause the position of the web, and thus the signatures, to vary over time with respect to the cutting apparatus. Accordingly, it is necessary to periodically adjust the positional relationship of the web and cutting mechanism by advancing or retarding the linear position of the web with respect to the cutting apparatus.

Accordingly, an adjustment mechanism is typically provided to vary the linear position of the web relative to the cutting mechanism, i.e., the effective length of the web path from the printing unit to the cutting mechanism. For example, the relative position of a compensation roller with respect to cooperating idler rollers is varied to change the effective length of the web path and thus advance or retard the relative position of the cutting mechanism to the respecting images on the web. A compensation motor is utilized to selectively adjust the position of the compensation roller. Similarly, rotary cutting dies may be employed, and adjustments effected by varying the position of the cutting blades on the cutting cylinder.

In general, closed loop systems for controlling the adjustment (compensation) mechanism, and thus the linear position of the web image pattern to the cutting mechanism, are known. In such systems, an encoder is coupled to the cutting mechanism to provide respective pulses representative of the cutting mechanism operation cycle: a first pulse indicative of a nominal beginning (top dead center) of each cutting cycle; and a second signal indicative of incremental advances in the cutting cycle (e.g., 1200 square waves per cutting cycle). The operator initializes the system by establishing a "window" of preset width corresponding to the portion of the cutting cycle during which the blade is intended to intersect the web. The window (capture range) is of a length equal to a first predetermined number of incremental pulses, beginning a second predetermined number of incremental pulses after the top dead center pulse (nominal beginning of the cycle).

An optical scanner is disposed over the moving web, with a bar of light projecting on the portion of the web instantaneously underlying the scanner. Images on the web reflect varying amounts of light in accordance with the density (darkness) of the image. The scanner receives the reflected light and generates an output signal indicative of the image density. The density signal is then compared to a reference signal representative of a predetermined threshold density. If a transition from low density (light) to high density (dark) of sufficient magnitude is detected (i.e., the predetermined threshold is crossed) within the predetermined capture range window, the transition point (the number of incremental pulses after top dead center at which transition occurs) is compared to a count corresponding to the center of the window, and the compensation roller position advanced or retarded accordingly.

Such systems, however, are disadvantageous in that they require the operator to manually align the capture range window with a particular designated density transition (cutmark). In addition, such systems are incapable of discriminating between the designated cutmark and other density transitions on the web which exceed the threshold value. Accordingly, system disruptions can cause conditions whereby the system erroneously locks to a density transition other than the designated cutmark. In such an event, or in the event that the cutmark is not detected within the capture range window, the operator is required to manually override the system and position the compensation roller to realign the system with the designated cutmark. It is also necessary, in such systems, to maintain alignment between the scanner and the lateral position of the cutmark. Thus, such systems are particularly susceptible to loss of track due to lateral movement of the web, and, further, the position of the scanner must be manually changed in order to accommodate webs of differing widths.

Moreover, choice of a proper threshold level in such systems presents something of a dilemma. If the threshold is not set sufficiently high, the system tends to be susceptible to spurious triggering, e.g. locking on density transitions other than the intended cutmark, and thus, to erratic compensation or jitter. Conversely, if the density threshold is set too high, the images upon which the system is capable of operating become unduly limited. For example, a high density threshold tends to prevent the system from operating upon images that have not achieved full density. Further, in many instances, the images on the web do not provide a density transition which is of sufficient magnitude, sufficiently isolated from other transitions, sufficiently large, or sufficiently linear in disposition to operate as a cutmark. In such cases, the printing of an extraneous cutmark, separate and apart from the image, is required. The extraneous cutmark is typically disposed in the lateral margin of the web, or between successive images. In either case, the use of the extraneous cutmark requires a surrounded clear space on the web and tends to increase wastage.

U.S. Patent application Ser. No. 717,751 filed by the present inventors on Mar. 29, 1985 issuing on Apr, 5, 1988 as U.S. Pat. No. 4,736,446 describes a cutoff control system employing pattern recognition techniques to avoid the above-noted problems. For each incremental pulse generated by the encoder, the signal present at the output of the scanner is converted into a digital form. Over the course of a cutting cycle, a digital signature, representing the image on the web, is thus developed and stored. The first time a signature is processed by the system, the data corresponding to that signature is stored as a reference pattern against which subsequent (new) signatures are compared. Control signals to the adjustment mechanism are generated in accordance with positional deviations of the new patterns from the reference pattern.

Positional deviations of the new patterns from the reference pattern may be determined by cross-correlating the new pattern and reference pattern. However, digital image processing involves a tremendous amount of data. A microprocessor requires several seconds to effect cross-correlation computations, and necessary data interpretation tends to limit the response time of the system. To cope with the large amount of data, prior systems employ data reduction techniques to reduce the amount of data which is used in the correlation process. This may result in important image information being sacrificed in the data reduction process. Further, systems where data interpretation is minimized are susceptible to locking onto spurious images, and, if the signatures are not of sufficient contrast, failure to lock.

SUMMARY OF THE INVENTION The present invention provides a control system having a capture range equal to the length of the image (signature), yet which is highly tolerant of spurious transitions, such as lateral shifting and instantaneous interruptions of the web. A highly-pipelined hardware correlation unit, cooperating with several high speed RAM devices having independent address generators, is used to cross-correlate new patterns with a reference pattern.

BRIEF DESCRIPTION OF THE DRAWINGS A preferred exemplary embodiment of a cutoff control system in accordance with the present invention will hereinafter be described in conjunction with the appended drawings wherein like designations denote like elements, and:

FIGS. 2A and 2B are schematic illustrations of various flags, variables and arrays employed in the operation of a system in accordance with the present invention.

Figure 14A:
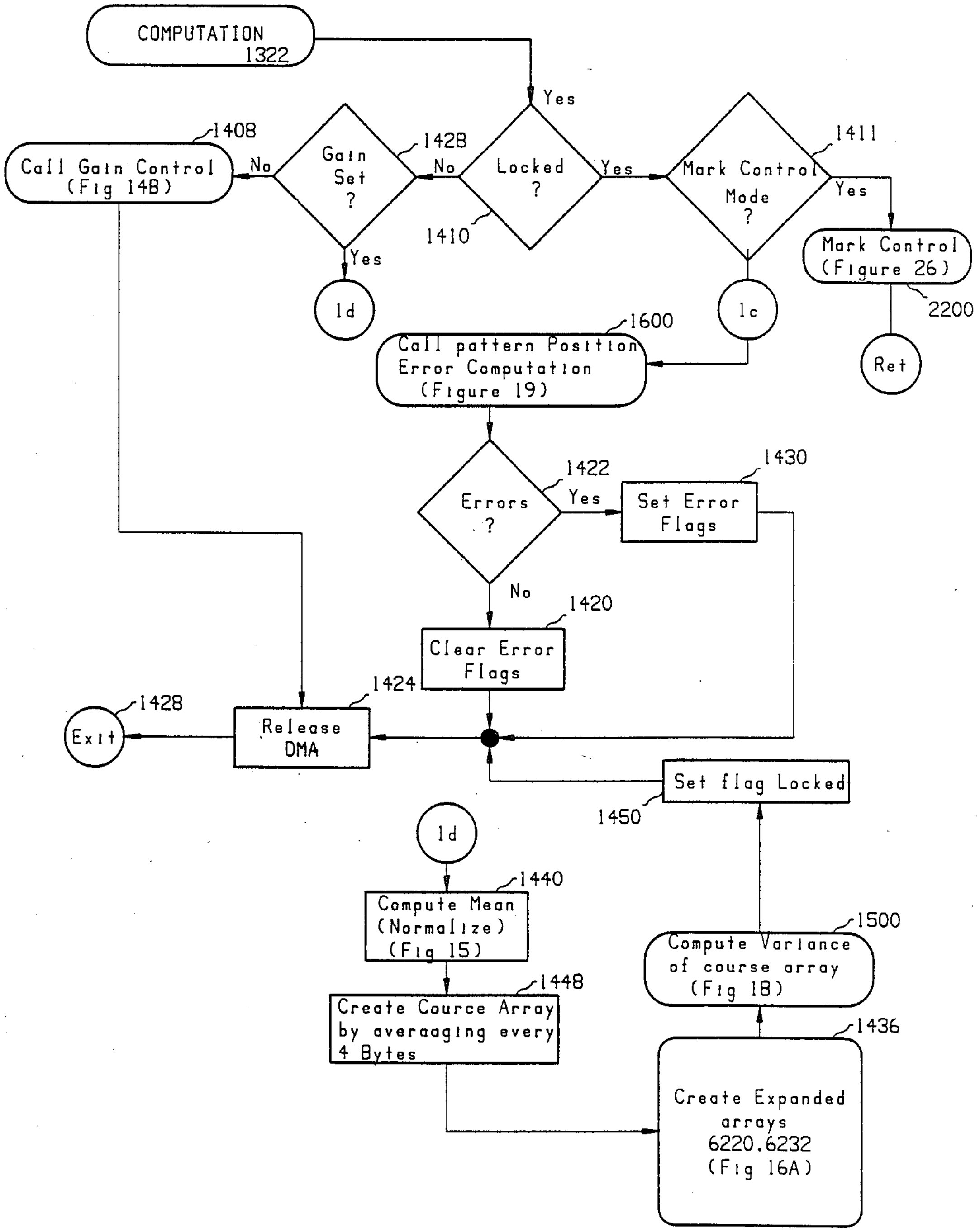
FIG. 14A is a flow diagram of an exemplary embodiment of the computation routine of FIG. 13.
Figure 17:
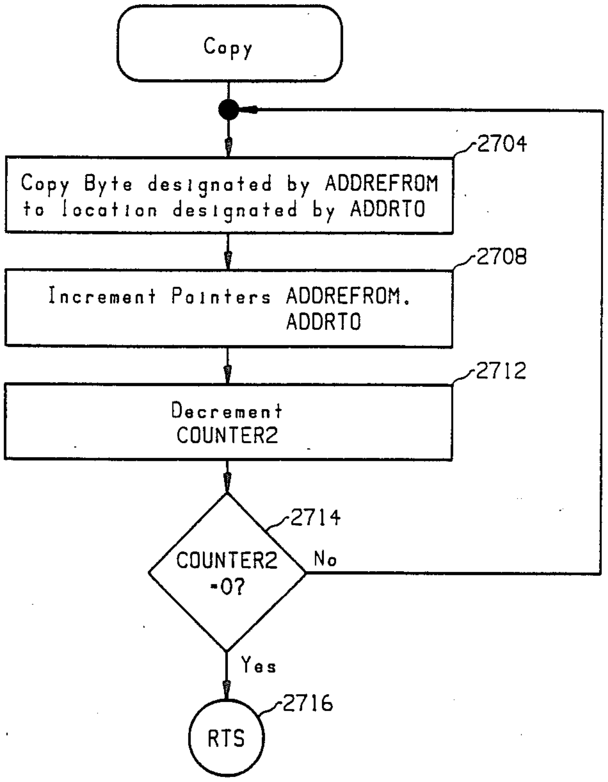
FIG. 17 is the copy subroutine called by the routine of FIGS. 16A and 16B.
Figure 19:
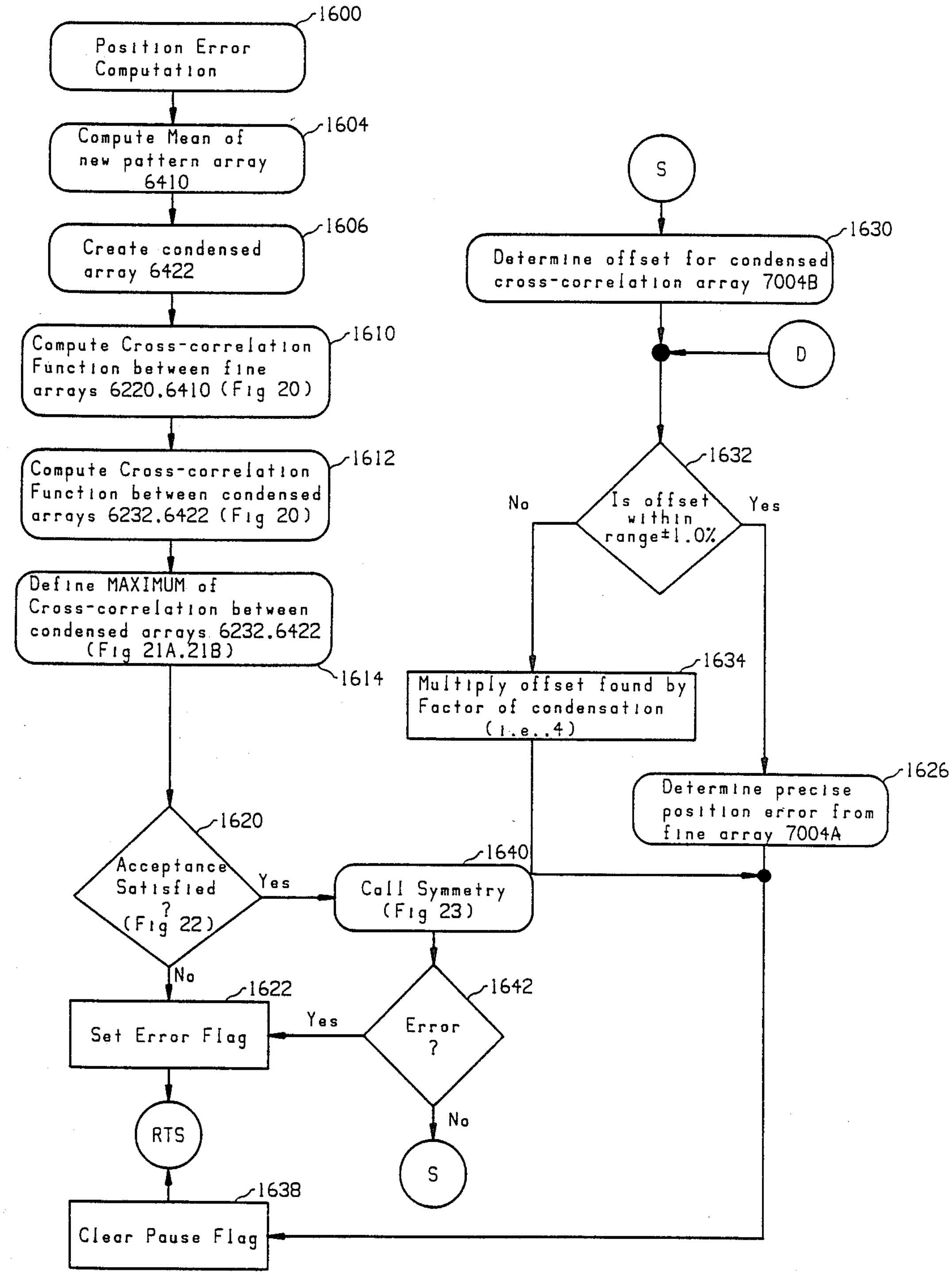
FIG. 19 is a flow diagram of an exemplary embodiment of the position error computation routine called by the computation routine of FIG. 14A.
Figure 25A:
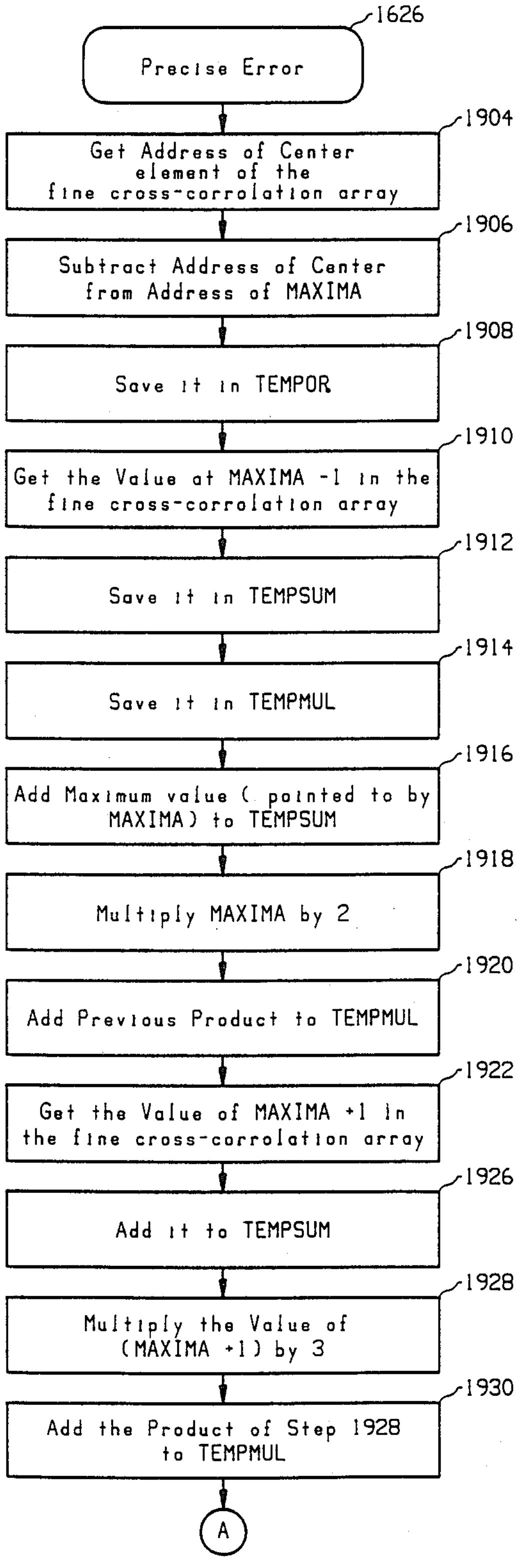
Figure 25B:
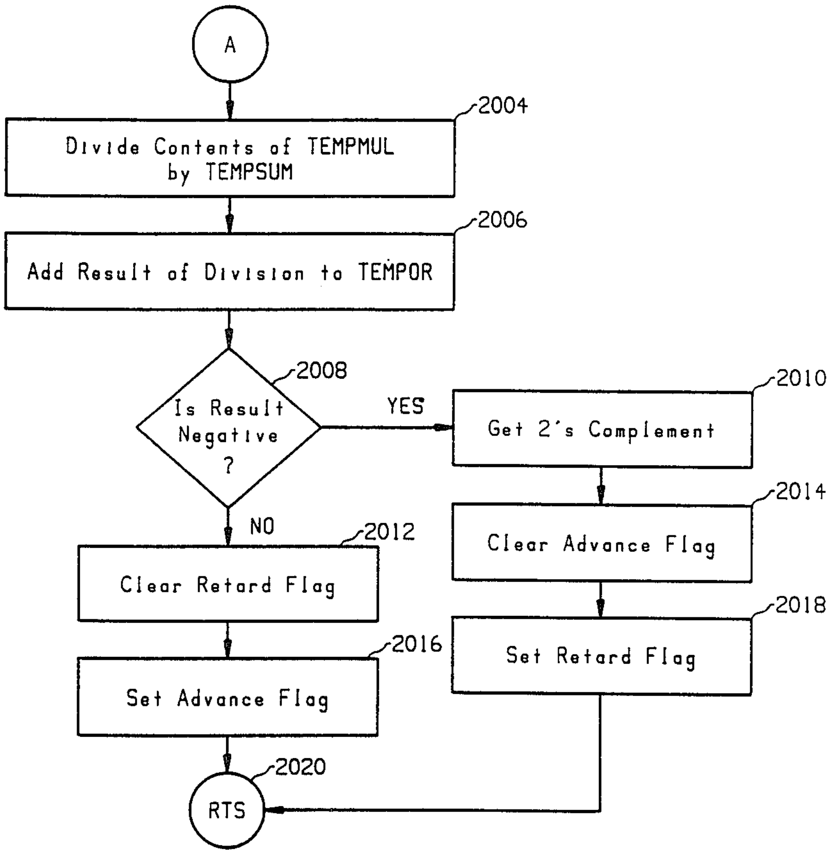
Figure 26:
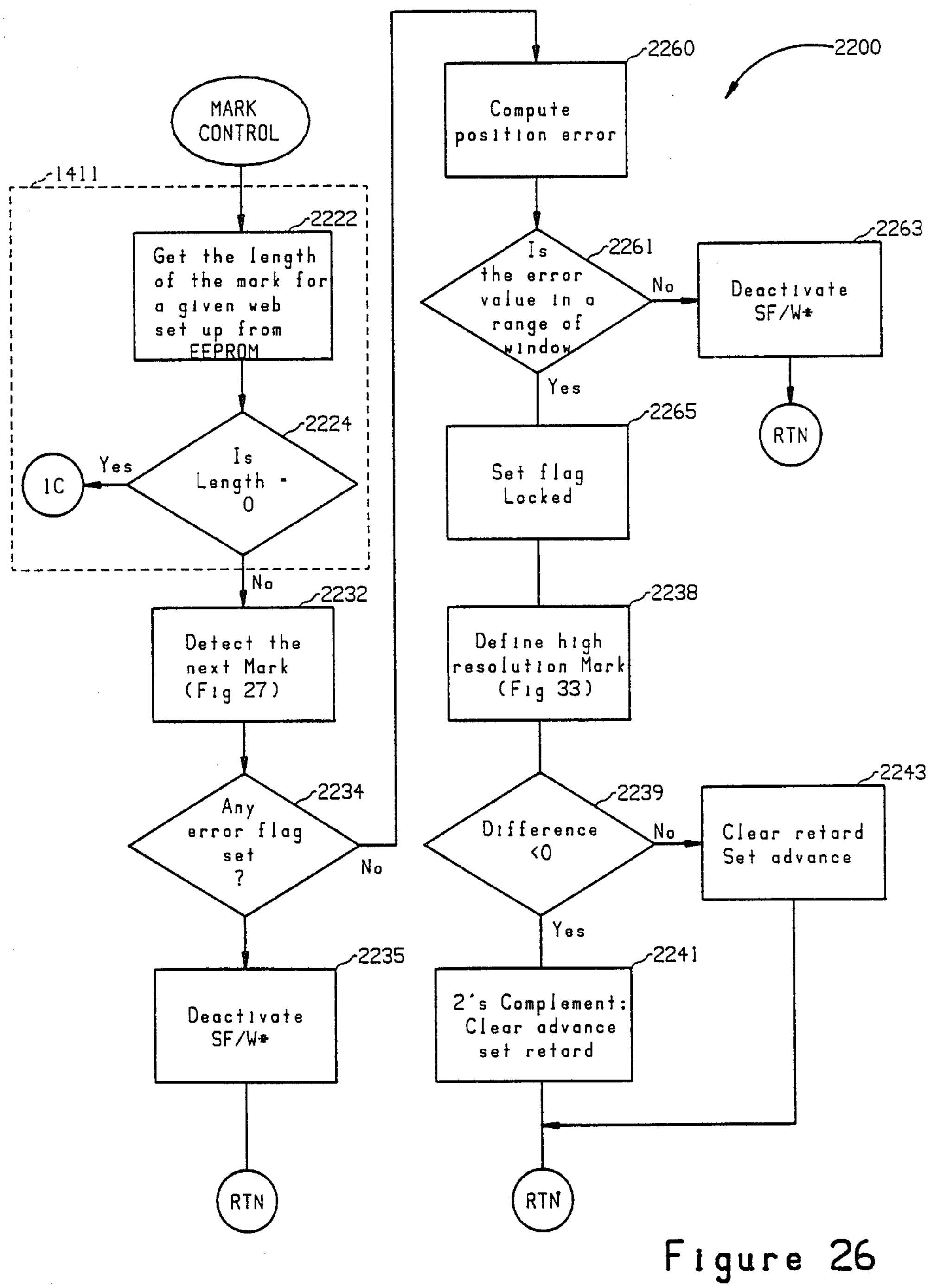
Figure 27:
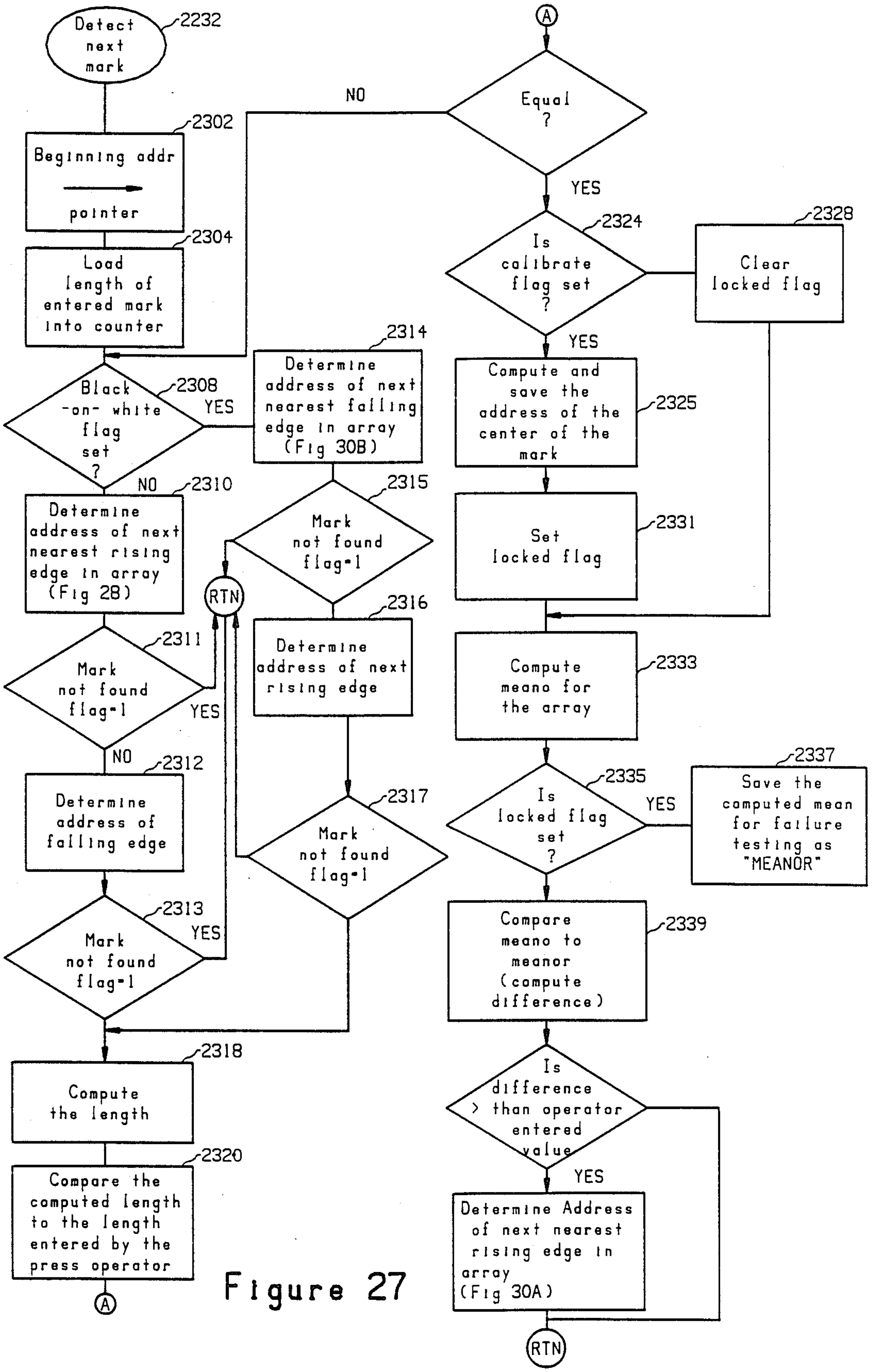
Figure 28:
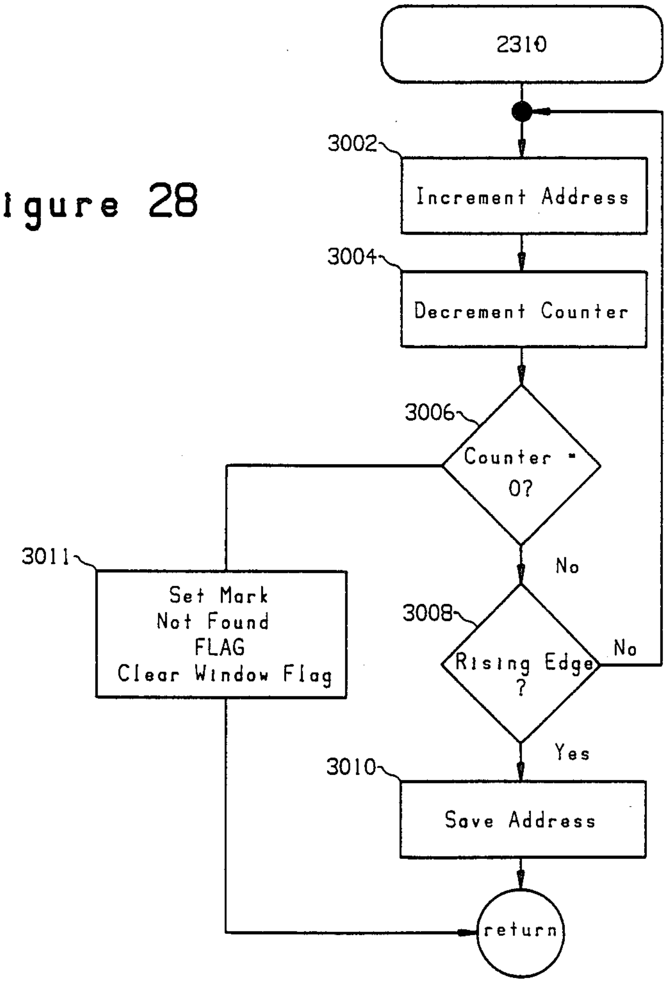
Figure 29:
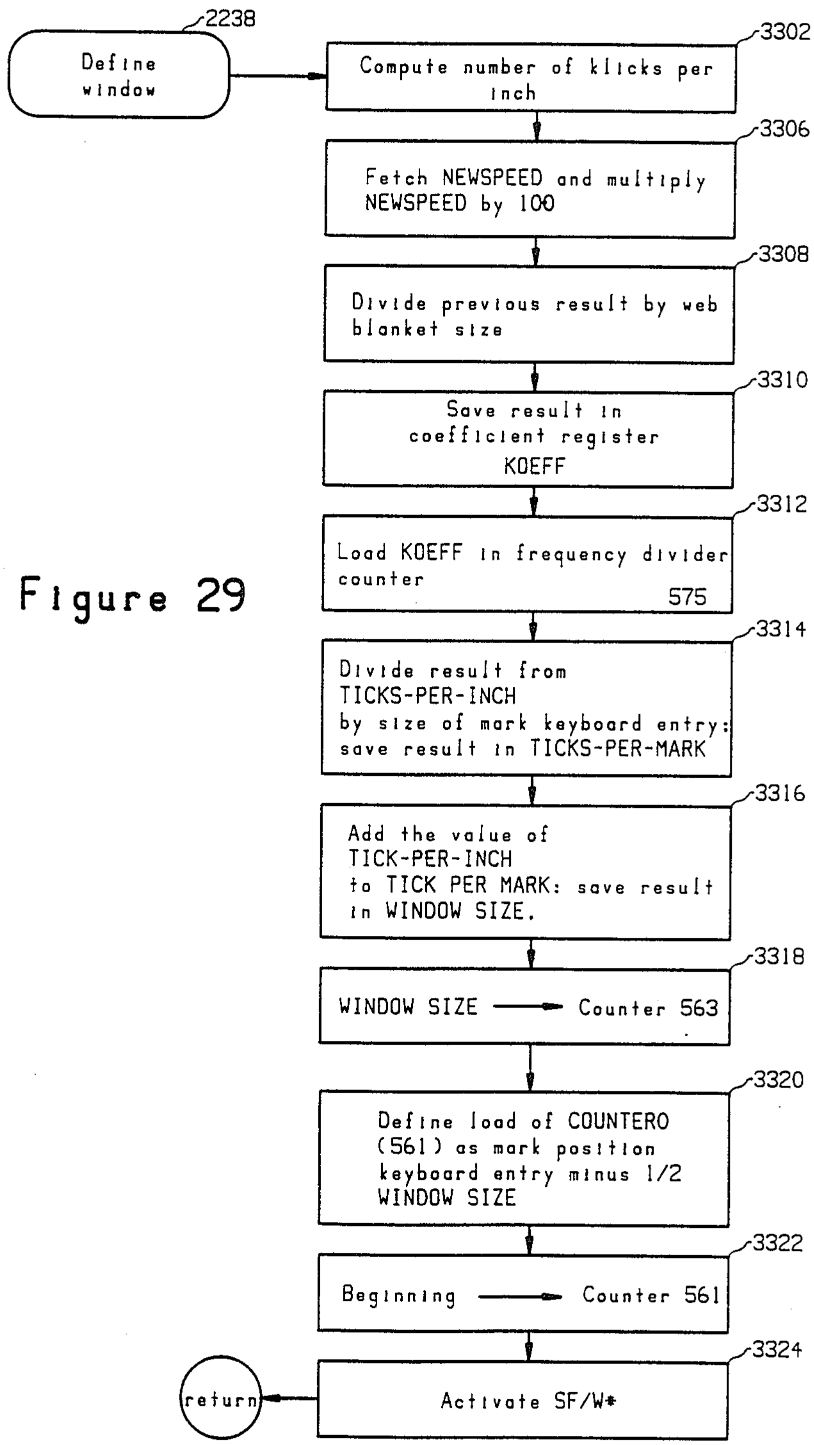
Figure 30A:
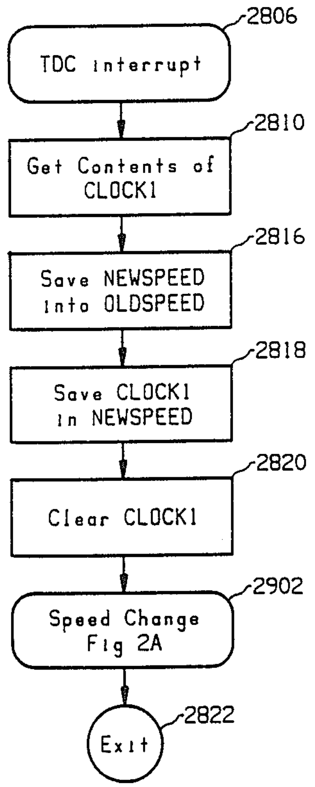
Figure 30B:
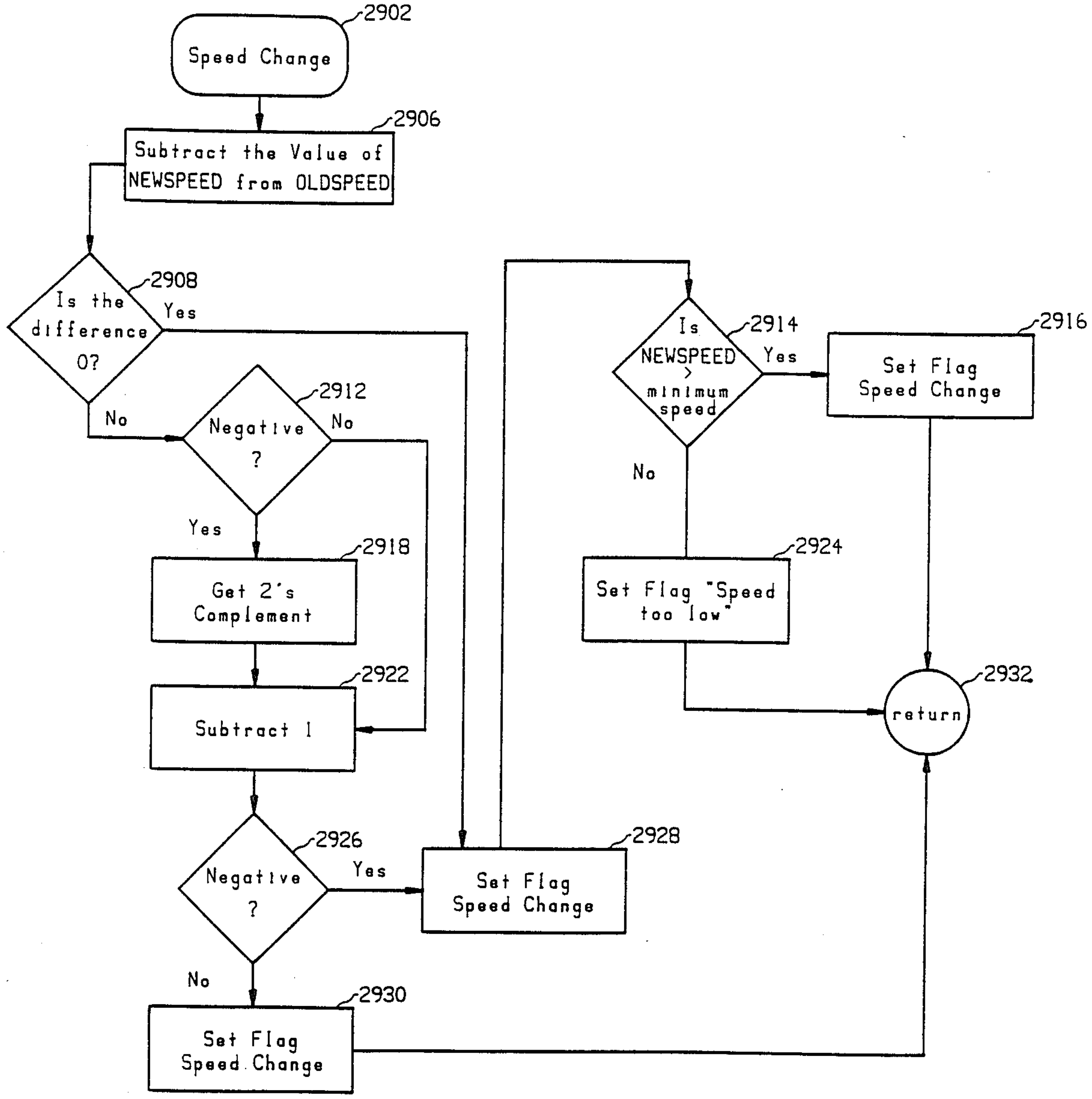

FIGS. 25A and 25B together are a flow diagram of the precise position error routine called by the position error computation routine of FIG. 19;

FIG. 26 is a flow diagram of the mark control routine called by the computation routine of FIG. 14A;

FIG. 27 is the mark detection subroutine called by the mark control routine of FIG. 26;

FIG. 28 is a flow diagram detailing the operation of the subroutine called by the routine of FIG. 17 to determine the address of the next rising edge in an array of data;

FIG. 29 is a flow diagram of a routine for defining a high-resolution window;

FIG. 30A is a flow diagram of a suitable TDC interrupt routine;

FIG. 30B is a flow diagram of a suitable speed change detection routine; and

Figure 13:
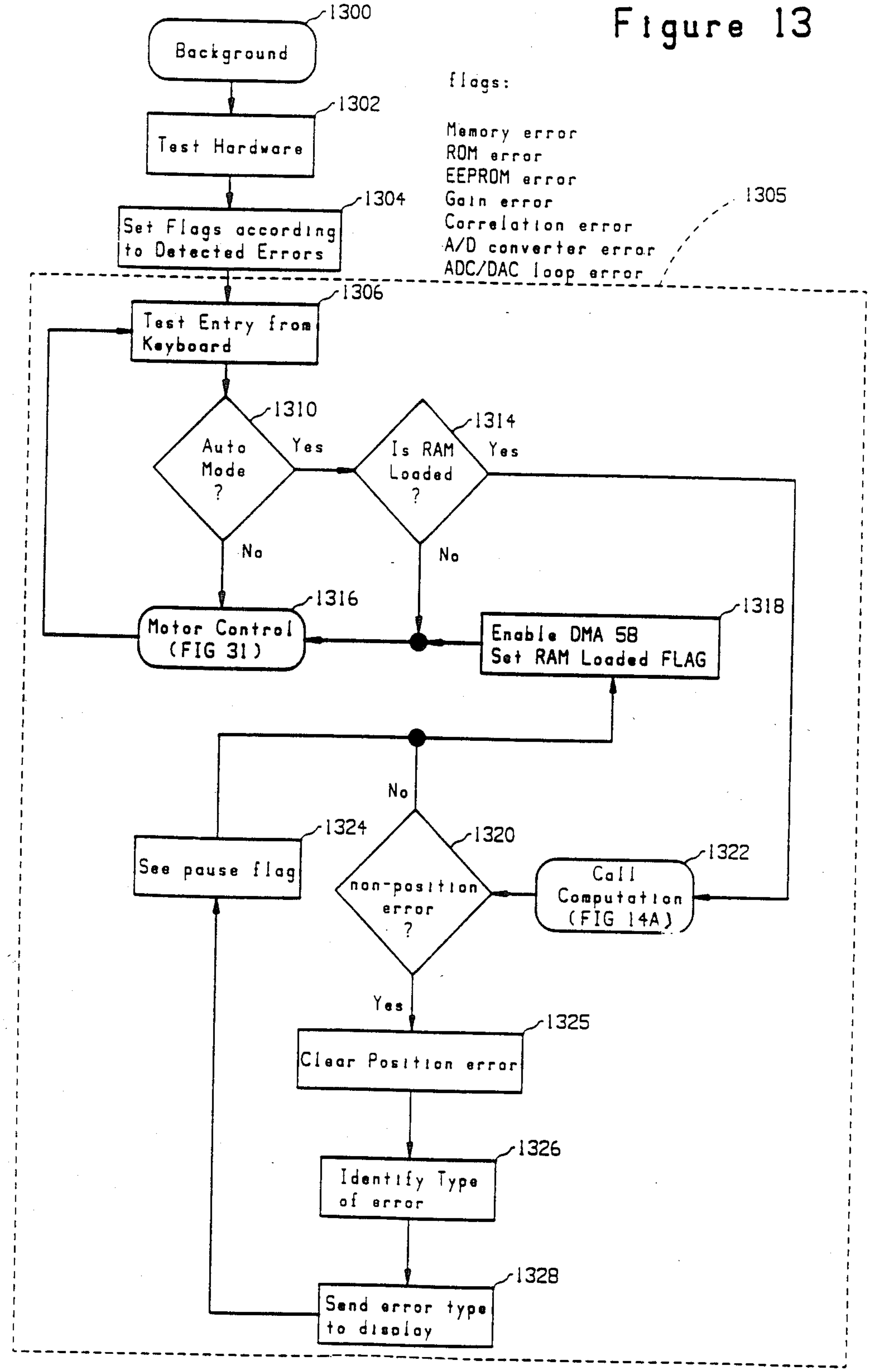
FIG. 13 is a flow diagram detailing the overall operation of the CPU of FIG. 1.
Figure 31:
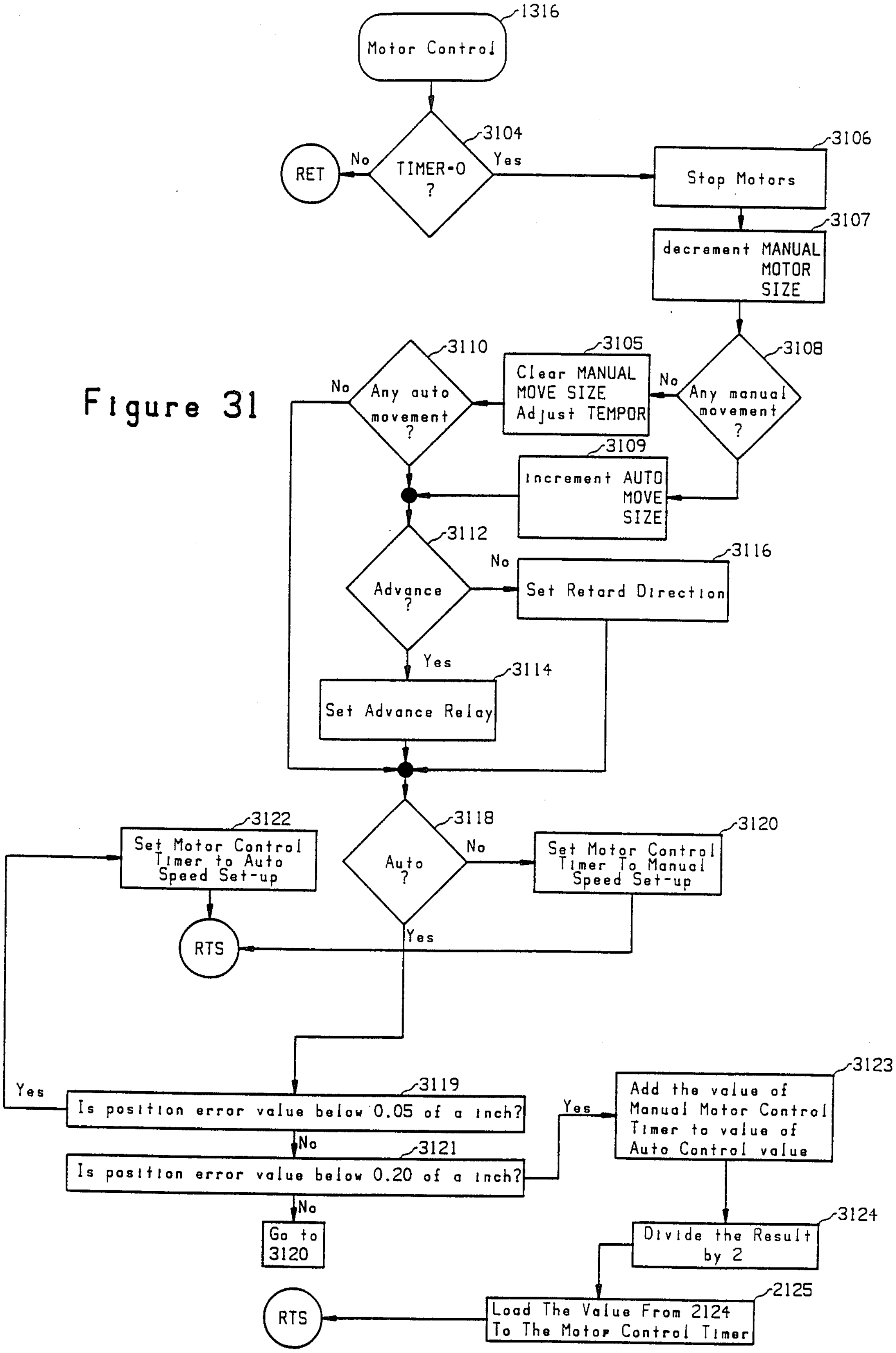

FIG. 31 is a flow diagram detailing the operation of the motor control subroutine called by the routine of FIG. 13.

DETAILED DESCRIPTION OF AN EXEMPLARY EMBODIMENT

Figure 1:
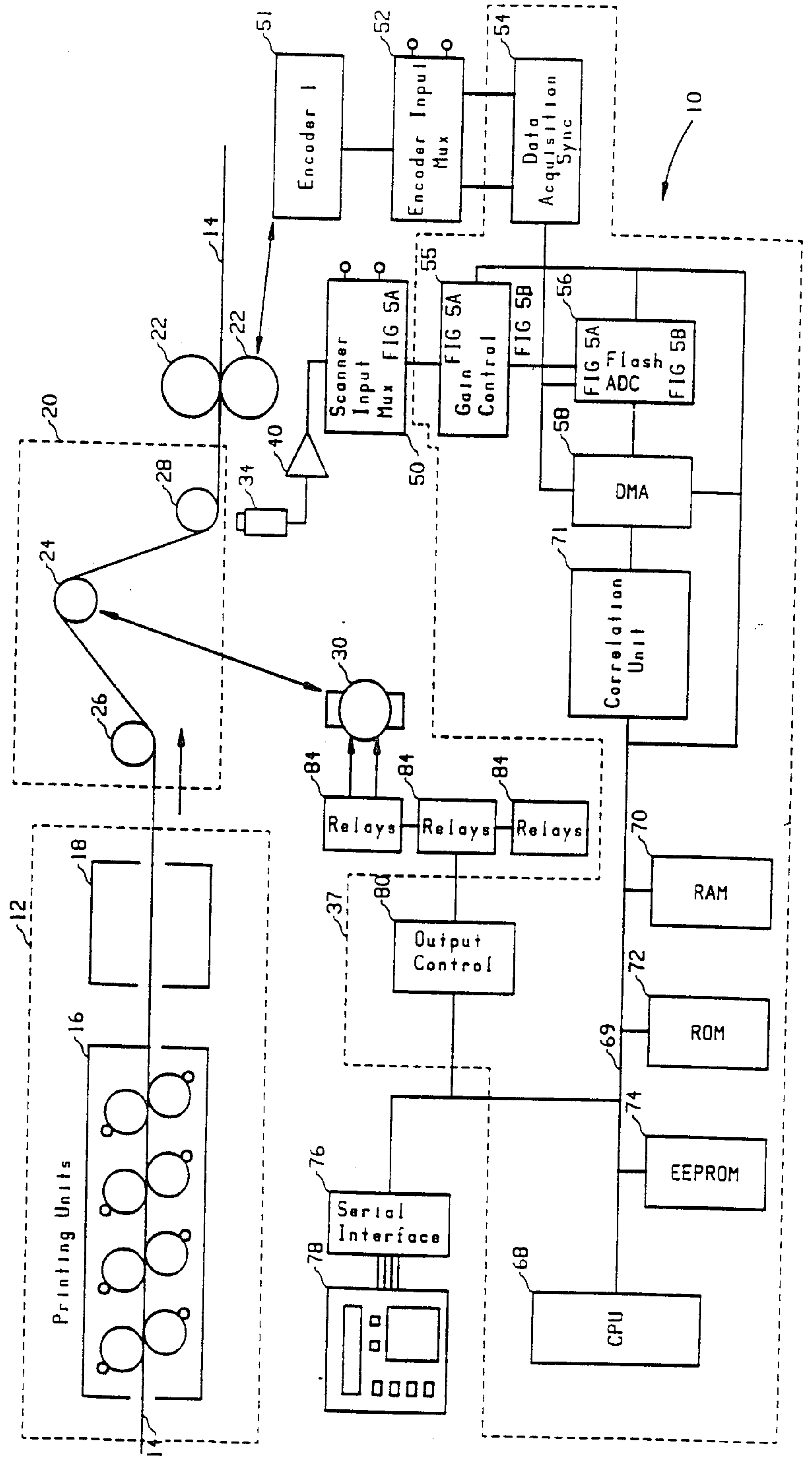
FIG. 1 is a schematic block diagram of an exemplary cutoff control system constructed in accordance with the present invention cooperating with a conventional web-fed printing press.

Referring to FIG. 1, a cutoff control system 10 in accordance with the present invention accurately positions printed images with respect to a cutting device in a web-fed printing press. A web of material 14, such as paper, is fed to a printing press 12 from a storage mechanism such as a reel stand (not shown). Web 14 is fed through one or more printing units 16, various processing apparatus 18, and a position compensating mechanism 20, into a cutting mechanism 22.

Compensation mechanism 20 adjusts the effective length of the web path from printing unit 16 to cutting mechanism 22, thus advancing or retarding the web relative to cutting mechanism 22. Compensation mechanism 20 suitably comprises a movable compensation roller 24 cooperating with a pair of stationary idler rollers 26 and 28. A compensation motor 30 selectively varies the relative position of compensation roller 24 and idler rollers 26 and 28 to, in effect, vary the length of the web path through the mechanism. Many other compensation mechanisms adaptable for use with web-fed printing systems, such as, for example, mechanisms for displacing cutting mechanism 22 along the web path, may also be used.

Cutting mechanism 22 is suitably of the conventional rotating cutting cylinder type. A pair of cooperating cylinders bear one or more blades symmetrically mounted on at least one of the cylinders. The cutting cylinders of cutting mechanism 22 are rotated by means of a conventional drive mechanism (not shown) in synchronism with the operation of printing units 16. As the cutting cylinders rotate, the blades intersect web 14 on a periodic basis, with a period corresponding to that of printing units 16.

System 10 suitably includes a data collection and processing unit 37, cooperating with one or more conventional encoders 51, and conventional optical scanners 34, keyboard modules 78 and compensation motors 30. Scanners 34 and encoders 51 are suitably coupled to data collection and processing unit 37 through conventional multiplexers 50 and 52. In practice, multiplexers 50 and 52 may be integral with processing unit 37. As will be discussed, scanners 34 provide analog signals representative of the image on web 14, and encoders 51 provide signals indicative of the operational cycle of the cutting mechanism. Data collection and processing unit 37, operating upon the signals provided by encoders 51 and scanners 34, provide control signals to compensation motors 30 to control the position of compensation roller 24. Communication between the user and system 10 is affected through keyboard modules 78.

Encoder 51 is operatively coupled to cutting mechanism 22 to generate electrical pulses representative of the cutting mechanism cycle. Each cutting cycle is represented by a first pulse, sometimes referred to herein as a top dead center (TDC) pulse or marker pulse, which is generated at a designated arbitrary nominal beginning of the operating cycle, and a sequence of pulses, indicative of incremental advances in the machine (cutting) cycle (e.g., 2,400 square waves are generated at constant intervals throughout 360 degrees of rotation of the cutting cylinder). Encoders 51 are suitably commercially available shaft driven encoders, such as an Encoder Products Company Model No. 716 or Sumtak Model No. LEI-053 optical encoder.

Optical scanner 34, suitably a SICK GMBH Model NT6 scanner, is disposed near compensation roller 24 and cutting mechanism 22 such that the linear distance along the web path between optical scanner 34 and cutting mechanism 22 is constant during operation of the printer. Thus, the cut position is a constant distance from the instantaneously scanned portion of the web. Optical scanner 34 is suitably disposed on a bracket (not shown) removably mounted to idler roller 28. The bracket (not shown) permits both linear and transverse adjustment of optical scanner 34 in a conventional manner. If a compensation mechanism is employed whereby cutting mechanism 22 is translated along the web path, scanner 34 would suitably be mounted to translate with cutting mechanism 22. Optical scanner 34 generates an essentially continuous analog signal indicative of the image density of the portion of the web instantaneously underlying the scanner (video signal).

The analog image-density (video) signals from optical scanner 34, and the respective signals from encoder 51 indicative of the cutter cycle, are selectively coupled to data collection and processing unit 37, on a switched or multiplexed basis, by multiplexer 50 (sometimes referred to as scanner input MUX 50), and multiplexer 52 (sometimes referred to as encoder input MUX 52), respectively. The ability to select among a plurality of scanners and encoders facilitates reconfiguring the press for various web arrangements, and the collection of statistical data useful in compensating for changing press conditions.

It is generally desirable to amplify the signals from optical scanner 34 prior to application to data collection and processing unit 37, particularly if optical scanner 34 is disposed at some distance from data collection and processing unit 37. Accordingly, an amplifier 40 may be interposed between optical scanner 34 and data collection and processing unit 37. Amplifier 40 suitably comprises a voltage to current converter, disposed in the vicinity of optical scanner 34, and converts the analog voltage from the scanner into a current-loop signal wherein the magnitude of current is directly proportional to the scanner output voltage. Optical scanner 34 produces an output signal which varies from −0.5 V to +0.5 V peak to peak. When scanner 34 output signal is −0.5 V, amplifier 40 output current is approximately 4 ma. When scanner 34 output signal is +0.5 V, amplifier 40 output current is approximately 18 ma. Between these two extremes, the voltage present at the input of amplifier 40 is linearly related to its output current. Amplifier 40 is coupled to one input cf a multiplexer 50.

Figure 5A:
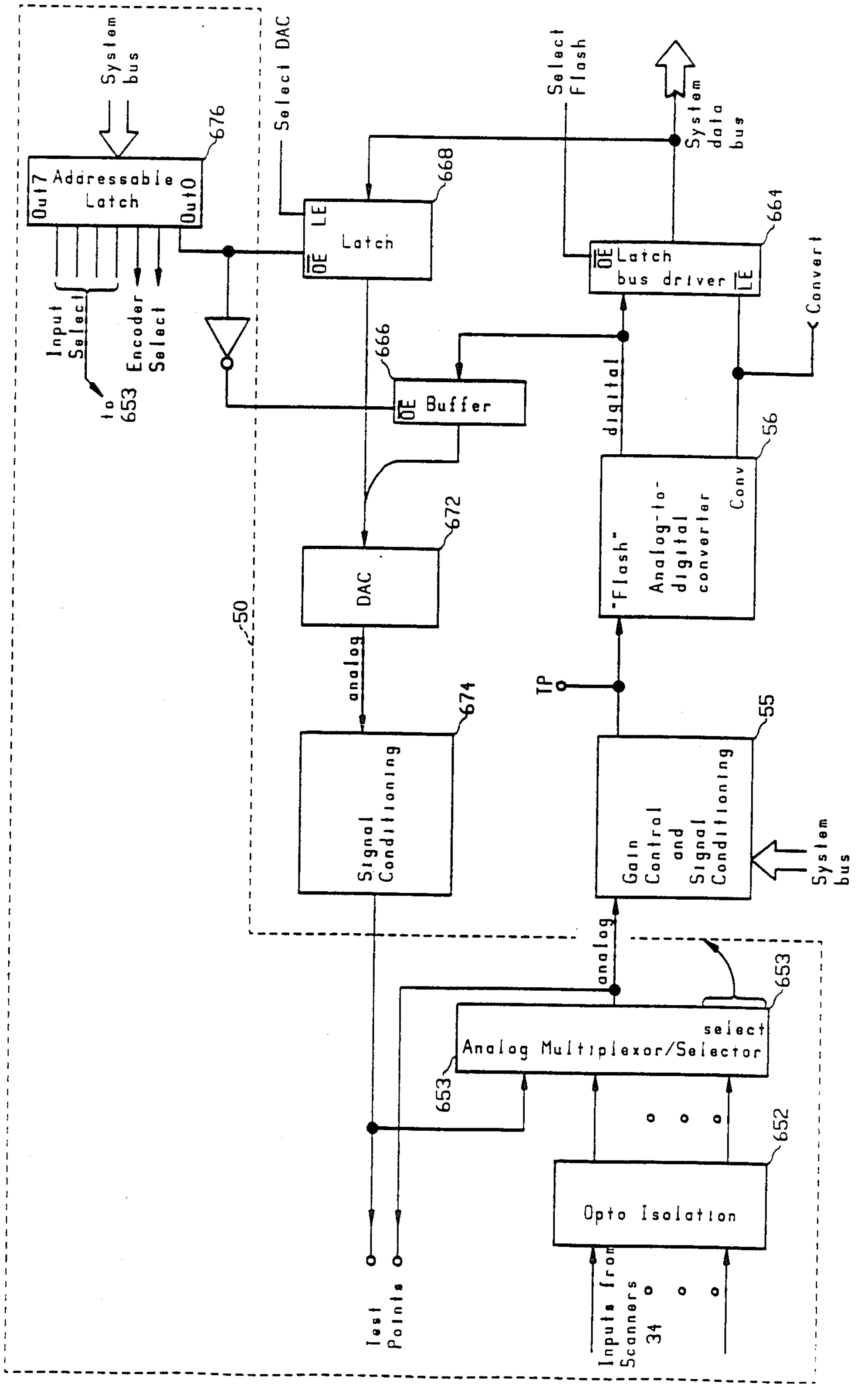
FIG. 5A is a block diagram of a scanner input multiplexer, scanner gain control, signal conditioning circuit, and A/D converter circuitry in FIG. 1.

As will be more fully described in conjunction with FIG. 5A, a conventional optical isolator is associated with each input of scanner input multiplexer 50. The optical isolators convert the current-loop output signal of amplifier 40 to voltage signals which are selectively switched by multiplexer 50. The current-loop interface which connects amplifier 40 with data collection and processing unit 37 provides total DC isolation between the respective devices. Therefore, cutoff control system 10 tends to be immune from ground loop problems which may occur between scanners 34, the press, and data collection and processing unit 37. In addition, the current-loop interface tends to be immune from electrical noise present in industrial environments and the current-loop signal remains essentially constant regardless of the length of the cable used to connect the devices.

Data collection and processing unit 37 analyzes the data from scanner 34 and selectively provides control signals to suitable interfacing circuitry, such as advance or retard relays 84, to control the operation of compensation motor 30, and thus the position of compensation roller 24. Data collection and processing unit 37 preferably comprises suitable data acquisition sync logic 54, a suitable gain control unit 55, a flash type analog-to-digital (A/D convertor or ADC) 56, a direct memory access device (DMA) 58, a central processing unit (CPU) 68, a conventional data and address bus 69, a conventional random access memory (RAM) 70 (sometimes referred to as system RAM 70), a correlation unit 71, read-only memory (ROM) 72, a non-volatile memory, such as an electrically erasable programmable read-only memory (EEPROM) 74, and a suitable output control unit 80. In practice, DMA 58 is often integral to CPU 68. However, for ease of explanation, DMA unit 58 is separately shown in FIG. 1.

Figure 3:
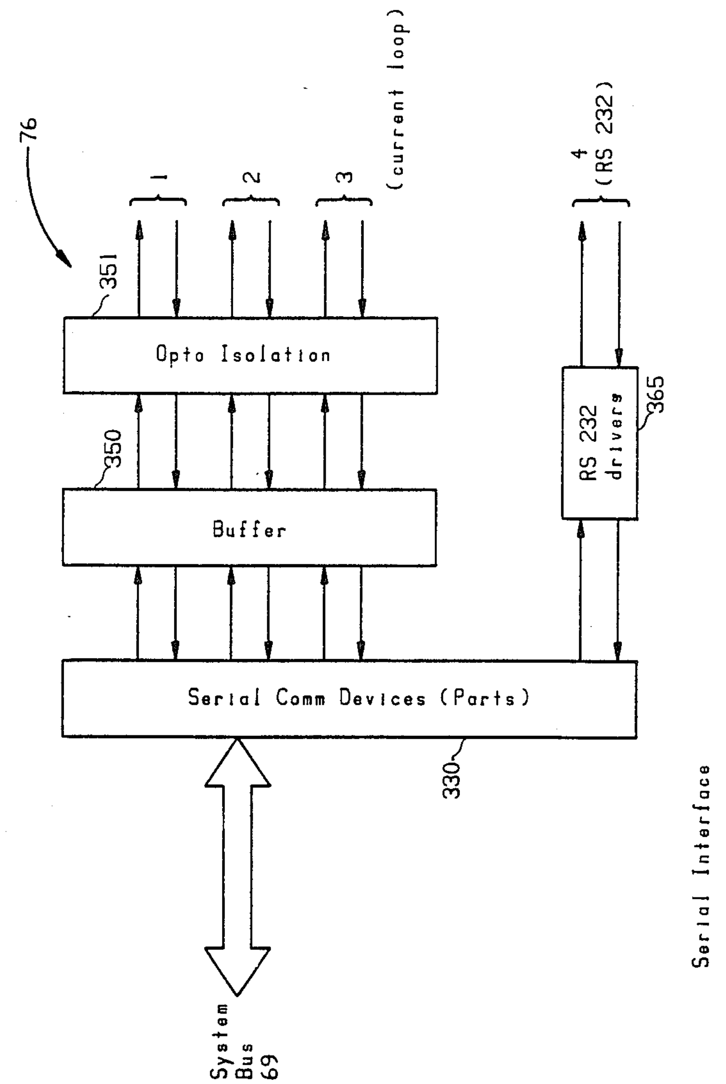
FIG. 3 is a schematic block diagram of communications interfaces employed in the system of FIG. 1.

Keyboard module 78, used to provide communication between the user and CPU 68, is suitably coupled to CPU 68 through a keyboard serial interface device 76. Keyboard module 78 suitably includes a keyboard, display and a microprocessor based controller (not shown) which receives commands from the keyboard and communicates them to data collection and processing unit 37 through interface unit 76. Character definition information is suitably maintained in an EPROM associated with the controller. The microprocessor controller processes x and y coordinate signals generated by the keyboard and converts them to their corresponding ASCII equivalents. The converted signals are then communicated to CPU 68, suitably through a buffer and optically isolated current loop (FIG. 3). A watchdog timing circuit may be employed to reset the keyboard module microprocessor in the event of a program failure. The microprocessor would periodically reset the watchdog timer during normal operation. If the watchdog timer is reset within a predefined period, an output pulse is generated to reset the microprocessor.

Operator inputs are suitably interactively elicited by various menus which appear on the keyboard module 78 display. Keyboard module 78 converts menu and keyboard entries into requests which are communicated to CPU 68. Each of the parameters, configurations, and other data entered through keyboard module 78 is retained in configuration tables stored in EEPROM 74 in data collection and processing unit 37. CPU 68 cooperates with EEPROM 74 to interpret and act on keyboard module requests.

The operator can, for example, select a press configuration or mode of operation, or change set-up parameters using respective menus. It is often necessary to operate web presses in different configurations for different jobs. Various scanners, encoders and compensating motors corresponding to a desired configuration may be selected (i.e., MUXs 50 and 52 programmed) in accordance with a menu on keyboard module 78. Further, the various web configurations may be programmed into the system (RAM 70 or EEPROM 74) at installation, allowing system 10 to be configured for a desired web configuration in response to a single command. This facilitates operation of the web press by information management systems.

Freedom of operator movement is also facilitated. A press operator may have to stand in different places during the operation of the press in different configurations. System 10 allows the operator to effectively reconfigure the press by selection of different scanners or compensator motors and encoders through any of a number of remotely located keyboard modules.

Other functions may be implemented from keyboard 78, including, for example: programmable alteration of the displacement necessary before error correction is made; selection of a display in metric or English units; control of the speed with which correction motors move in response to signals generated by the cut-off control system; selection of a predetermined number of correlations to be averaged before making a correction; selection of a minimum required web press speed; selection of a threshold to control system activation; selection of a time period during which the motor must remain on in order to effect a specified move in automatic and manual modes; and compensation for common installation errors.

Keyboard module 78 also receives signals from CPU 68 for display to the operator. Keyboard module 78 couples these signals to the appropriate display devices, such as alphanumeric displays or LEDs on keyboard module 78. For example, if the press is operating above the preset minimum press speed, and a pattern on which the system was previously locked is lost, the system automatically enters a pause mode. If the pause mode is active for more than a programmably set period of time, for example 10 seconds, the entire keyboard module display will flash, indicating that a problem has occurred. Keyboard module 78 also provides a display which indicates whether there is enough image data available for correlation.

System 10, in general, controls the effective position of cutting mechanism 22 along path 14. Analog to digital converter (ADC) 56 digitizes the analog signal from a selected scanner 34. Indicia of the digital signal are stored under control of DMA 58 upon each incremental period of the cutter mechanism cycle. A set of samples for a complete cutting cycle, representative of the image (pattern) on the web, is thus acquired. A reference pattern is designated, and correlation unit 71, in effect, thereafter correlates subsequent (new) patterns with the reference pattern. The result of the correlation, a sequence of 32-bit correlation coefficients, are stored in RAM 70. CPU 68 accesses and analyzes the sequence of correlation coefficients in system RAM 70, and causes output control unit 80 to generate appropriate control signals for application, e.g., through relays 84, to compensation motor 30.

More specifically, a scanner 34 and associated encoder 51 are selected by MUXs 50 and 52. The instantaneous analog image signal from the selected scanner 34 is applied by MUX 50 through suitable gain control circuitry 55 to ADC 56. ADC 56 suitably samples the analog image signal from scanner 34 and generates a respective six-bit digital word (byte) for each increment of rotation of the cutting drum. The six-bit output of ADC 56 is coupled, through system data bus 69, to the input of DMA 58 (in practice, a component of the CPU chip). DMA 58 controls the storage of the data. Scanner input MUX 50, gain control circuitry 55, and ADC 56 will hereinafter be more fully described in conjunction with FIG. 5A.

Timing signals for ADC 56 and DMA 58 are provided by sync unit 54. The signals from the selected encoder 51 (indicative of cutter cycle) are applied to sync unit 54, which converts the encoder output signals into a form acceptable for use as coordinating (timing) signals; the 2400 cycle per revolution output of encoder 51 is converted into to a 4800 pulse per revolution signal which is used to clock ADC 56 and DMA 58. Encoder input MUX 52 and sync unit 54 will be more fully described in conjunction with FIG. 4.

After digital signatures have been acquired in memory, a reference pattern (signature) is established. Correlation unit 71 thereafter generates indicia of displacement of subsequent patterns on the web from the reference pattern. In general, correlation unit 71 stores a cutting cycle signature (i.e., a set of bytes corresponding to a complete cutter cycle) either as the reference pattern, or after a reference pattern has been established, as a "new" pattern. Correlation unit 71 then generates, under the supervision of CPU 68, a sequence of 32-bit correlation coefficients. The sequence of coefficients represents the correlation of the new pattern with the reference pattern. The correlation coefficients are stored in RAM 70 for processing by CPU 68. After the coefficients are stored, correlation unit 71 proceeds with processing the signature of a successive image on web 14.

CPU 68 analyzes the distribution of the stored correlation coefficients and determines if the new pattern meets certain criteria. Often, an image may produce an electrical analog which contains many similar peaks and valleys. To prevent spurious locking, the shape of the correlation pattern (represented by the correlation coefficients) is examined and a dominant peak surrounded by a properly symmetrical shape is identified. If the new pattern meets specified criteria, displacement relative to the reference pattern is determined utilizing the dominant peak and control of motor 30 effected as appropriate.

Figure 2:
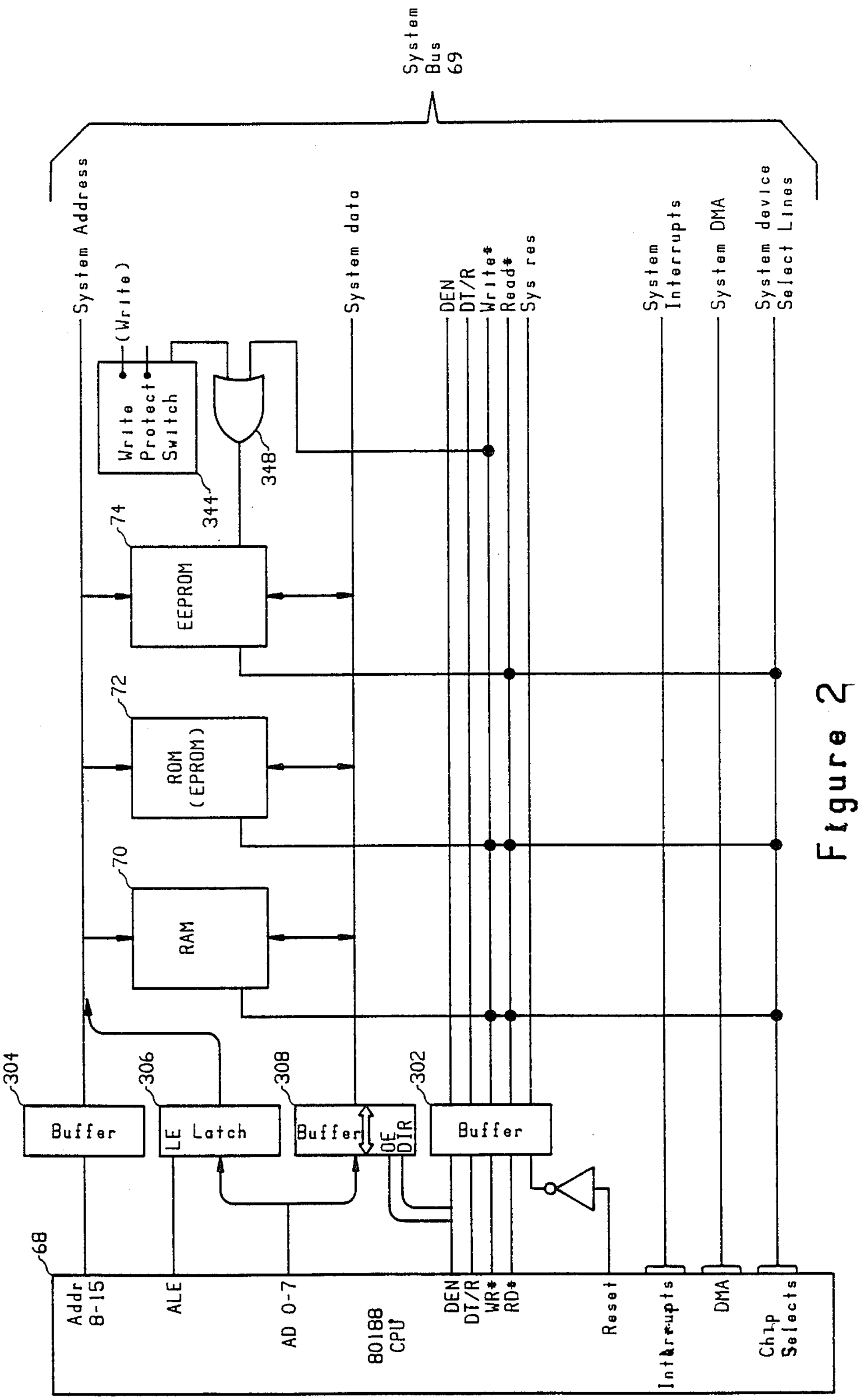
FIG. 2 is a block schematic of the central processing unit and associated circuitry in FIG. 1.

Referring now to FIG. 2, CPU 68 is suitably an Advanced Micro Devices microprocessor 80188-10 CPU 68 cooperates, as previously noted, with system RAM 70, system ROM 72, and system EEPROM 74, through common address and data bus 69 (e.g., 8 address lines, 8 data lines and respective control lines DEN, DT/R, WR*, RD*, and RESET. Bus 69 is coupled to the address and data bus inputs of CPU 68 through bus drivers 302, 304, 306, and 308. Bus drivers 302, 304, 306, and 308 generate additional drive capability for supplying signals to all the devices which share bus 69.

CPU 68 generates respective control signals:

DATA ENABLE (DEN)—used to enable selected devices to drive bus 69;

DATA TRANSMIT/RECEIVE (DT/R)—used to indicate whether data on bus 69 is to be transmitted from or received by CPU 68;

WRITE* (WR*)—used to trigger actual transfer of data in a write operation;

READ* (RD*)—used to trigger actual transfer of data in a read operation;

RESET—used to restore various devices to a specified initial state;

and respective peripheral chip select signals to selectively enable correlation unit 71 and DUART devices 330 and 332, as well as various latches and I/O devices.

CPU 68 is also responsive to various request and system interrupt signals. For example, "TDCINT" interrupt is generated to CPU 68 by encoder 51 whenever the encoder senses operation at top dead center. A timer interrupt is also applied to CPU 68 on a periodic basis to facilitate real time computations. These interrupts are used by CPU 68 to, among other things, determine absolute press speed. Similarly, where DMA 58 is resident on the CPU chip, DMA request signals, DMAREQ0 and DMAREQ1, are provided from sync unit 54 to control the transfer of data from flash converter DMA 56 into system RAM 70 or into RAMs 62 and 64 of correlation unit 71.

Figure 2B:
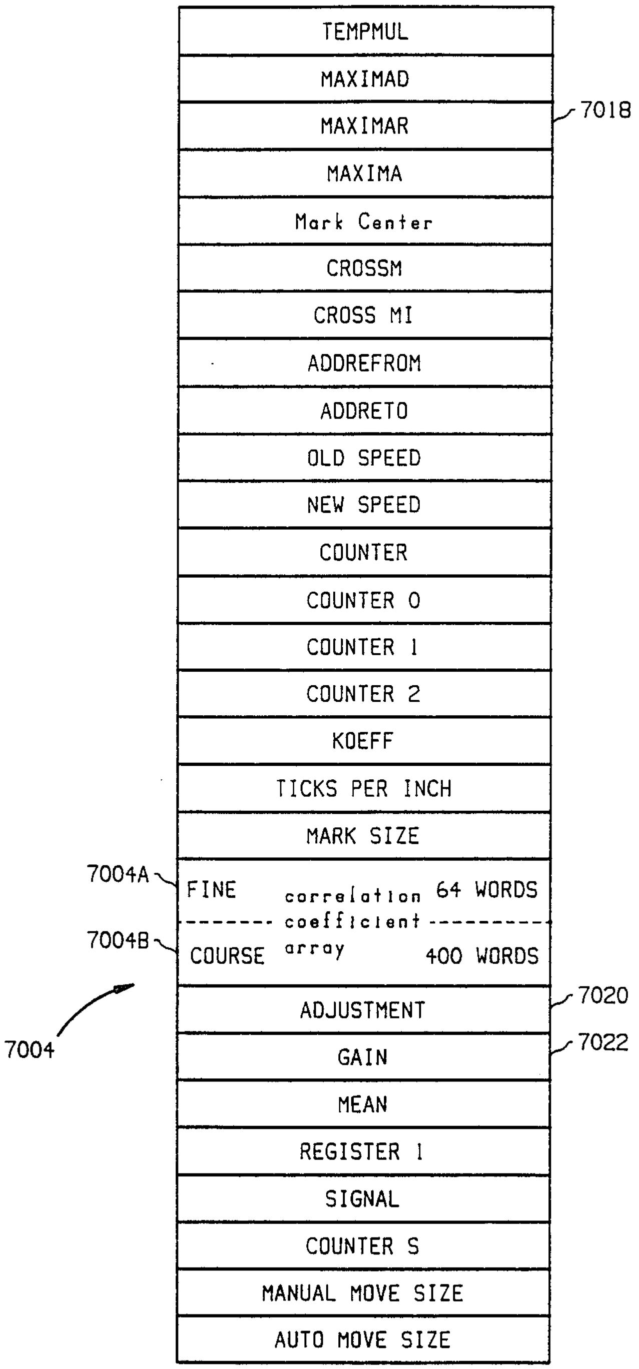

RAM 70 suitably comprises a 32K byte Toshiba 62256-70 RAM. If desired, provisions for expansion can be included. The WRITE*, READ*, and one of the peripheral chip select signals generated by CPU 68, are coupled to the write (WR) input and chip select input (CS) of RAM 70. System RAM 70 stores indicia of various operations flags, variables and arrays employed in the operation of system 10, illustrated schematically in FIGS. 2A and 2B.

"VARIANCE" is a two-byte variable used by the system to store the highest value generated during the auto-correlation function; acceptance tests are based on the value of VARIANCE.

"CORRELATION COUNTERS" 7002, 7003 are two two-byte counters used during the correlation process to monitor how many correlation coefficients have been generated.

"MAXIMA" is a two-byte variable used by the system in determining the address of the maximum value in the fine cross-correlation array.

"MAXIMAR" 7018 is a two-byte variable used by the system to store the address of the maximum value in the course cross-correlation array.

"MINIML" 7007 is a two-byte variable used by the system to store the smallest value generated during the cross-correlation function for the condensed arrays.

"MAXIML" 7006 is a two-byte variable used by the system to store the largest value generated during the cross-correlation function for the condensed arrays.

"CROSSL" is a two-byte variable used by the system to store the address (pointer) of the fine cross-correlation array.

"CROSSC" is a two-byte variable used by the system to store the address (pointer) of course cross-correlation array.

"CROSS" 7010 is a two-byte variable, initially loaded with either the value of CROSSL or CROSSC, used by the system during the cross-correlation and auto-correlation generation processes.

"CROSSM" is a two-byte variable (pointer), initially loaded with either the value of CROSSL or CROSSC, used by the system in defining the maximum of cross-correlation for the fine and course cross-correlation arrays.

"CROSSMI" is a two-byte variable used by the system in determining the minimum value contained within the fine and coarse cross-correlation arrays.

"TEMPOR" 7012 is a two-byte temporary storage variable used during the computation of error in pattern recognition mode; the value of TEMPOR is used to indicate the amount of correction required.

"TEMPSUM" 7014 is a two-byte temporary storage variable used during the computation of error in pattern recognition mode.

"TEMPMUL" 7016 is a two-byte temporary storage variable used during the computation of error in pattern recognition mode.

"POWERL" is a two-byte variable used by the system in determining if symmetry has been satisfied; the value of POWERL corresponds to the algebraic sum of each of the correlation coefficients to the left of center in the course cross-correlation array.

"POWERR" is a two-byte variable used by the system in determining if symmetry has been satisfied; the value of POWERR corresponds to the algebraic sum of each of the correlation coefficients to the right of center in the course cross-correlation array.

"MARK CENTER" is a two-byte variable used by the system to store the address (within RAM 62) of the center of a mark (mark contol mode).

"MARK SIZE" is a two-byte variable, expressed in terms of ticks per mark, used by the system to store the size of a mark being scanned.

"TICKS PER INCH" is a two-byte, operator entered parameter used by the system as a unit of measure for determining mark size. TICKS PER INCH is found by dividing KLICKS/REVOLUTION by the size (in inches) of the blanket cylinder.

"KOEFF" is a two-byte variable, the value of which is used to divide a frequency divider (clock). The value of KOEFF is determined as NEWSPEED*100/blanket size.

"ADDREFROM" is a two-byte variable, pointing to the address of the source (input) array, used by the system in creating the expanded arrays (REFLONG AND REFCONDENSED).

"ADDRETO" is a two-byte variable, pointing to the address of the target (output) array, used by the system in creating the expanded arrays (REFLONG AND REFCONDENSED).

"OLD SPEED" is a two-byte variable used by the system to store the value corresponding to the previously determined speed of the press.

"NEWSPEED" is a two-byte variable used by the system to store the value corresponding to the present speed of the press.

"COUNTER", "COUNTERS", "COUNTER0", "COUNTER1" and "COUNTER2" are working registers (two byte) used by the system during the processing of various routines.

"MAXIMUM" is a two-byte variable used by the system to store the maximum value in the course cross-correlation array.

"MEAN" is a two-byte variable used by the system to store the computed mean of data input from the scanner; in mark control mode this value is compared with the value of MEANOR and in pattern recognition mode it is used to normalize the values comprising the input array.

"MEANOR" is a two-byte variable used by the system to store the computed mean of data input from the scanner in a pass subsequent to that in which MEAN was computed.

"CORRELATION COEFFICIENT ARRAY" 7004 is a 928 byte array comprised of the fine and cource cross-correlation coefficient arrays.

"ADJUSTMENT" 7020 is a two-byte variable used by the system as part of the gain control function; the value of adjustment represents a discrete amount by which adjustments to GAIN are made.

"GAIN" 7022 is a two-byte variable used by the system for controlling the input level to the D/A converter.

"REGISTER1" is a two-byte variable used by the system in determining the maximum value of the fine and course cross-correlation arrays.

"SIGNAL" is a two-byte variable used to store the value corresponding to the largest amplitude of the input signal from the scanner.

RAM 70 may also include respective buffers for use in acquisition of data. The actual location of the variables and arrays in RAM 70 may vary during the operation of system 10.

ROM 72 is suitably a 256K byte 27256-2 EPROM. ROM 72 is similarly coupled to CPU 68 through bus 69. The chip select terminal of ROM 72 is suitably coupled to an upper chip select output of CPU 68, and the read terminal of ROM 72 is coupled to the system READ* output of bus driver 302. ROM 72 is used to store the program which controls the operation of system 10.

System EEPROM 74 suitably comprises a XICOR 2816 EEPROM. EEPROM 74 is likewise coupled to CPU 68 through bus 69. The chip select terminal of EEPROM 74 is suitably coupled to a mid-chip-select terminal of CPU 68. The write terminal of EEPROM 74 is responsive to the output signal of a conventional two-input OR gate 348. Data is entered into EEPROM 74 whenever the output of OR gate 348 goes low. This occurs only on the coincidence of WRITE* being low and the closure of a write enable switch 344. EEPROM 74, as previously noted, is used to store various operator-entered system parameters, and configuration data.

If desired, the WRITE* signal applied through bus 69 to RAM 70 and OR gate 348 can be delayed relative to the CPU clock cycle, to accommodate various system components which may not be ready at the beginning of the CPU write cycle (synchronous with a crystal oscillation generated click signal CPUCLK). A flip flop and inverter can be interposed between CPU 68 and driver 302 to provide a one-half cycle delay with respect to the WRITE command signal generated by CPU 68.

Referring to FIG. 3, communications between CPU 68 and keypad modules 78 (FIG. 1) are effected through conventional DUART devices 330 interconnected with bus 69. The various keyboard modules 78 are suitably coupled to DUARTs 330 through buffered optically isolated current loops, including conventional buffers 350 and optical isolators 351. In addition, DUART devices 330 are also coupled to conventional RS232 drivers. A local clock is provided to DUART device 330 to provide a time base for generating a baud rate or frequency reference for data communications through the RS-232 channel.

Figure 4:
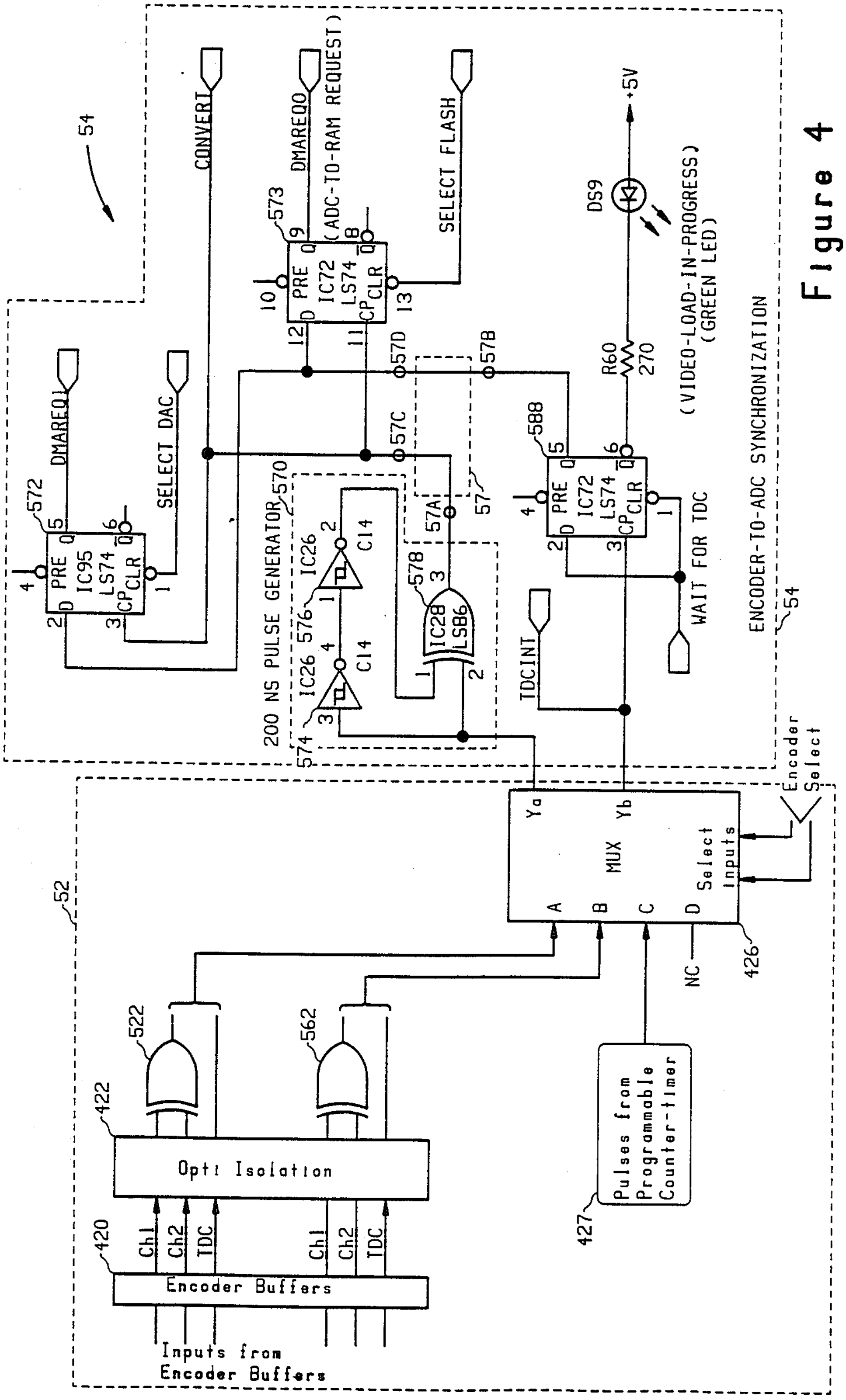
FIG. 4 is a block diagram of the encoder and synchronization circuitry in FIG. 1.

As previously noted, MUX 52 switches the machine cycle signals (TDC and KLICK signals) from a selected encoder 51 to sync circuitry 54. Referring now to FIG. 4, MUX 52 suitably comprises a conventional digital multiplexer chip 426, such as, for example, a 74LS353, cooperating with suitable buffers 420 and optical isolators 422. The signals from respective encoders 51 are connected through buffers 420 and optical isolators 422 to an associated channel (set of two input terminals) of MUX chip 426. Various encoders provide incremental advancement signals comprising dual 1200 cycle per revolution square wave outputs in quadrature phase relationship. Where such an encoder is employed, Exclusive-Or gates 522 and 562 may be used to combine these outputs into a composite signal of 2400 cycles per revolution for application to the input terminal of MUX chip 426. A programmable counter-timer 427 may also provide input signals to one of the channels of MUX 427 to, for example, facilitate system diagnostics and testing.

MUX chip 426 selectively couples one of the sets of two input terminals (A, B, C, D) to its output terminals to provide respective output signals: YA, representative of the machine cycle incremental advancement (e.g., 2,400 pulses per revolution signal), and YB, representative of the nominal beginning of the machine cycle (e.g., the top-dead center pulse (TDC)). The set of input terminals is selected in accordance with selecting signals (ENCSEL A and ENCSEL B) from CPU 68. The generation of ENCSEL A and ENCSEL B will be discussed more fully in connection with FIG. 5A.

MUX 52 applies the TDC pulses and incremental advancement signals from the selected encoder 51 to sync unit 54, which generates synchronization and clock signals to coordinate the operation of processing unit 37. More specifically, the incremental advancement signal appearing at output YA of MUX 52 is applied to a pulse generator/multiplier 570, suitably formed by respective inverters 574, 576, and an Exclusive-Or gate 578. Pulse generator 570 suitably converts the 2400 cycle per revolution signal from MUX 52 into a 4800 pulse per revolution stream (sometimes hereafter referred to as KLICKS) by triggering off of each edge of the 2400 cycle per revolution signal. The incremental advance pulses from pulse generator 570 are applied as CONVERT command signals to ADC 56. The TDC pulses are applied by MUX 52 to CPU 68 as an interrupt (TDCINT) and are used to generate appropriate DMA request signals to DMA device 58 (in practice, part of CPU 68). More specifically, the TDC pulses are applied to the clock input of a D-type flip flop 588, operating as a latch, and cleared by a wait-for-TDC signal generated by CPU 68 when the processor seeks a load of data. The Q output of flip flop 588 is applied to the data input of respective D-type flip flops 572 and 573. Flip flops 572 and 573 are employed to generate, synchronously with the incremental advancement pulses, DMA requests (DMAREQ1, DMAREQ0, respectively) to respective channels of DMA 58. More specifically, flip flops 572 and 573 are clocked by the positive-going edges of the incremental pulses (KLICKS), causing a high level DMA request to be generated. Upon completion of the individual DMA operation, signals are generated to clear flip flops 272, 273 (select DAC, select flash) in preparation for the next incremental pulse. After a full cycle of data is accumulated, CPU 68 generates a low level wait for TDC signal, clearing flip flop 588, and effectively disabling the DMA requests generated by flip flops 572 and 573.

As will be discussed, the image signal from scanner 34 is generally sampled once during each incremental advancement of the machine cycle between successive TDC pulses, i.e., once for each DMA REQUEST (DMAREQ0). For a 48 inch repeat length between respective TDC pulses, the 4800 pulse per revolution signal from pulse generator 570 corresponds to a 0.010 inch resolution. In some instances, however, it may be desirable to provide a higher resolution during all, or part, of a machine (e.g., cutting) cycle. For example, if it is desired to employ system 10 with a cut mark of predetermined shape, typically printed in a marginal space separate and apart from the substantive image printed on the web, a resolution of greater than 0.010 inch may be advantageous. Accordingly, suitable expansion generator circuitry 57 (shown in dotted line in FIG. 4) may be included in sync unit 54 to increase the sampling rate, i.e., provide higher resolution, during a particular portion, or portions, of the machine cycle. A suitable expansion generator 57 will be described in conjunction with FIG. 11.

The image signal from a selected scanner 34 (corresponding to the selected encoder 51) is applied to processing unit 37 through MUX 50. Referring to FIG. 5A, MUX 50 suitably comprises respective optical isolators (one associated with each channel), a conventional National LF13331N analog multiplexer chip 653, and an addressable latch 676 coupled through system data bus 69 to CPU 68. Multiplexer 50 selects individual scanners in response to the contents of latch 676. The least significant bit of latch 676 provides a signal to enable one or the other of buffer 666 or latch 668. In practice, in addition to generating control signals used for controlling scanner output selection through multiplexer 50, latch 676 may also be used to generate the encoder selecting signals applied to MUX 52 (FIG. 4) and the "WAIT FOR TDC" signal used to enable TDC latch 588 of sync unit 54 (FIG. 4).

The analog signal from the selected scanner 34 is coupled by MUX 50 to gain control circuit 55. More specifically, referring to FIG. 5B, gain control circuit 55 suitably comprises a buffer 770, a gain control device 772, an inverting amplifier 771, summing amplifier 774, and suitable signal conditioning circuitry, generally indicated as 776. Buffer 770, inverting amplifier 771 and amplifier 774, suitably comprise portions of respective LF353 dual operational amplifier chips. Gain control device 772 suitably comprises a conventional multiplying digital-to-analog converter, such as a Logic Devices, Inc., LMU558BC converter. The image signal from the selected scanner is applied through a coupling capacitor 762, a voltage divider (resistors 759 and 763) and buffer 770 to the analog input (Vref) of multiplying DAC 772. Multiplying DAC 772 produces an analog output (at terminal IO1) corresponding to the analog signals produced by the selected scanner 34 multiplied by a programmable value provided by CPU 68. DAC 772 operates, in effect, as a current amplifier, with a gain ranging from 0 to 2 in 256 discrete steps. The output signal from DAC 772 is applied as an input to inverting amplifier 771. Summing amplifier 774, in cooperation with a resistive summing network 773, algebraically sums the buffered image signal (from buffer 770) with the inverted output of DAC 772. The ratio of resistances in the summing network is suitably 1:2 as between the buffered and inverted signals, such that an overall gain ranging from +1 to 0 in positive phase, and from 0 to +1 in the opposite phase is manifested in 256 discrete steps.

The gain controlled signal is applied to signal conditioning circuitry 776, which converts the signal into a form compatible with flash ADC 56. Flash A/D converter 56 is suitably an emitter coupled logic (ECL) TRW8440/AH, available from TRW, LSI Products Division, TRW Electronic Components Group, LaJolla, Calif. Such a device typically operates on a voltage ranging from −1.2 to 0 volts. Accordingly, the gain controlled scanner output signal is level shifted before being applied to the input of flash A/D converter 56. Signal conditioning circuitry 776 suitably comprises a band gap precision reference device 750, a buffer 781, a voltage divider network 775, and a high speed unity gain buffer 768 (e.g., an LM318 buffer). Reference device 750 provides a −1.2 V reference voltage, which is coupled through buffer 781 to divider network 775. Divider network 775 provides a −0.6 V bias voltage, which is applied together with the gain controlled image signal from summing amplifier 774 (coupled through capacitor 779) to unity gain buffer 768. The output of buffer 768 is applied to ADC 56. The level shifted signal appearing at the output of high speed buffer 768 is coupled to the input of flash A/D converter 56 through a resister 754. A bypass capacitor 760 and protection diode 755 may be included to remove unwanted noise from the scanner output signal, and provide input voltage range protection to the input of flash A/D converter 56.

Figure 5B:
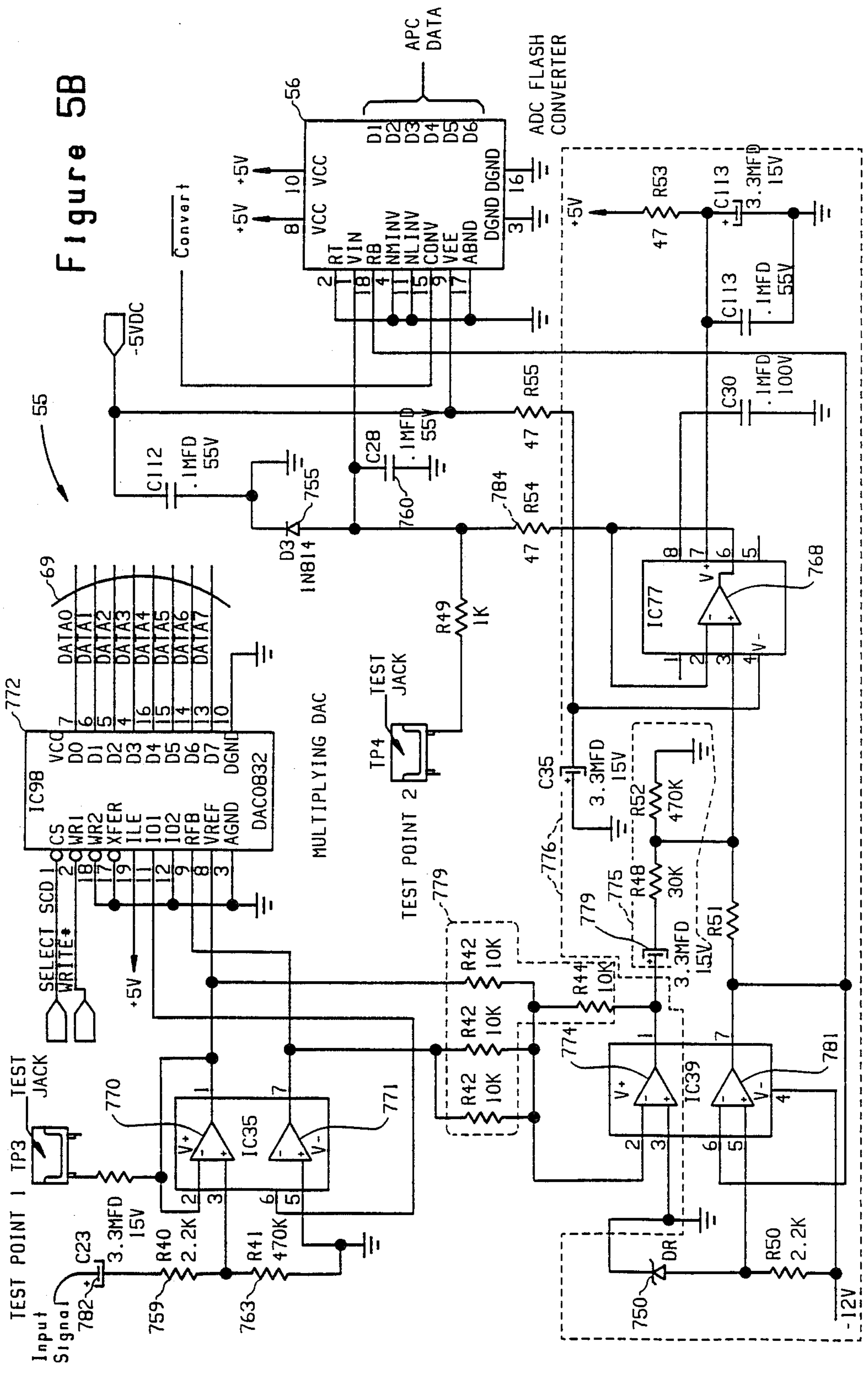
FIG. 5B is a block schematic diagram of the scanner gain control and flash A/D converter in FIG. 5A.

Referring now to FIGS. 5A and 5B, converter 56 responds to a positive going "CONVERT" command signal generated by sync unit 54 (FIG. 4). On the falling edge of "CONVERT", the result generated by flash A/D converter 56 is retained in a latch 664, at which time it becomes available for use by CPU 68 and correlation unit 71 through system bus 69.

If desired, a feedback loop can be established to perform system diagnostics. The output of flash A/D converter 56 is coupled through a buffer 666 to a D/A converter 672, the output of which is applied through suitable signal conditioning circuitry 674 to input MUX 50, which, as may be recalled, provides input signals to gain control circuit 55. The D/A converter 672 also communicates with bus 69 through latch 668. Signal conditioning circuitry 674 suitably comprises an active filter having a predetermined gain and frequency response. Input data to D/A converter 672 is thus from either the flash A/D converter 56 or the system data bus, as selected by CPU 68. For example, for diagnostic purposes, a known value may be applied by CPU 68 through system bus 69 and latch 668 to D/A, converter 672. The analog output of D/A converter 672 is then presented to gain control circuit 55 through analog multiplexer 50, and reconverted into a digital signal through flash A/D converter 56. CPU 68 can then measure system linearity and gain by comparing the known input value with the digital value provided at the output of flash A/D converter 56.

Figures 6A, 6B:
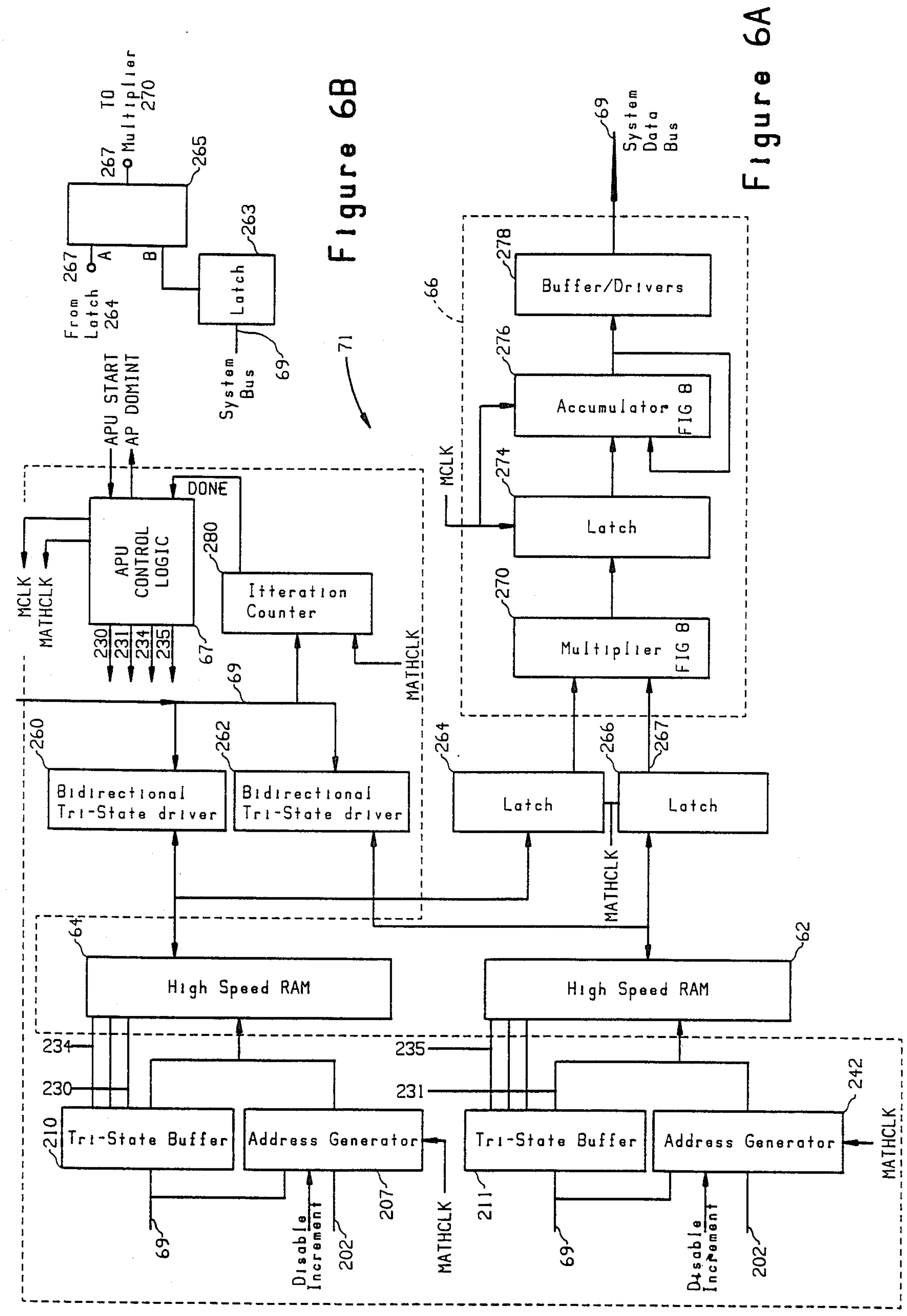
FIG. 6A is a schematic block diagram of the correlation unit in FIG. 1.

Referring now to FIG. 6A, correlation unit 71 will be more fully described. Correlation unit 71 comprises tri-state buffers 210 and 211, sequential address generators 207 and 242, dual port random access memories (RAMs) 62 and 64, bidirectional tri-state drivers 260 and 262, control logic 67, an iteration counter 280, respective latches 264 and 266, and a sum-of-products generator 66. Tri-state buffers 210 and 211 are each suitably comprised of a pair of 74F541. Bidirectional tri-state drivers 260 and 262 each suitably comprise a 74LS245. Address generators 207 and 242 are suitably 16-bit preloadable synchronous counters (e.g., 74F569). RAMs 62 and 64 each suitably comprise an 8K high-speed, dual port RAM such as a Mitsubishi Electric Corp. M5M5165P-70. Sum-of-products generator 66 suitably comprises a multiplier 270, a latch 274, a 32-bit accumulator 276, and a buffer (with associated drivers) 278. Multiplier 270 is suitably a static combination multiplier (which does not require a clock signal) such as a LOGIC DEVICES LMU558. Accumulator 276 will be more fully described in conjunction with FIG. 8.

Figure 7:
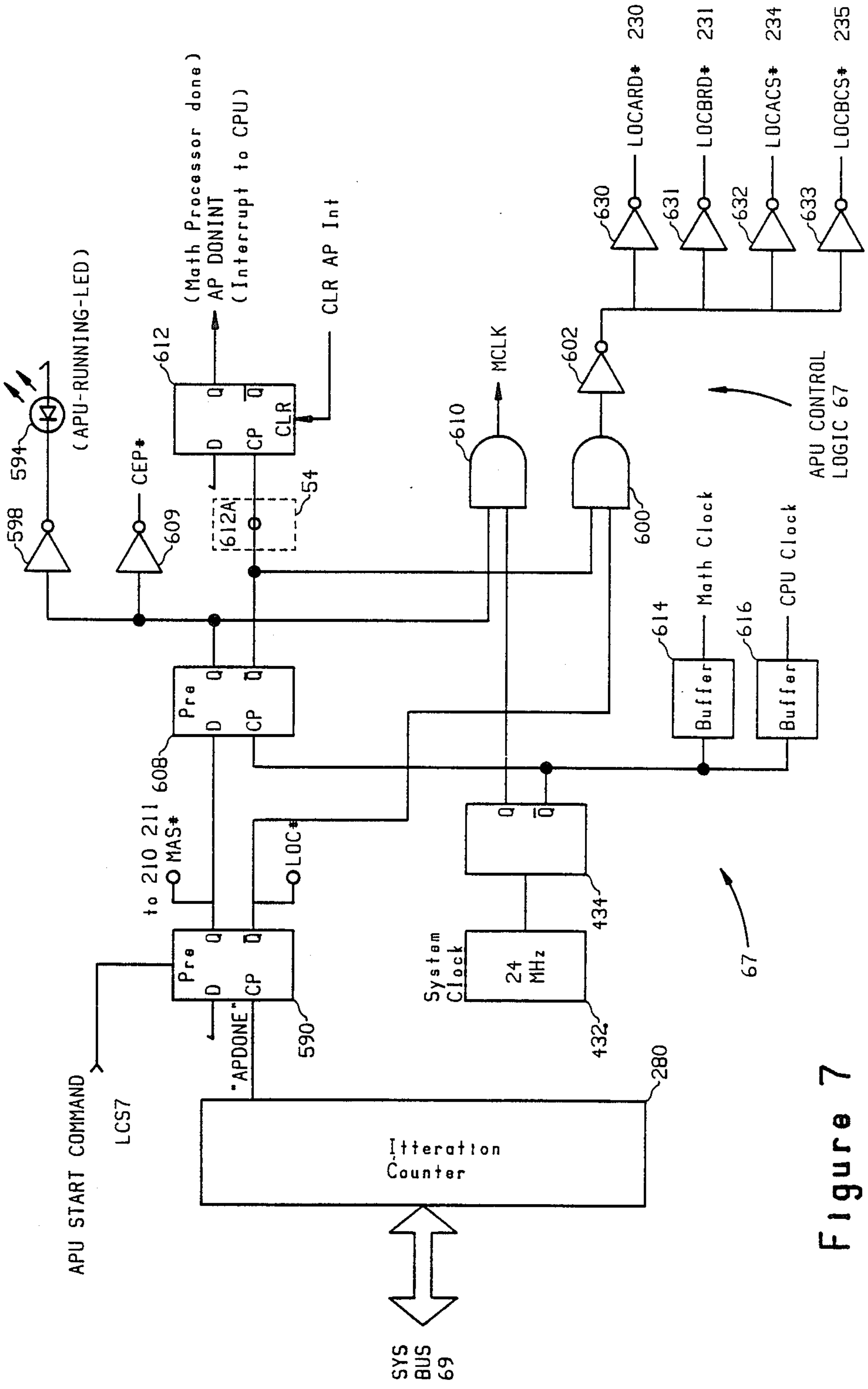
FIG. 7 is a block schematic of the APU control logic circuitry in FIG. 6A.

Referring briefly to FIG. 7, APU control logic 67 suitably comprises a 24 MHz clock 432, a divider 434, respective buffers 614 and 616, respective D-type flip flops (FFs) 590, 608 and 612, respective two-input AND gates 600 and 610, and respective inverters 609, 602, and 630–633. If desired, an indicator, such as an inverter 598 and LED 594, may also be included. System clock 432 may be any common crystal oscillator configured to provide a 24 MHz output signal. The 24 MHz clock signal produced by system clock 532 is coupled to flip-flop 434, which halves the signal to provide a 12 MHz square wave signal. The 12 MHz signal is applied to buffers 614 and 616 to provide MATHCLK and CPUCLK signals. The CPUCLK signal is used to clock the CPU and its associated circuitry.

Flip flops 590, 608 and 612 cooperate to control the mode of operation of correlation unit 71, as will be explained. FF 590 is suitably a presetable D-type flip flop, with D input tied low, preset by an APUSTART command from CPU 68, and clocked by an APDONE signal generated by iteration counter 280. FF 590 generates respective inverse signals MAS* and LOC*. The MAS* signal, when active, allows the enabling of tri-state buffers 210 and 211. The LOC* signal, when active, enables output of address generators 207 and 242 with respect to RAMs 62,64. The MAS* signal is also applied as the data input to FF 608. FF 608 is clocked by the 12 MHz signal from which MATHCLK and CPUCLK are derived (from the Q output of FF 434). The Q output of FF 608 is applied to an inverter 609 to generate a signal CEP*, effectively reflecting, but delayed by one clock cycle from, the MAS* signal. CEP* is used to begin incrementing address generators 207 and 242. FF 608 also cooperates with AND gate 610 to provide a gated clock signal MCLK, syncronous to but commencing one cycle after the start of MATHCLK. The Q output of flip flop 608, through buffer 598, serves to turn on indicator LED 594 (indicating the correlation circuitry is operating). The Q/output of FF 590 is coupled to AND gate 600 which drives, through inverter 602, inverters 630, 631, 632 and 633, the outputs of which (LOCARD*, LOCBRD*, LOCACS* and LOCBCS*) are used to enable the chip select and read lines of high speed RAMs 62, 64 of correlator unit 71 (FIG. 6A). The Q/output of FF 608 is applied as a clock signal to FF 612. The D input of FF 612 is tied high, and the clear input is responsive to a CLR AP INT signal generated by CPU 68. The output of FF 612 (APDONINT) is applied as an interrupt to CPU 68.

Figure 8:
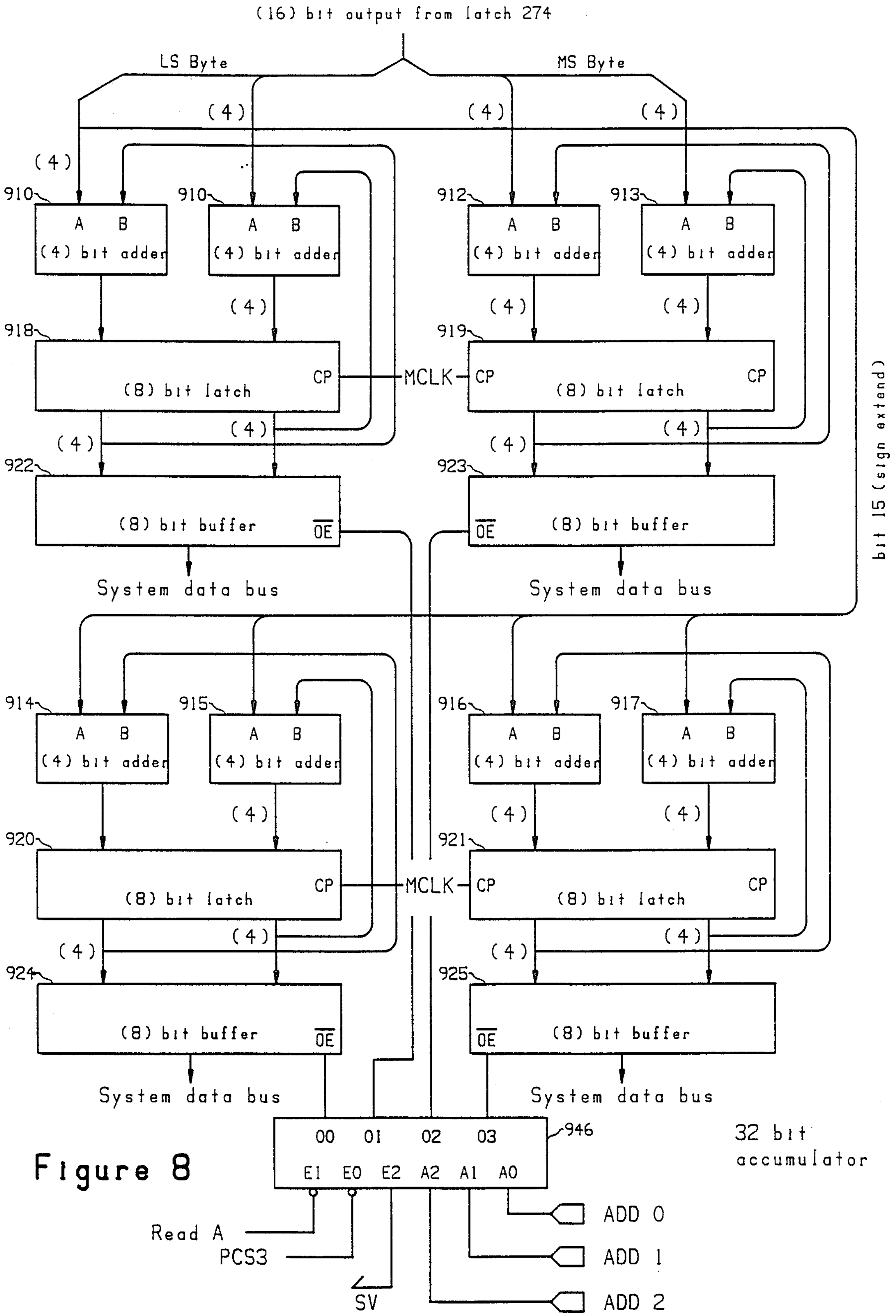
FIG. 8 is a block schematic diagram of the accumulator in FIG. 6A.

Referring now to FIG. 8, accumulator 276 suitably comprises respective four-bit adders 910–917, cascaded to form a 32-bit adder. The outputs of adders 910 and 911, 912 and 913, 914 and 915, and 916 and 917 are applied to 8-bit latches, 918–921, respectively. Latchs 918–921 store the output of the associated adders on the rising edge of MATHCLK. The A inputs of adders 910–913 are receptive of signals from latch 274. The most significant bit of the 16 bit word from multiplier 270 is sign extended to form an A input for adders 914, 915, 916 and 917. The outputs from latchs 918–921 are applied to the B input of associated adders 910–917 in a recirculating fashion. The outputs of latches 918–921 are coupled to 8-bit bus drivers 922–925, respectively. CPU 68 reads each 8-bit portion of the 32 bit result successively as selected by address decoder 946. At initialization, latches 918–921 are cleared to zero.

Referring again to FIG. 6A, correlation unit 71, in effect, operates in two modes:

a data acquisition mode, in which DMA 58 cooperates with correlation unit RAMs 62 and 64 (and system RAM 70) to first establish indicia of a suitable reference pattern in RAM 62, and thereafter, to establish in RAM 64 indicia of a subsequent (new pattern) signature on web 14; and a correlation mode, in which, under the control of APU logic 67, the contents of RAMs 62, 64 are selectively output for processing by sum-of-products generator 66 to generate a sequence of correlation coefficients. System 10 alternates between the data acquisition mode and the correlation mode until the system looses lock or is turned off.

Figure 9A:
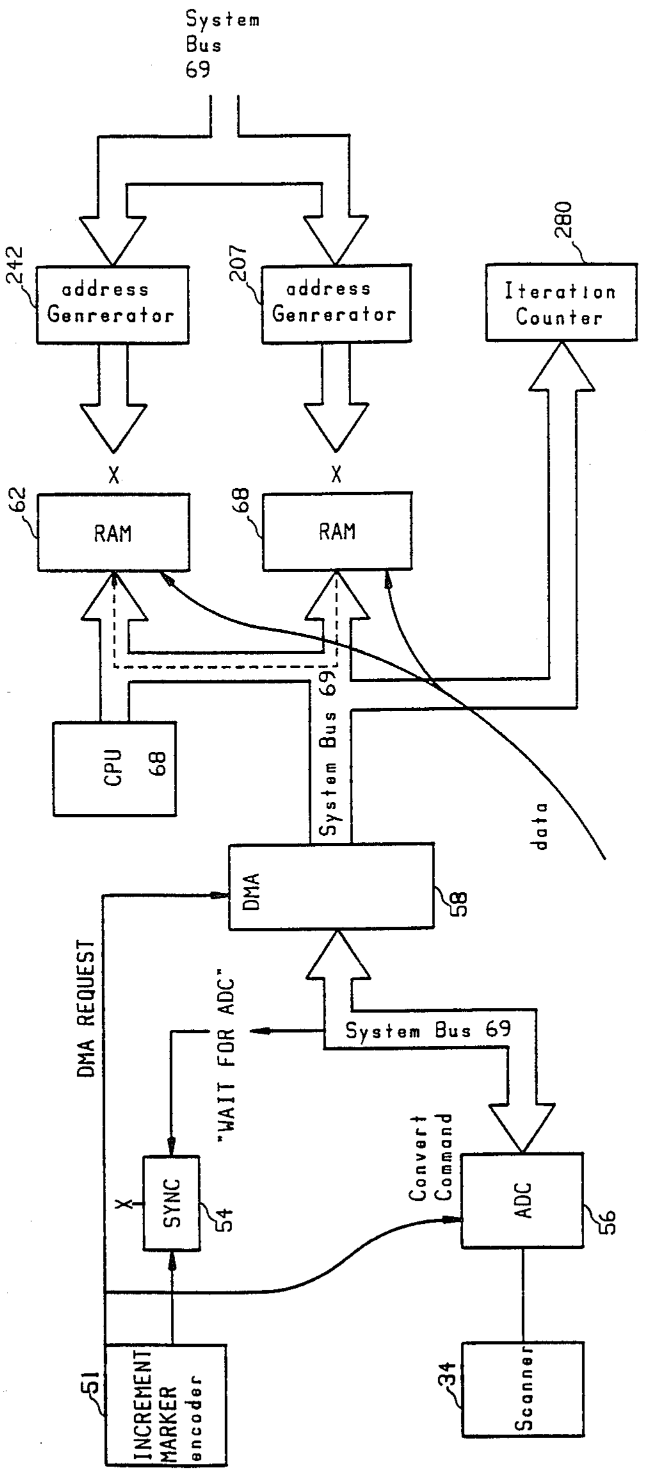
FIGS. 9A and 9B are schematic block diagrams of the effective configuration of the correlation unit of FIG. 1 in respective modes of operation.

Referring to FIGS. 4, 7 and 9A, the data acquisition mode is initiated by application of a WAIT-FOR-TDC command from CPU 68 to FF 588 (FIG. 4). Upon the next successive TDC pulse to FF 588, a high level data signal is provided to FF 573. FF 573, in response to the next incremental pulse (e.g. KLICK), generates a DMA request (DMAREQ0) to initiate loading data from ADC 56 to RAM 70 (or RAM 64). After the completion of a correlation operation, as will be explained, and until such time as CPU 68 generates an APUSTART command, FF 590 generates an active MAS* signal to enable bidirectional tri-state drivers 268 and 262 and address buffers 211 and 210. The system thus assumes an effective configuration, schematically illustrated in FIG. 9A, in which CPU 68 and DMA 58, through system bus 69, exercise immediate control over data transfers with correlation unit RAMS 62 and 64 and presetting iteration counter 280.

Referring to FIGS. 6A and 9A, in the data acquisition mode, scanner data is written into RAM 64 via bus 69. If indicia of a reference pattern have not already been established in RAM 62, the data in RAM 64 is tested for suitability as a reference pattern. If the data is suitable, indicia of the reference pattern are derived from the data, and installed in RAM 62 through system bus 69. Once indicia of a reference pattern are established in RAM 62, correlation unit 71 generates indicia of a new pattern in RAM 64.

Figure 10A:
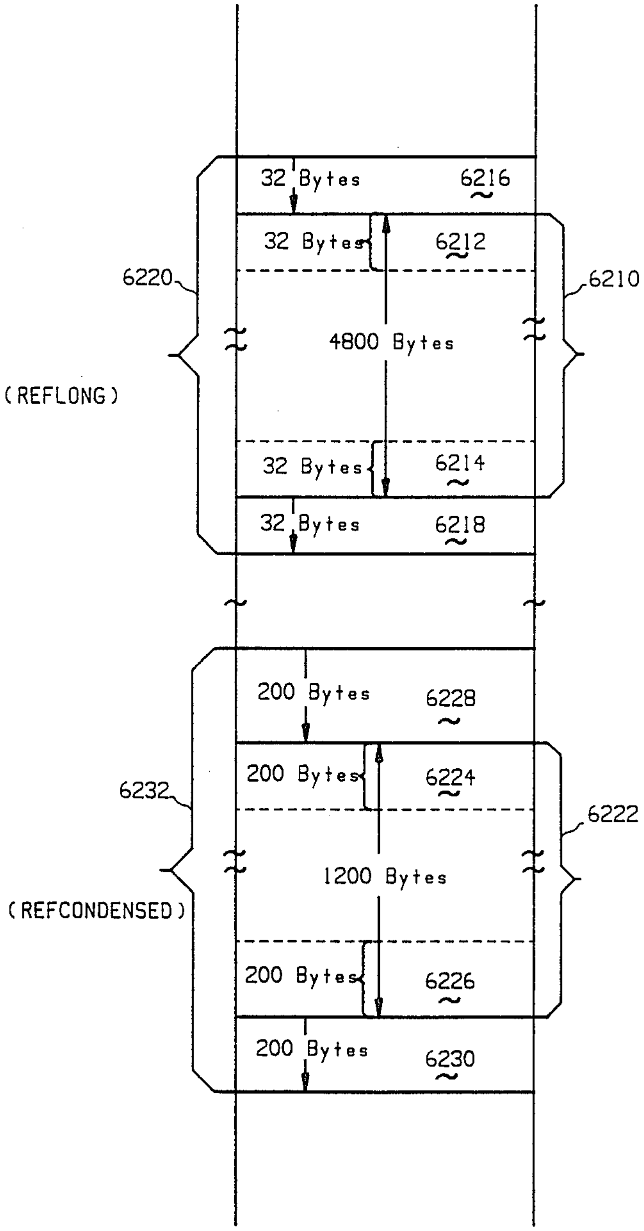
FIGS. 10A and 10B are diagrams detailing the creation of extended reference arrays used in the correlation process.
Figure 10B:
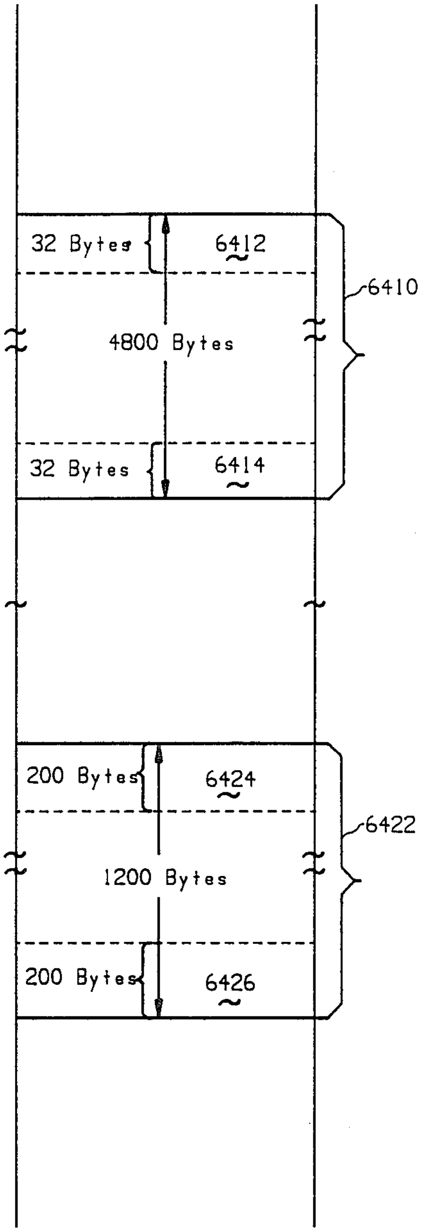

More specifically, referring to FIGS. 9A, 10A and 10B, during an initial data acquisition mode operation, a complete set of bytes corresponding to each incremental advancement in the machine (e.g., cutting) cycle (KLICK) between successive TDC pulses, is loaded by DMA 58 into predetermined sequential locations in RAM 64, creating a 4800-byte array 6410. Array 6410, sometimes referred to as "fine resolution" array or "fine" array 6410, is illustrated schematically in FIG. 10B. If the data in array 6410 meets predetermined criteria, a 1200-byte array 6422 (FIG. 10B), sometimes referred to as a "coarse resolution" or "condensed" array 6422, is created by averaging each successive group of four sequential locations in array 6410, and loading the averaged value into predetermined sequential locations in RAM 64. As will be discussed, condensed array 6422 is used to provide a coarse approximation of the degree of correlation between the reference pattern and the new pattern over a wide range of possible misalignment (e.g. ±8 inches). If indicia of a reference pattern are not resident in RAM 62 prior to generating coarse array 6422, the data in fine array 6410 is tested for suitability as a reference pattern, as will be explained. If flag LOCKED is set, RAM 62 has been loaded. Assuming a satisfactory test, after coarse array 6422 is generated, both fine array 6410 and coarse array 6422 are copied into RAM 62 as reference arrays 6210 and 6222.

To facilitate the correlation process, the fine and condensed arrays 6210 and 6222 representing the reference pattern are "expanded." The cross-correlation function of the reference 6210 and new pattern 6410 is generated by, in effect, successively calculating coefficients equal to the sum of the products of associated elements of the respective arrays, as the arrays are incrementally shifted in position relative to each other. A coefficient is generated for each shift in relative position. The correlation coefficient of greatest magnitude, i.e., the peak of the distribution, corresponds to maximum potential alignment between the new and reference patterns. As will be more fully explained, the correlation process is effected by selectively accessing the data in RAMS 62 and 64. Creation of expanded arrays makes it possible to avoid the necessity of utilizing complex addressing algorithms; generation of each of the coefficients is effected through direct incrementation of an array from a starting address.

Specifically, again with reference to FIGS. 10A and 10B, an expanded fine resolution reference array 6220 (sometimes referred to as REFLONG array 6220) is generated by reproducing the last 32 bytes (generally indicated as 6214) of fine resolution array 6210 in the 32 sequential locations (generally indicated as 6216) just preceding array 6210, and reproducing the first 32 bytes (generally indicated as 6212) of fine resolution array 6210 into the 32 sequential locations (generally indicated as 6218) immediately following array 6210. REFLONG array 6220 is thus 4864 bytes in length. In practice, the expansion is effected in conjunction with copying arrays 6410 and 6422 into RAM 62.

A similar process is used to generate an expanded coarse resolution reference array 6232 (sometimes referred to as REFCONDENSED array). A copy of the last 200 bytes of the coarse resolution array 6222 (generally indicated as 6226) are stored in the 200 sequential locations (generally indicated as 6228) just preceding a copy of the original 1200 byte coarse array 6222, and a copy of the first 200 bytes of the coarse resolution array 6222 (generally indicated as 6224) is stored in the 200 sequential locations immediately following the copy of the original condensed array 6222 (generally indicated as 6230). Thus, REFCONDENSED array 6232 is 1600 bytes in length, and contains all of the image information contained in the larger array 6220 with some reduced resolution. The array generation process is described in more detail in conjunction with FIGS. 16A and 16B.

In operation, during a coarse resolution correlation, as the contents of new pattern array 6422 are "shifted", the original reference array 6222 will appear to "wrap around" the new pattern array 6422. That is, once the last byte of the original 1200 byte pattern is tested, the next successive byte to appear is the first byte of the original 1200 byte pattern. This process allows the correlator to shift one pattern with respect to the other over a limited range without resorting to a complicated software based addressing scheme. A fine resolution correlation using REFLONG array 6220 and fine array 6410 provides an apparent "wrap around."

In the data acquisition mode, after the REFLONG and REFCONDENSED arrays 6220 and 6232 have been generated in RAM 62, data from subsequent cutting cycles are loaded by DMA 58 (or from system RAM 70) into the 4800 sequential locations of fine resolution array 6410 in RAM 64 (FIG. 10B), and coarse array 6422 generated. Once RAM 64 has been loaded with the new pattern array 6410, and the 1200 byte coarse array 6422 has been generated, the correlation process begins.

Figure 9B:
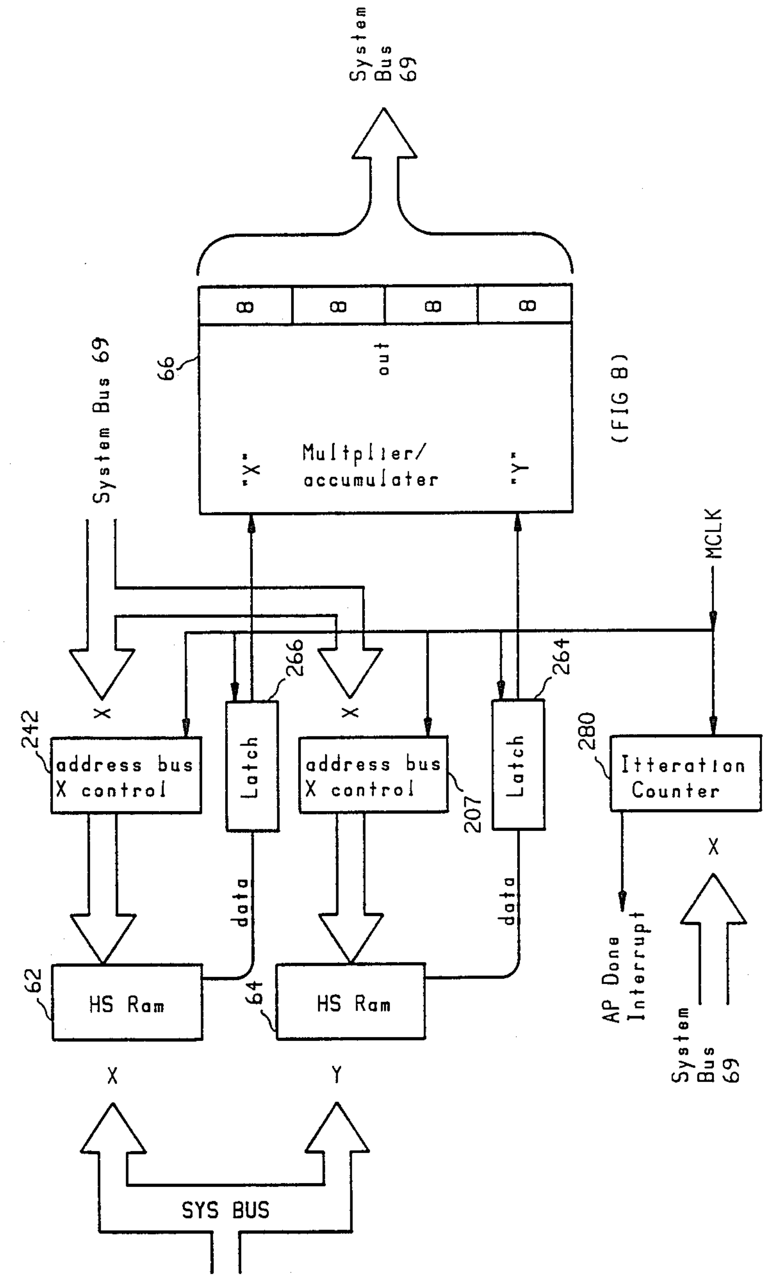

When RAMs 62 and 64 contain indicia of complete signatures, system 10 enters the correlation mode. Specifically, referring again to FIGS. 6A and 7, CPU 68 generates an APUSTART command to effectively preset FF 590 when iteration counter 280 generates an APDONE signal (FIG. 7). The MAS* signal is thus driven inactive, and the LOC* signal, and ultimately the CEP* signal, are driven active, together with the read and chip select signals to RAMS 62 and 64 (LOCARD*, LOCBRD*, LOCACS*, LOCBCS*). System 10 thus assumes an effective configuration, schematically illustrated in FIG. 9B, in which tri-state drivers 260 and 262 are ultimately disabled, constant read and chip select signals 230, 231, 234 and 235 are provided to RAMs 62 and 64, and address generator 242 and 207 and iteration counter 280 are enabled with respect to a MATHCLK signal. CPU 68 is thus ultimately denied access to high speed RAMS 62 and 64, and sequencing of operation is effected by control logic 67 and address generators 242 and 207. Referring again to FIGS. 6A and 9B, the MATHCLK signal increments address generators 242 and 207 and iteration counter 280 and latches data from RAMs 62 and 64 into latches 266 and 264, respectively. Address generators 242 and 207 provide addressing for RAMs 62 and 64. The MCLK signal (synchronous with, but delayed with respect to, MATHCLK), from gate 610 (FIG. 7) of control logic 67 clocks sum-of-product generator 66 (FIG. 6A).

More specifically, responsive to a ready signal generated by DMA 58, CPU 68 loads (through system bus 69 and tri-state buffers 210 and 211) the starting address of REFLONG array 6220 (or REFCONDENSED array 6232) into address generator 242 (associated with RAM 62), the starting address of new pattern array 6410 (or condensed array 6422) into address generator 207 (associated with RAM 64), and iteration counter 280 to a value corresponding to the number of bytes in the new pattern array (4800 or 1200).

CPU 68 then triggers APU control logic 67 by issuing APU start signal. Control logic 67 disables tri-state buffers 210 and 211 and enables address generators 242, 207 (i.e., generates an active CEP* signal).

A sum-of-products correlation coefficient is then generated in a pipeline fashion, sequenced by the MATHCLK signal from control logic 67. After the starting addresses are stored in address generators 242 and 207, and counter 280 has been initialized, upon each successive MATHCLK pulse, the following events occur: (1) the contents of the designated locations of RAMS 62, 64 are written into latches 266 and 264; (2) address generators 242 and 207 are incremented to point to the next sequential address in the reference and new pattern arrays, respectively; and (3) iteration counter 280 is decremented. Concurrently, upon each successive MCLK pulse (synchronous with MATHCLK but delayed by one clock cycle): (4) a new accumulated value, reflecting the previous contents of latch 274, is established; and (5) the product from multiplier 270 is written into latch 274. This process continues until iteration counter 280 counts out, whereupon a "done" signal is generated to APU sync logic 67, indicating that a sum-of-products correlation coefficient calculation has been completed. CPU 68 then accesses the contents of accumulator 276 through bus 69 and drivers 278, and stores the generated correlation coefficient in RAM 70 (FIGS. 1 and 2).

After allowing for the flushing of the sum-of-products pipeline, sync logic 67 enables control of correlation unit 71 by CPU 68; an active CEP* signal is generated by FF 608 to enable tri-state buffers 210 and 211. CPU 68 then loads address generators 242, 207 with the appropriate starting addresses corresponding to a "shifted" reference array; the address (in address generator 242) of the starting location within RAM 62 (reference pattern) is incremented by one with respect to the previous starting address. Incrementing the starting address in this way effectively shifts the reference array with respect to the new pattern array in RAM 64, for calculation of the next correlation coefficient. CPU 68 maintains a count of the number of correlation coefficients generated (correlation coefficient counter 7002; FIG. 2A). The correlation coefficient count is suitably used as a relative address offset (relative to the beginning of the reference array); the starting address loaded into address generator 242 at the beginning of each successive calculation is equal to the starting address of the reference array (REFLONG 6220 or REFCONDENSED 6232) plus the contents of correlation coefficient counter 7002. In practice, as shown in FIG. 2A, two correlation coefficient counters 7002 and 7003 are employed; counter 7002 counts up from zero to provide the aforementioned relative address and counter 7003 counts down from the total number of coefficients in the array being created, as will be described in conjunction with FIG. 20.

The cross-correlation between the new and reference signatures is represented by a sequence of a predetermined number of cross-correlation coefficients. For a fine resolution correlation, 64 correlation coefficients are generated from REFLONG array 6220 and new pattern array 6410 (FIG. 9B, 10A) and stored in a first portion (7004A) of cross-correlation coefficient array 7004 in RAM 70 (shown in FIG. 2B). The relative location of the individual coefficient in the array is determined by the contents of correlation coefficient counter 7002, as will be explained. For a coarse resolution cross-correlation, 400 correlation coefficients are generated from REFCONDENSED array 6232 and condensed new pattern array 6422, and maintained in a second portion (7004B) of cross-correlation coefficient array 7004. The coarse correlation, in effect, covers a wider range of relative positional shifting between the new and old reference signatures.

In the preferred embodiment, the correlation process is effected with respect to both the condensed and the fine arrays. Condensed arrays 6232 and 6422 are used to provide a rough estimate of the degree of correlation to verify that the new pattern image is significantly similar to the reference, thus preventing the system from locking onto a spurious pattern or peak of correlation. Fine reference arrays 6220 and 6420 are used to provide an absolute indication of pattern position error.

After a correlation process is completed, RAM 70 contains an array of 32 bit sum-of-products correlation coefficients. The array represents the degree of cross-correlation between the reference patterns and the new patterns. As will be explained, CPU 68 analyzes the correlation of the fine arrays to determine the correlation coefficient corresponding to the peak of correlation. The value of the individual cross-correlation coefficients corresponds to the degree of alignment between the new and reference patterns, as the patterns are incrementally offset in position by a discrete amount determined by the data sampling interval. The array is generated synchronously with the incremental shifting of the patterns. If the patterns are aligned with respect to the machine cycle, the largest coefficient will occur at the midpoint of the array. The relative location of the largest coefficient in the array thus reflects the positional offset between the patterns. Since 4800 pulses are generated for each rotation of the cutting drum, each data sample corresponds to a 00.01 inch movement of the web (assuming a 48-inch repeat, i.e., web travel per cutting cycle); each 32-bit correlation coefficient in the fine arrays corresponds to increments of 00.01 inch relative displacement. Thus, determining the coefficient corresponding to the peak indicates the degree of displacement to a resolution of 00.01 inch.

Figure 11:
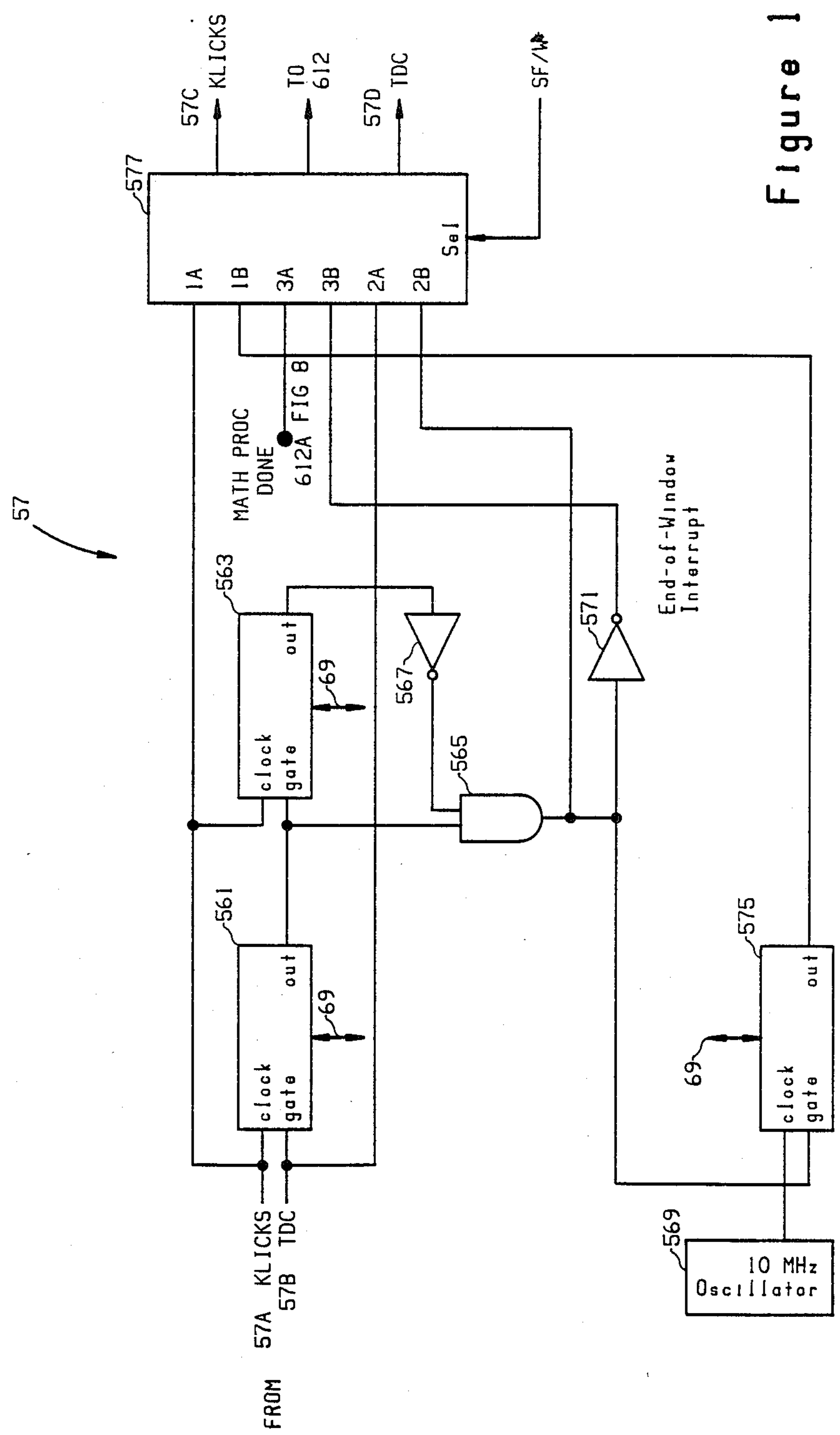
FIG. 11 is a block schematic of expansion generator circuitry in accordance with one aspect of the present invention for creating a high-resolution window.

As previously noted, a higher resolution may be provided for one or more portions of the machine cycle, by an optional expansion generator 57. Referring to FIG. 11, expansion generator 57 suitably comprises respective conventional programmable dividers/counters 561, 563, and 575 (e.g., INTEL 8254 programmable counters), a 10 MHz clock 569, a two-input AND gate 565, respective inverters 567 and 571, and a conventional multiplexer 577. Expansion generator 57 is operatively interposed in sync unit 54 at points 57A and 57B (and in correlation unit 71 at point 612A, seen in FIG. 7).

Selection of normal resolution and high resolution operation is effected by MUX 577; MUX 577 selectively provides at its output terminal the signals applied at one or the other of its A and B sets of input terminals, in accordance with the state of a select signal SF/W*.

The A set of input terminals, associated with regular operation, have applied: (1A) the incremental advancement pulses from pulse generator 570 (FIG. 4); (2A) the latched TDC signal from flip flop 588 (FIG. 4); and (3A) the delayed APDONE signal from the Q/output of FF 608 (FIG. 7). The B set of inputs are associated with high resolution operation, as will be described.

For high resolution operation, a signal having an active state contemporaneous with the duration of the window is applied to input 2B of MUX 577. Programmable counters 561 and 563, inverter 567 and AND gate 565 cooperate to define a high resolution (high sample rate) window corresponding to a portion of the machine cycle. The incremental pulses (KLICKS) from pulse generator 570 are coupled to the clock inputs of programmable dividers 561 and 563. The TDC signal from flip flop 588 (FIG. 4) is coupled to the gate input of divider 561. The output of programmable divider 561 is coupled to the gate input of programmable divider 563, and to one input of AND gate 565. The other input of AND gate 565 is coupled to the output of counter 563 through inverter 567. Indicia of the point in the machine cycle at which high resolution is to begin (e.g., the number of KLICKS from pulse generator 570, occurring between the TDC pulse and the start of the window) is loaded (by CPU 68 via bus 69) into programmable divider/counter 561, and indicia of the duration of the window (e.g., in terms of KLICKS from pulse generator 570) is loaded into programmable divider 563. When programmable divider/counter 561 reaches its terminal count, its output goes high, enabling programmable divider 563 and AND gate 565. Counter 563 then commences to count KLICK pulses, generating a high level signal only at the end of the programmed window duration. AND gate 565 thus generates a high level signal only during the high resolution window. The output of AND gate 565 is applied to the 2B input of MUX 573 as the counterpart of the latched TDC output of flip flop 588.

A signal having a frequency corresponding to the desired resolution is applied to input 1B of MUX 573. AND gate 565 enables programmable divider 575 for the duration of the high resolution window. Programmable counter 575 is preloaded with a number appropriate to derive a clock signal corresponding to the desired resolution from 10 MHz clock 569, and operates in an auto-reset mode. The output of divider 575 is applied to lB input of MUX 577, as the high-resolution counterpart of the KLICKS signal from pulse generator 570.

A signal indicative of the end of the window is applied to input 3B of MUX 577. When programmable divider 563 reaches its terminal count, the output of AND gate 565 goes low, disabling counter 575, and generating, through inverter 571, an end-of-window interrupt. The end-of-window interrupt is applied to input 3B of MUX 577, as a counterpart to the delayed "AP Done" signal from flip flop 608 (FIG. 7).

Control of MUX 577 is preferably effected, (i.e., signal SF/W* generated) by CPU 68.

Figure 12:
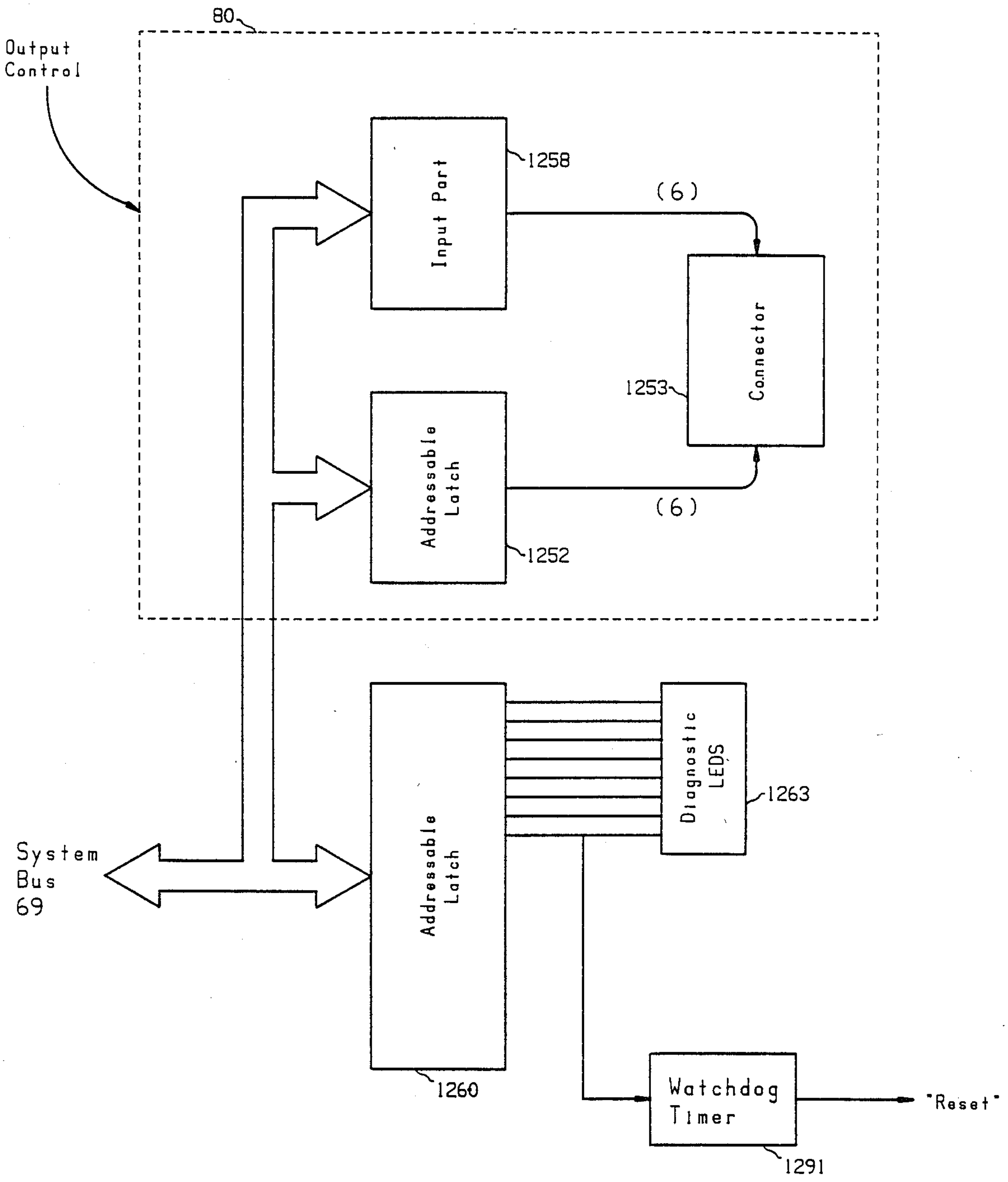
FIG. 12 is a block schematic of an exemplary output control.

After relative displacement of the new and reference patterns is determined, CPU 68 generates a compensation signal to output control unit 80. Referring to FIG. 12, output control 80 suitably comprises a conventional addressable latch 1252 and input port 1258, each coupled to bus 69. Compensation signals from CPU 68 are received by latch 1252 and applied to relays 84 (FIG. 1) through a suitable connector 1253. Feedback signals from motor 30 are provided to CPU 68 through input port 1258.

If desired, respective displays (e.g., LEDs) 1263 can be provided to facilitate diagnostics. Similarly, a suitable watchdog timer 1291 can be employed to generate a reset signal to CPU 68, if not itself reset by CPU 68 within a predetermined period. LEDs 1263 and timer 1291 are suitably coupled to bus 69 through an addressable latch 1260.

Referring now to FIG. 13, the overall operation of CPU 68 will be described. When the system is powered on, the system begins execution of a "background" routine 1300. The system first performs a hardware test (Step 1302) which checks for ROM, RAM and EEPROM error, gain control error, correlator error, A/D converter error and D/A converter error, and sets flags accordingly (Step 1304). Those skilled in the art will appreciate that many error detecting algorithms may be employed to determine the presence of a failure in computer hardware peripherals. The remainder of routine 1300 constitutes a main program loop 1305, which operates continuously during the time the cutoff control system is operational.

The initial step in main program 1305 is to determine whether data has been sent from the keyboard module 78 to CPU 68 and make necessary updates (Step 1306). The keypad entry and updating is suitably effected utilizing standard interrupt-driven routines for characters input and polling routines for Command decoding.

Data collection and processing unit 37 is suitably capable of operating in automatic or manual modes. After keypad entries are acquired and processed, alternative sequences, in accordance with the operational mode of the system, are effected. Specifically, an automatic mode flag Q (FIG. 2A) is tested to determine the desired mode (Step 1310). If the manual mode has been selected, a motor control subroutine (1316) is executed. In general, motor control subroutine 1316 alters web position compensation by selectively activating the compensator motor 30 to change the position of compensating roller 24 (FIG. 1) and maintains a timer used to inhibit overly rapid change in position. In the manual mode, the position of roller 24 is adjusted in accordance with operator entries. If the automatic mode has been adopted, the system acquires signature information or, after the necessary data has been collected, computes position error, validates the computations, and effects adjustments accordingly.

More specifically, assuming automatic mode operation, the system first determines whether or not signature data is resident in correlation unit 71. To this end, in the instance that DMA 58 loads data into intermediary buffers in RAM 70 rather than directly into the correlator RAMS 62 and 64, a flag 'Z' (sometimes referred to as the "RAM-loaded-Z flag" in RAM 70 is tested to determine whether DMA 58 has completed a data collection cycle (Step 1314). If data collection has not been completed, system continues to accept new data and enters motor control routine 1316.

If data collection has been completed, (flag Z indicates that at least RAM 64 has been loaded), the system calls a computation subroutine 1322. In general, subroutine 1322 determines if a reference pattern has been established, and if not, generates indicia of the reference pattern in RAM 62; determines deviation in web position, if any, of new signatures (new patterns) from the previously generated signature (reference pattern); detects the occurrence of data acquisition errors; and sets flags accordingly. Computation Routine 1322 will be described in conjunction with FIG. 14A.

Data acquisition errors can result from a variety of conditions, including noise on the input signal, the inability to recognize a pattern currently being processed, or from the press speed being too low. If a processing error occurs, calculated position deviation (error) information is invalid. Accordingly, the various processing error flags are tested for indicia of a processing error (Step 1320) and motor control subroutine 1316 employed to compensate for position error only if no processing errors have occurred. If a processing error is detected, all position error information is cleared (Step 1325), the type of error identified (Step 1326), and an appropriate message sent to keyboard module 78 for display (Step 1328). After the error message has been sent to the display, a pause flag is set to facilitate display of error indicia (Step 1324). DMA 58 is then enabled and the DMA busy flag and RAM-loaded flag are appropriately set. The system then enters motor control subroutine 1316.

Referring now to FIG. 14A, computation subroutine 1322 first determines whether the 'system locked' flag (V flag) has been set (Step 1410). The system locked flag (V flag) indicates that the system has acquired sufficient data to begin web position error computation, i.e., that indicia of both the reference pattern and the new pattern are resident in correlation unit 71.

If the flag is not set, (Step 1410) indicating that indicia of the reference pattern is not yet resident in correlation unit 71, reference indicia is generated in RAM 62. The system first determines whether the gain parameter for analog input devices has been set to ensure that the image signal is within a range of amplitudes compatable with flash ADC 56 (Step 1428). If gain control has not previously been set, a gain control subroutine 1408 is executed, DMA 58 released (Step 1424) (Z flag cleared) and a return to main loop 1305 effected. Gain control subroutine 1408 will be discussed in more detail in conjunction with FIG. 14B.

Assuming that the gain parameter has been set, the data in fine array 6410 of RAM 64 is normalized (centralized) to ensure that system 10 is operating with an optimum data set. The normalization process removes any DC offset information (e.g., ambient components) from the pattern data to ensure that it will not affect the result of the correlation computation. In effect, the average (mean) value of the data within the array is computed by summing all the bytes in the array and dividing that sum by the total number of bytes (Step 1440), then subtracting the mean value from each element of the array. Normalization (centralization) can be fully implemented in software, computing the mathematical mean after the array is resident in RAM, then subtracting the mean from each element in sequence. Such an implementation is, however, relatively time consuming. Accordingly, it may be desirable to modify correlation unit 71 to effect normalization of new pattern arrays during the course of generating the array. A suitable hardware-augmented normalization process 1440 will be described in conjunction with FIGS. 6B and 15.

Once fine array 6410 has been centralized, condensed array 6422, (referred to in conjunction with FIGS. 9B and 10A), is generated (Step 1448). As mentioned above, the condensed array is formed by averaging every 4 data bytes to generate a composite byte which represents the average of the 4 bytes.

Fine array 6410 and condensed array 6422 are then used to create expanded reference arrays 6220 and 6232 in RAM 62 (as described in conjunction with FIGS. 9B and 10A) (Step 1436). The creation of expanded arrays 6220 and 6232 will be described in conjunction with FIGS. 16A, 16B and 17.

Figure 18:
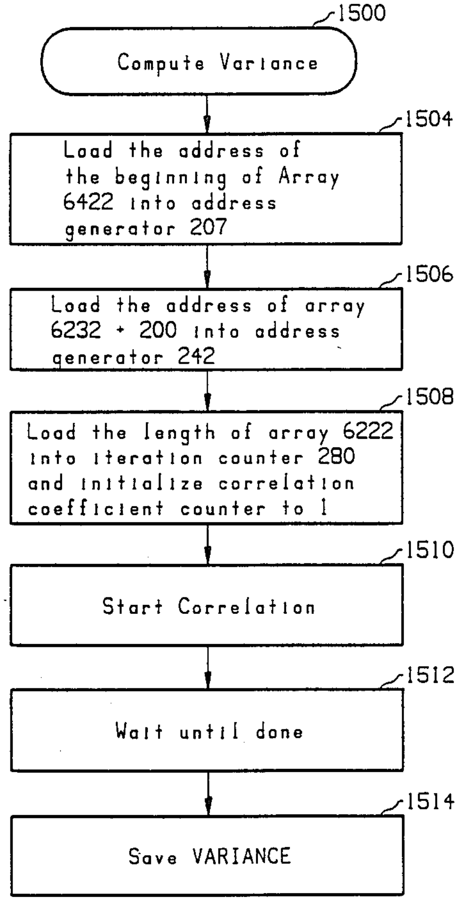
FIG. 18 is a flow diagram of an exemplary embodiment of the variance called by the computation routine of FIG. 14A.

The degree of variance of the reference pattern is then determined (e.g., the value of the maximum auto correlation element computed), as will be described in conjunction with FIG. 18 (Step 1500). Once the variance has been computed and stored in RAM 70, the system locked flag (V flag) is set (Step 1450), DMA 58 released to permit further data processing (Step 1424), and a return to main loop 1305 effected (Step 1428).

When computation routine 1322 is entered after indicia of both the new pattern and reference pattern are already resident in correlation unit 71 (i.e. reference arrays 6220 and 6232 are in RAM 62 and Z flag set), one of alternative position error detection modes (pattern recognition or cutmark recognition), is entered. Assuming the locked flag is set (Step 1410), the system determines which position error detection mode has been requested (Step 1411), and accordingly executes either a mark position error computation routine 2200 (described in detail in conjunction with FIG. 26), or a pattern position error computation routine 1600 (described in conjunction with FIG. 19 (Step 1600).

Assuming pattern recognition mode operation, upon return from pattern position error computation subroutine 1600 (FIG. 19) a test is made for pattern recognition errors detected in the course of subroutine 1600 (Step 1422). If no pattern recognition errors were detected, the pattern recognition error flags are cleared (Step 1420), DMA 58 is released for further data collection activity (i.e., the Z flag is cleared) (Step 1424), and control is returned to background routine 1300 (Step 1428). If, on the other hand, errors were detected by position error computation subroutine 1600, the appropriate pattern recognition error flags are set (Step 1430), DMA 58 is released (Step 1424), and control is returned to background routine 1300 (Step 1428).

Figure 14B:
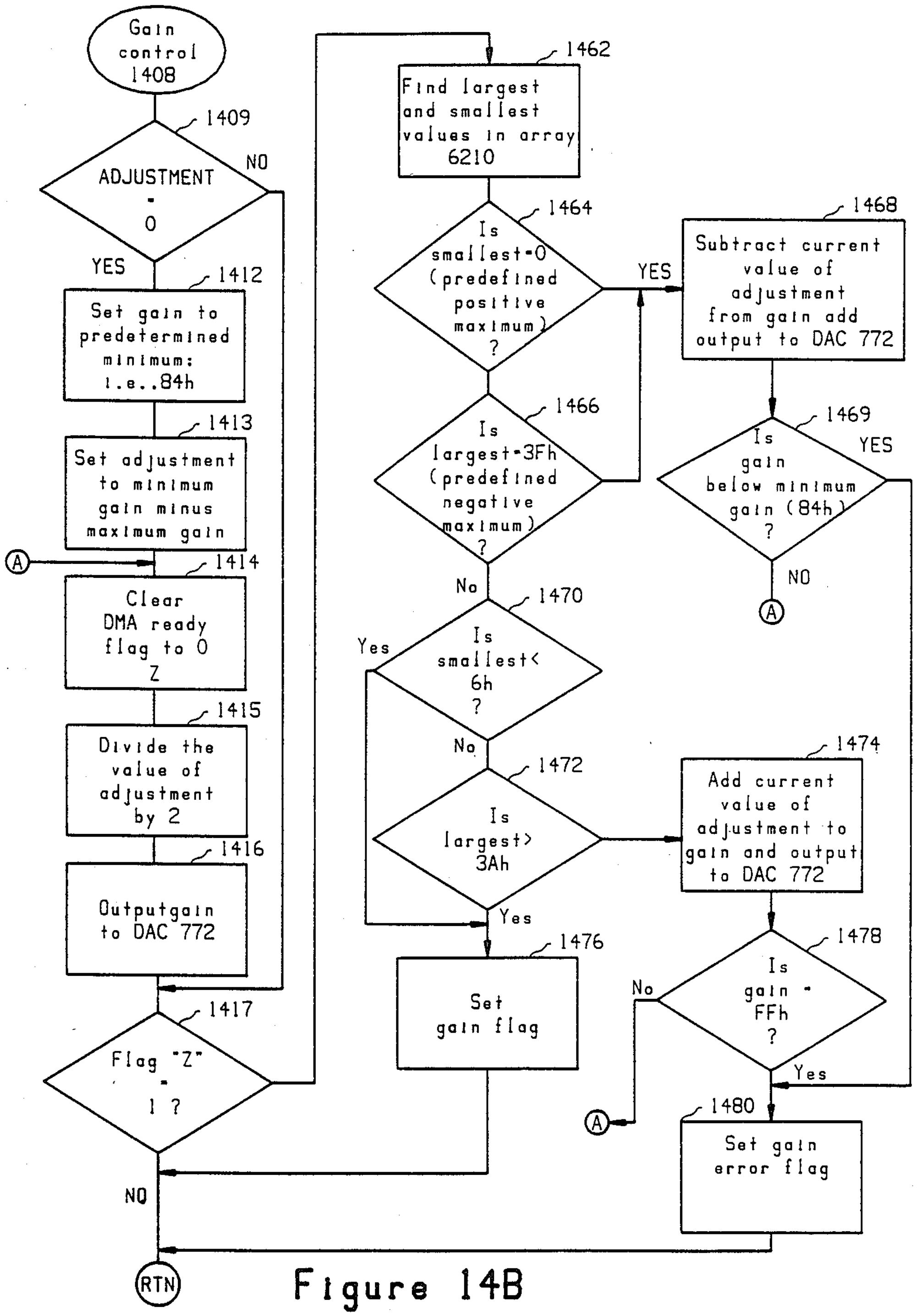
FIG. 14B is a flow diagram of an exemplary embodiment of the gain control subroutine activated by the computation routine of FIG. 14A.

Referring now to FIG. 14B, gain control subroutine 1408 will be described. Gain control routine 1408 provides for adaptive control of the GAIN parameter, the factor by which multiplying DAC 772 multiplies the image signal (FIG. 5B). Gain is controlled to facilitate the use of flash ADC 56. Upon initiation of gain control subroutine 1408, a test for prior entries into the subroutine is made (Step 1409). Specifically, the value of a variable ADJUSTMENT (in location 7020, FIG. 2B) is tested. ADJUSTMENT is utilized in adaptive adjustment of the GAIN parameter, and represents a discrete amount by which adjustments to GAIN are made. If the value of ADJUSTMENT is zero, then gain control subroutine 1408 is being entered for the first time.

Assuming that gain control subroutine 1408 is being entered for the first time, a sequence of gain initialization steps is effected. The variable GAIN (location 7022, FIG. 2B) is set to a predetermined minimum value, (suitably 80 hexadecimal) to ensure that the value initially generated by multiplying DAC 772 corresponds to a negative number (step 1412). The variable ADJUSTMENT (7020) is then set equal to a predetermined value (e.g., 7F hexadecimal) corresponding to the maximum differential (maximum GAIN minus minimum GAIN) physically possible (step 1413).

The Z flag (DMA ready) is then cleared to zero to indicate that suitable indicia of the new pattern is not yet resident in correlation unit 71 or RAM 70 (Step 1414). The value of ADJUSTMENT (location 2070) is divided by two (step 1415), and the value of GAIN is provided through bus 69 to multiplying DAC 772 (FIG. 5B) (step 1416).

After the GAIN value has been provided to DAC 772, the Z flag is tested to determine if a full set of data is resident in RAM 64 (step 1417), and if not, a return to computation routine 1322 is effected. In the initial entry, the Z flag was cleared to zero, so a return is effected.

In subsequent entries into subroutine 1408 (ADJUSTMENT not equal to zero), initialization steps 1412–1416 are omitted, and the Z flag immediately tested (step 1417).

Assuming array 6410 is resident in RAM 64 (Z flag equal 1), the values of the largest and smallest elements of array 6410 are determined (Step 1462) and tested to ensure the data is within a range of values corresponding to the input range of ADC 56. The magnitude of the smallest element in the array is tested to determine if it is within the range corresponding to a maximum permitted scanner output (Step 1464). In the event the magnitude of the smallest element is 0, the scanner gain is adjusted to avoid saturating the signal in the scanner output channel (Step 1468). The adjustment to scanner gain is suitably adaptive, achieved by subtracting the value of ADJUSTMENT (7020) from GAIN.

If the smallest element of the array was nonzero, the system then compares the magnitude of the largest element of the array with a predefined "negative maximum" value (e.g., 3F hex) (Step 1466). If the magnitude of the largest element equals the predefined "negative maximum" value, scanner gain must similarly be decreased (Step 1468).

After an adjustment is made to the gain, the gain value is tested against the predetermined minimum gain value (e.g., 84 hexadecimal) (Step 1469). If the adjusted Gain is not below the minimum value, the Z flag is reset to zero (Step 1414), the value of Adjustment divided by two (Step 1415), and the adjusted GAIN output to multiplying DAC 772 for use in connection with the next cycle of data. The Z flag (just reset) is tested, and a return to computation routine 1322 effected.

If, however, the gain is below the predetermined minimum (Step 1469), a gain error flag is set (Step 1480) and an immediate return to computation routine 1322 effected.

If the magnitude of the smallest and largest elements in the array do not equal the predefined "positive maximum" and "negative maximum" values, then the system determines whether the magnitude of the elements of the array are within an acceptable range. The value of the smallest element is tested (Step 1470) and if e.g., less than 6, the GAIN set flag is set (Step 1476) and a return to computation subroutine 1322 (FIG. 14A) effected. If the magnitude of the smallest element maximum is not within the acceptable range, the system will then determine whether the largest element is within an acceptable range (Step 1472). If the negative maximum is, e.g., greater than '3A' hex, the gain flag is set (Step 1476) and a return effected to routine 1322 (FIG. 14A). If neither the largest or smallest element of the array are within the acceptable range, scanner gain is increased by adding the value of ADJUSTMENT (7020) to the value of GAIN (7022) (Step 1474).

After the value of GAIN has been increased, it is tested to determine if a predefined maximum value has been reached (Step 1478). If scanner gain has reached a predefined maximum value (e.g., FF hex), a gain error flag is set to indicate that the scanner output signal is too low and that a gain error has occurred (Step 1480). A return to subroutine 1322 (FIG. 14A) is then effected. If scanner gain is still below the predefined maximum value (after being increased), a return to routine 1322 (FIG. 14A) is effected without setting either the gain flag or the gain error flag.

As previously noted, in computation routine 1322 (FIG. 14A), after the coarse array in RAM 64 is computed, the fine and coarse arrays are employed to generate expanded arrays 6220 and 6232 (FIG. 10B) in RAM 62 (Step 1436). Referring to FIGS. 10A, 10B, 16A, 16B, and 17, expanded array 6220 is created by first copying a block of data from an end portion 6414 (e.g., the last 32 bytes) of fine array 6410 in RAM 64 into the beginning portion 6216 of expanded array 6220. Specifically, the addresses of the beginning and end of fine array 6410 in RAM 64, and the beginning of REFLONG array 6220 in RAM 62 are obtained (Step 2504). The number corresponding to the desired expansion ("wrap-around") (e.g., 32) is then subtracted from the end address of fine array 6410 and the result loaded into a pointer ADDREFROM (Step 2506). Next, a counter (COUNTER2) is set equal to the number of elements in the expansion (e.g., 32) (Step 2508), and a pointer ADDRTO is then loaded with the address corresponding to the first byte of REFLONG (Step 2510). The block of data is then copied from RAM 64 into RAM 62 (Step 2512). Referring briefly to FIG. 17, the byte designated by pointer ADDREFROM is copied into the location designated by pointer ADDRTO (Step 2704). Pointers ADDREFROM and ADDRTO are then each incremented (Step 2708) and COUNTER2 decremented (Step 2712). The contents of COUNTER2 are then tested. (Step 2714). This process is repeated until COUNTER2 reaches zero, indicating that the complete block of data has been copied, whereupon a return to the calling routine is effected.

The full 4800 bytes of fine array 6410 in RAM 64 are then copied into expanded array 6420, beginning at the 33rd location. At this point, a copy of the last 32 bytes of fine array 6410 (the 32 bytes designated as 6218) has been loaded into the first 32 locations of expanded array (REFLONG) 6220; register ADDRTO contains the address of the 33rd location of expanded array 6220. The beginning address of fine array 6410 is loaded into pointer ADDREFROM (Step 2516), and COUNTER2 is set to a value corresponding to the length of fine array 6410, e.g., 4800. The copy sequence (described in conjunction with FIG. 17) is then executed to copy the full fine array (6410) into REFLONG (6220) beginning at the 33rd location (Step 2520).

A beginning portion 6412 (e.g., the first 32 bytes) of fine array 6410 is then copied into the end portion 6218 of expanded array 6220. The address of the beginning of fine array 6410 is loaded into pointer ADDREFROM (Step 2522), COUNTER2 is again set to 32 (Step 2524), and the copy sequence (described in conjunction with FIG. 17) executed to copy the first 32 bytes of fine array 6410 into the last 32 bytes of REFLONG (6220). Expanded fine array 6220, 4864 bytes in total, is thus created.

Figure 16A:
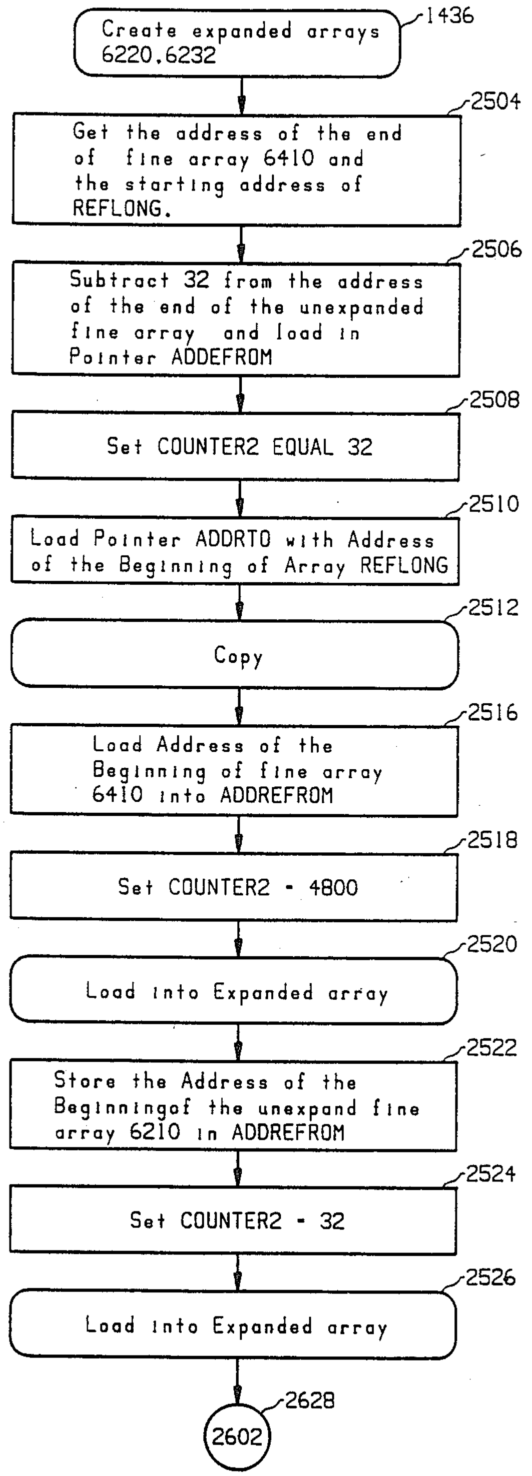
FIGS. 16A and 16B are together a flow diagram of the array expansion subroutine called by the computation routine of FIG. 14A.
Figure 16B:
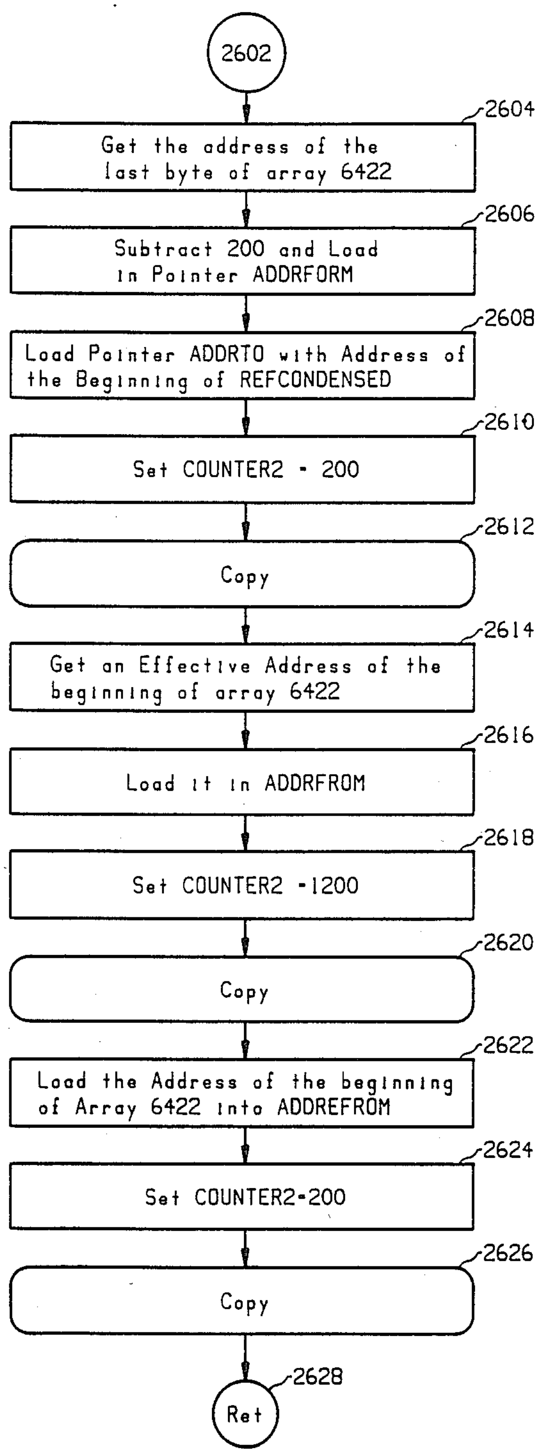

Referring now to FIG. 16B, expanded condensed array 6232 is similarly generated. The end portion of 6426 (e.g. last 200 bytes) of condensed array 6422 is copied to the beginning portion 6228 of REFCONDENSED array 6232. The address of the last byte of condensed array 6422 is obtained (Step 2604). The number corresponding to the desired expansion (e.g. 200) is subtracted from that address, and the difference stored in the register ADDREFROM (Step 2606). Register ADDRTO is loaded with the address corresponding to the beginning of expanded condensed array 6232 (Step 2608), and COUNTER2 is then set to 200 (Step 2610). The copy sequence (FIG. 17) is then executed to copy the last 200 bytes of condensed array 6422, at the beginning of REFCONDENSED (6232) (Step 2612).

The complete 1200 byte condensed array 6422 is then copied into the next succeeding locations in array 6232. ADDRTO, at this point, contains the address of the 201st location in array 6232. The address of the first byte of condensed array 6422 is loaded into ADDREFROM (Steps 2614, 2616), and COUNTER2 is set to 1200, the length of condensed array 6422 (Step 2618). The copy sequence (FIG. 17) is then executed to copy condensed array 6422 into REFCONDENSED (6232) starting at the location (200) designated by ADDRTO (Step 2620).

The beginning portion 6424 (e.g. first 200 bytes) of condensed array 6422 are then copied into the end portion 6230 (e.g. last 200 bytes) of array 6232. The address of the beginning of condensed array 6422 is loaded into ADDREFROM (Step 2622), COUNTER2 is set equal to 200 (Step 2624), and the copy sequence (FIG. 17) is executed (Step 2626). When complete, program control is returned to the routine of FIG. 14A (Step 2628).

As previously noted, after expanded arrays 6220 and 6232 are created in RAM 62, the variance of REFCONDENSED array 6232 is computed. In general, variance subroutine 1500 is executed after a reference signature has been collected but before a second signature (new pattern) has been generated, i.e., the gain flag is set but the system is not locked (V flag=0). Variance subroutine 1500 is used to define the maximum of auto-correlation of the reference pattern.

Upon initiation of subroutine 1500, the address of the beginning of condensed new pattern array 6422 is loaded into address generator 207 (Step 1504). The address of the beginning of REFCONDENSED 6232, offset by 200 (i.e. the starting address of the unexpanded condensed reference array 6222), is loaded into address generator 242 (Step 1506). The length of condensed array 6422 is then loaded into iteration counter 280, (e.g., 1200) and correlation coefficient counter 7002 is initialized to a value corresponding to the number of correlation coefficients to be generated, (e.g., 1) (Step 1508).

CPU 68 then generates an APU start command to APU control logic 67 (FIG. 7). A correlation operation is thus initiated, as previously described, resulting in the accumulation of the sum-of-products of unexpanded REFCONDENSED array 6222 and the condensed array 6422 (the value of the maximum auto-correlation of array 6222) in accumulator 276 (Step 1510). While correlation unit 71 is generating correlation data, CPU 68 polls the APUDONINT signal from APU control logic 67, generated when the sum-of-products result is available in accumulator 276 (Step 1512). The sum-of-products result, which corresponds to the maximum value of auto-correlation function of the condensed pattern, is stored as the variance value (Step 1514) and a return to computation routine 1322 is effected.

As may be recalled, position error computation subroutine 1600 is called by computation routine 1322 (FIG. 14A) in pattern recognition mode operation, after the system has locked (V flag=1), i.e., after indicia of both reference and the new patterns are resident in correlation unit 71.

Referring now to FIG. 19, upon initiation of subroutine 1600, the new pattern fine array 6410 is normalized (Step 1604). Normalization of arrays 6410 and 6422 can be implemented in software by computing the mean value of the elements of the array, and subtracting the mean from each individual element, in the same manner as described in conjunction with FIG. 14A. However, as previously noted, such an implementation is relatively time consuming, and the normalization process may be facilitated by hardware augmentation of correlation unit 71. Referring briefly to FIG. 6B, an 8-bit adder 265 may be interjected into correlation unit 71 at point 267. The output of latch 264 is provided at the A input of adder 265. An addressable latch 263, coupled to bus 69, provides data to the B input of adder 265. The output of adder 265 is applied to multiplier 270. The mean value of the array is generated by establishing the value 1 in a predetermined location in RAM 62, locking address generator 242 to a value corresponding to that location, then effecting a correlation operation on the new pattern array in RAM 64, with the value 1. Such a mock correlation generates the sum of the elements of the new pattern array in accumulator 276. The sum of elements is accessed by CPU 68, and divided by the number of elements in the array to establish the mean. The two's complement of the mean is then loaded into latch 263, and algebraically summed with each element in turn, effecting a subtraction so that normalized data is employed in the correlation process. The same mean value is used in connection with the generation of each of the correlation coefficients (64 or 400 depending on the resolution of the array). The necessity of reading and modifying data, then writing it back out to the locations in RAM 64 is thus avoided, and normalization can be effected in little more time than required to generate an additional correlation coefficient.

Figure 15:
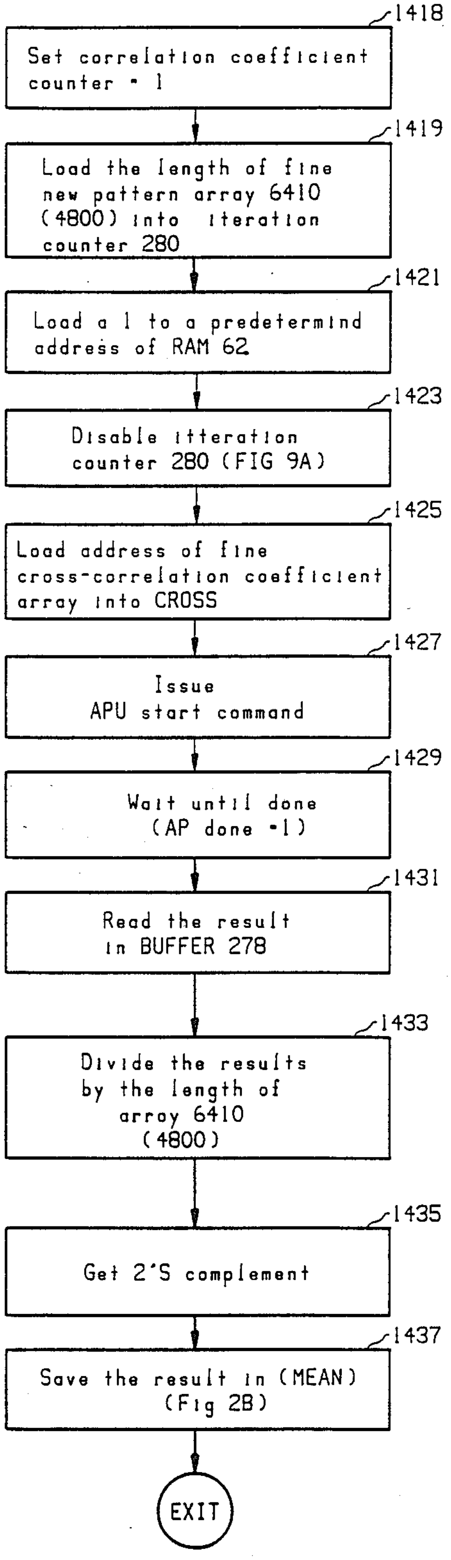
FIG. 15 is a flow diagram of the mean computation routine of FIG. 14A.

More specifically, referring to FIGS. 6A, 6B and 15, the mean is computed by first setting the correlation counter (7002, FIG. 2A) equal to 1 (Step 1418). The length (4800) of the new pattern array (6410) being operated upon is then loaded into iteration counter 280 (Step 1419). The address of the predetermined location in RAM 62 (containing a 1) is loaded into address generator 242 (Step 1421) and address generator 242 disabled with respect to the MATHCLK signal (Step 1423). The address of the first element of the fine cross correlation coefficient array in RAM 70 is loaded into the location denoted CROSS (Step 1425), CPU 68 then starts the correlation process by generating the APU start signal to FF 590 of APU control logic 67 (FIG. 7). The respective elements of the new pattern array in RAM 64 are then applied in sequence to latch 264, adder 265 and sum-of-products generator 66. During the operation of correlation unit 71, CPU 68 polls the AP DONE signal (from FF 612 of APU control logic 67) (Step 1429). As will be recalled, the AP DONE interrupt is generated when a complete sum-of-products is available in accumulator 276. Thus, in this instance, the AP Done signal is polled, and when present signifies that the sum of the elements in the new pattern array (6410 or 6226) is available in accumulator 276. The accumulated sum is read through buffer 278 and loaded into the memory location corresponding to the variable MEAN (1431). The sum is divided by the length of the new pattern array to determine the actual mean (Step 1433). The two's complement is then derived (Step 1435) and the complemented mean stored as the variable MEAN (Step 1437).

Referring again to FIG. 19, after the mean of the fine array is computed, a condensed new pattern array 6422 is then created (Step 1606), suitably in a manner identical to the corresponding procedures previously described in conjunction with FIG. 16A.

Cross-correlations are then effected:

between fine reference array 6220 and fine new pattern array 6410 resulting in 64 32-bit correlation coefficients being generated by correlation unit 71 and stored in array 7004A [FIG. 2A(2)] (Step 1610); and between condensed reference array 6232 and condensed new pattern array 6422 resulting in 400 32-bit sum-of-products correlation coefficients being generated by correlation unit 71 and stored in coarse array 7004B in RAM 70 (Step 1612).

Figure 20:
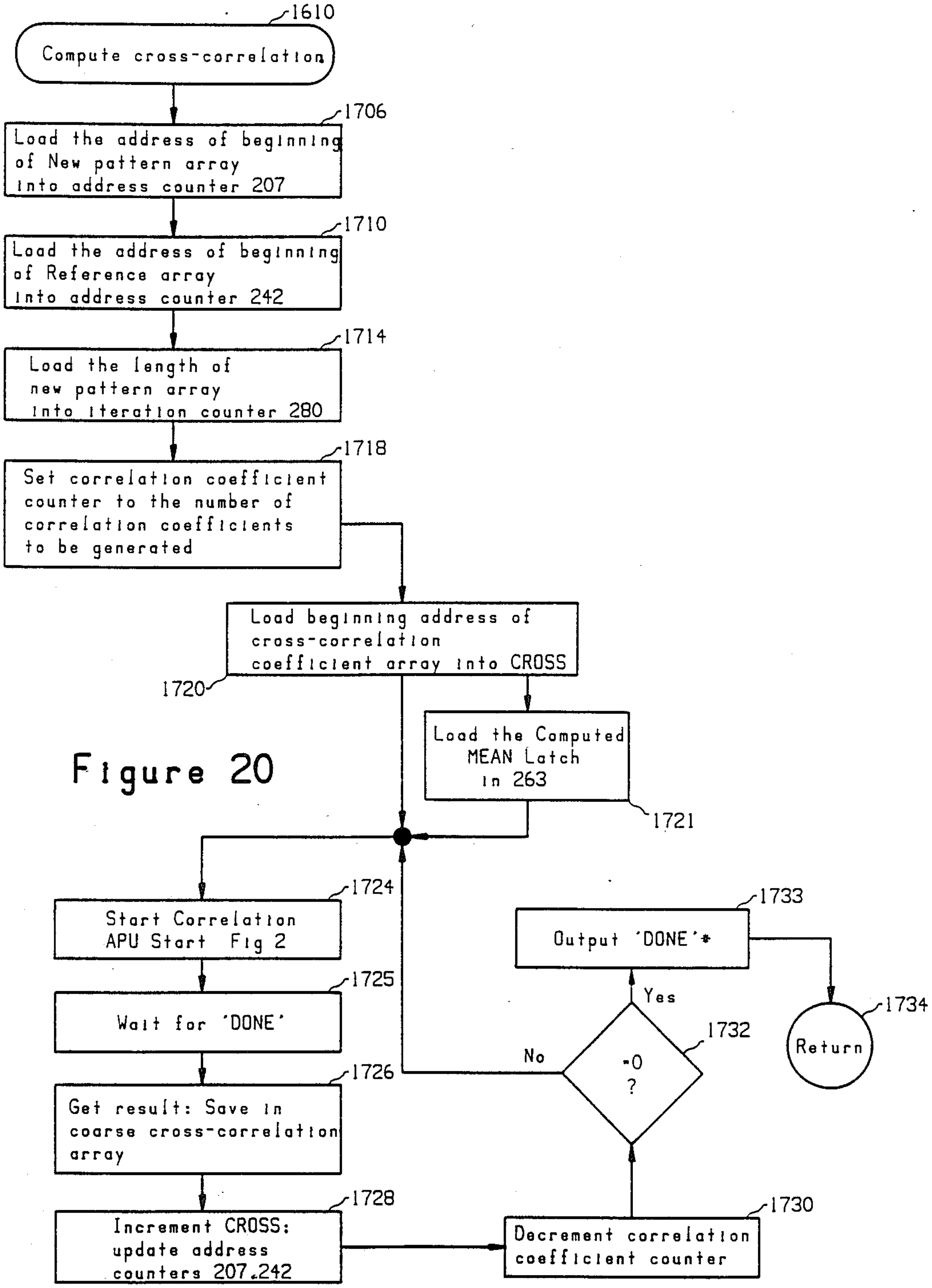
FIG. 20 is a flow diagram of an exemplary embodiment of the cross-correlation routine called by the position error computation routine of FIG. 19.

The generation and storage of the cross-correlation coefficients will further be explained in conjunction with FIG. 20.

Figure 21A:
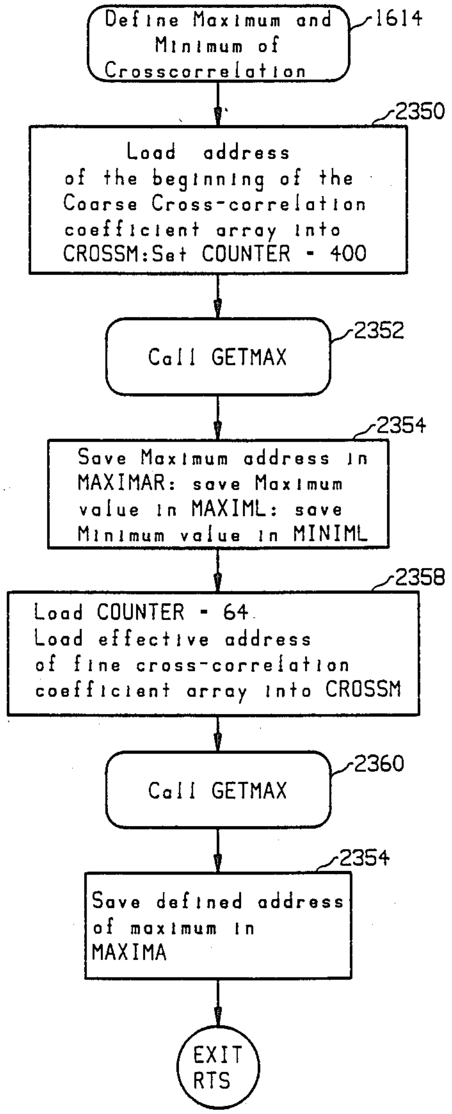
FIG. 21A is a flow diagram of the routine called by the position error computation routine of FIG. 19 to define the maximum of correlation.

Extrema (e.g. maxima, minima) information is then developed (Step 1614). The value and address of the maximum element and value of the minimum element in condensed cross-correlation array 7004B are determined and stored in RAM 70 locations (sometimes hereinafter referred to as registers) MAXIML 7006, MAXIMAR 7018, and MINIML 7007, respectively (FIG. 2A). The address of the maximum coefficient of fine array 7004A is also determined and stored in RAM 70 location MAXIMA 7008 (FIG. 2A). Step 1614 as will be more fully discussed in conjunction with FIGS. 21A and 21B.

The maximum and minimum values of coarse cross-correlation array 7004B are then tested against acceptance level criteria (Step 1620). Acceptance test subroutine 1620 will be more fully described in conjunction with FIG. 22.

If the acceptance criteria is not satisfied, an error flag is set to indicate the patterns do not correlate (Step 1622) and a return to computation subroutine 1322 (FIG. 14A) effected.

Assuming, however, that the acceptance criteria is satisfied, a symmetry subroutine 1640 is called to determine whether the computed cross-correlation function meets predetermined symmetry criteria (Steps 1640, 1642). A suitable symmetry routine 1640 will be described in conjunction with FIG. 23. If a symmetry error is detected, an error flag is set (Step 1622) and a return to computation subroutine 1322 (FIG. 14A) effected.

Assuming no symmetry error, indicia of the positional offset of the new pattern from the reference pattern is generated. As will be recalled, position error indicia is used by motor control routine 1316 (FIGS. 13, 31) to compensate for position error. A coarse measure of offset between the two patterns being tested is first obtained by determining the offset of the location of the maximum element in condensed correlation array 7004B from the center of the array (Step 1630). Step 1630 will be more fully described in conjunction with FIG. 24. The coarse offset value is then tested to determine whether the coarse offset is within ±1.0% of the number of coefficients in array 7604B, e.g., 4. If the offset is not within ±1.0%, the computed offset is multiplied by the condensation factor, (here 4), used to generate the condensed array and the result used as indicia of position error (Step 1634).

If, however, the offset determined in step 1630 is within ±1.0%, the precise position error is determined (Step 1626). The offset of the location of the maximum element of fine cross-correlation array 7004A from the center of the array is determined, and employed as indicia of position error. Step 1626 will hereafter be more fully explained in conjunction with FIGS. 25A and 25B. Once the indicia of position error has been generated, the pause flag is cleared (Step 1638) and a return to computation routine 1322 (FIG. 14A) is effected.

Referring now to FIG. 20, cross-correlation calculation subroutines 1610 and 1612 called by position error computation subroutine 1660 (FIG. 19) will be described. An initialization sequence is first effected. The address of the first byte of the new pattern array of interest (condensed array 6422 or fine array 6410) is loaded into address generator 207 (Step 1706). The address of the corresponding expanded reference array (condensed array 6232 or fine array 6220) is loaded into the address generator 242 (Step 1710). Iteration counter 280 is loaded with a value corresponding to the number of elements in the new pattern array, (e.g., 1200 or 4800) (Step 1714). Correlation coefficient counter is set to a value corresponding to the number of cross-correlation coefficients to be generated, e.g., 400 for the course array or 64 for the fine array (Step 1718).

As previously mentioned, cross-correlation coefficients are stored in array 7004 of RAM 70 (FIG. 2A). A register, designated CROSS (7010, FIG. 2A) is used as a pointer to indicate where in cross-correlation coefficient array 7004 a respective coefficient is to be written. For the coarse cross-correlation coefficients, CROSS is initially loaded with the address corresponding to the first byte of array 7004B, and for the fine array, it is loaded with the address of the first byte of array 7004A (Step 1720).

The APU start signal is then generated to initiate the correlation operation as previously described (Step 1724). CPU 68 then polls the APDONINT signals from APU control logic 67. When the APDONINT signals go active (Step 1725), signifying that a correlation coefficient is available in accumulator 276 (Step 1725), CPU 68 reads and stores the coefficient at the address designated by CROSS (Step 1726).

The respective pointers are then updated to effect computation and storage of the next correlation coefficient (Steps 1728, 1730). CROSS is incremented. Reference array address generator 242 is reset to designate the beginning of the "shifted" reference array (6232 or 6220), e.g., the beginning address of array 6232, offset by the number of correlation components calculated (i.e. contents of counter 7002). Address generator 207 is reset to the address of the beginning of the corresponding new pattern array 6422 or 6410 (Step 1728). Correlation coefficient counter 7003 is then decremented by 1, and counter 7002 incremented by 1 (Step 1730), and the contents of counter 7003 are tested against zero (Step 1732). This process continues until correlation coefficient counter 7003 has decremented to zero, whereupon the Y (DONE) flag is set (Step 1733) and a return to position error routine 1600 (FIG. 19) effected (Step 1734).

Figure 21B:
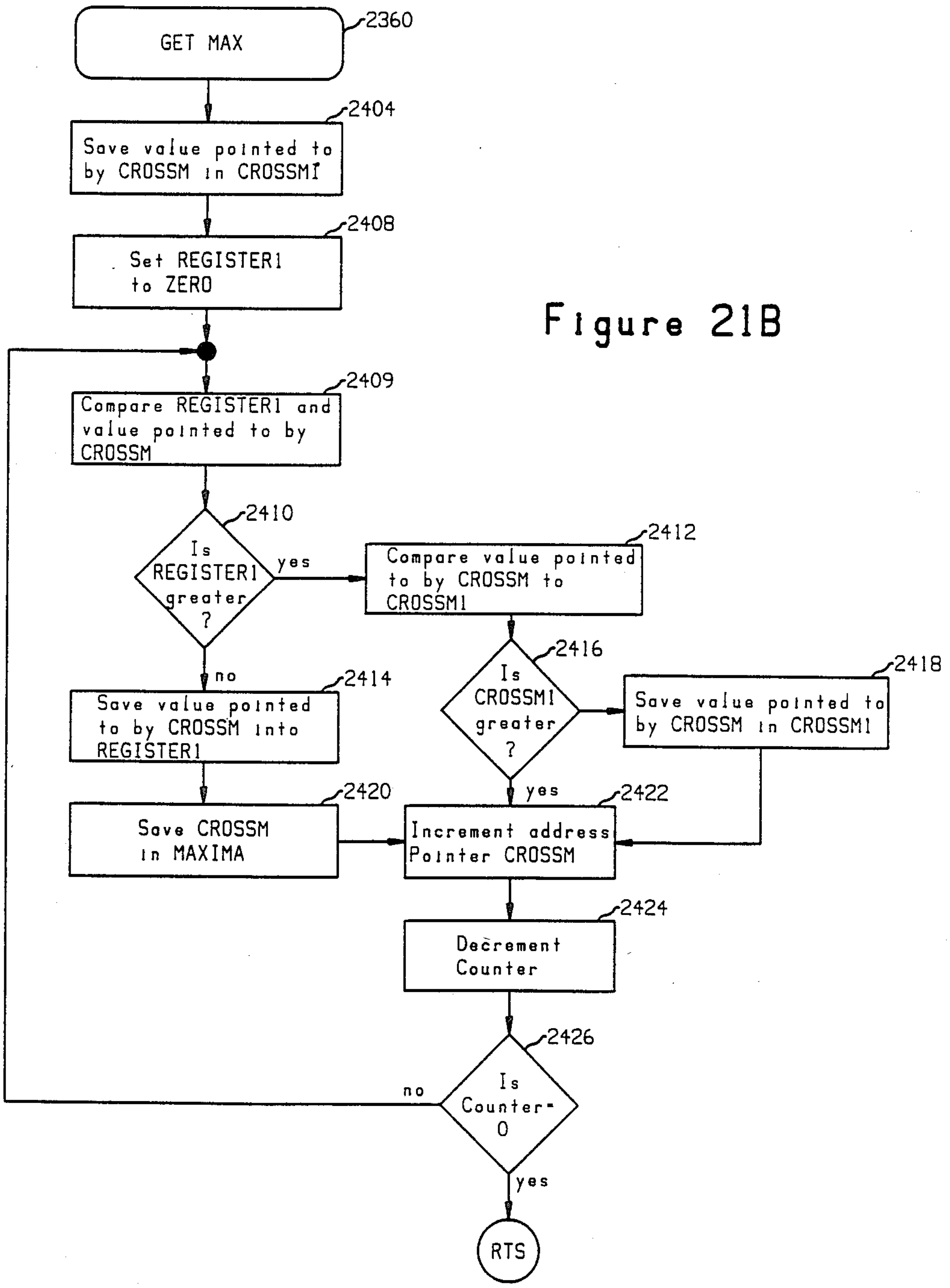
FIG. 21B is a flow diagram of the GET MAX routine of FIG. 17.

After the cross-correlation arrays are generated in RAM 70 during position error computation routine 1660 (Steps 1610, 1612), maxima and minima information regarding the arrays is determined (Step 1614). Referring now to FIG. 21B subroutine 1614 will be more fully described. Information regarding coarse cross-correlation array 7004B is first developed. The address of the beginning of array 7004B is loaded into a register designated CROSSM, and the length of array 7004B, (i.e., 400) is loaded into the COUNTER register (Step 2350). A subroutine GETMAX is then called to determine the addresses and corresponding values of the maximum and minimum elements contained within the coarse cross-correlation array (Step 2352). The address corresponding to the maximum element is then stored in a register designated MAXIMAR, the value of maximum element stored in a register designated MAXIML and the value of the minimum element stored in a register MINIML (7004, FIG. 2A) (Step 2356).

The maximum and minimum elements of the fine cross-correlation array are then determined. COUNTER is set to a value equal to the length of the fine cross-correlation array, i.e., 64, and the address of the beginning of the fine cross-correlation array is loaded into CROSSM (Step 2358). The GETMAX routine is then initiated, to provide the values and addresses of the maximum and minimum elements of the fine cross-correlation array (Step 2360). The address of the maximum element is loaded into the register designated MAXIMA (7008, FIG. 2B) (Step 2362), and a return to subroutine 1600 (FIG. 19) effected.

Referring to FIG. 21B, the GETMAX subroutine which is called by the subroutine 1614 (FIG. 21A) will be described. Upon initiation, the contents of the location designated by register CROSSM, i.e., the first element of the cross-correlation array then being processed, is copied in a register designated CROSSMI (Step 2404), and a register designated REGISTER1 is set to zero (Step 2408). CROSSMI is used in connection with establishing the minimum value of the array being processed. REGISTER1 is used in determining the maximum element of the array.

During the operation of GETMAX, each element of the array is successively compared with the contents (initially zero) of REGISTER1 (Step 2409). If the array element is found to be larger than REGISTER1, the array element replaces the present contents of REGISTER1 as the maximum (Step 2414) and the address of the element (CROSSM) is loaded into MAXIMA (Step 2420). If, however, the contents of REGISTER1 is larger than the value of the array element, then the array element is compared to the contents of CROSSMI (Step 2412). If the value of the element is less than the current value of CROSSMI, it will replace the current contents of CROSSMI as the minimum value of the array (Step 2418). As noted above, CROSSMI is initially loaded with the value of the first element of the array (i.e., the first element of the array is initially assumed to be the minimum value).

After each individual element of the array is tested, CROSSM (initially set to the address of the first byte of the array) is incremented to point to the next succeeding element of the array (Step 2422) and COUNTER (initially loaded a value equal to the total number of elements to be processed) is decremented by 1 (Step 2424). This procedure will continue until COUNTER equals zero, at which point a return to the calling subroutine (e.g. subroutine 1614, FIG. 21A) is effected.

Figure 22:
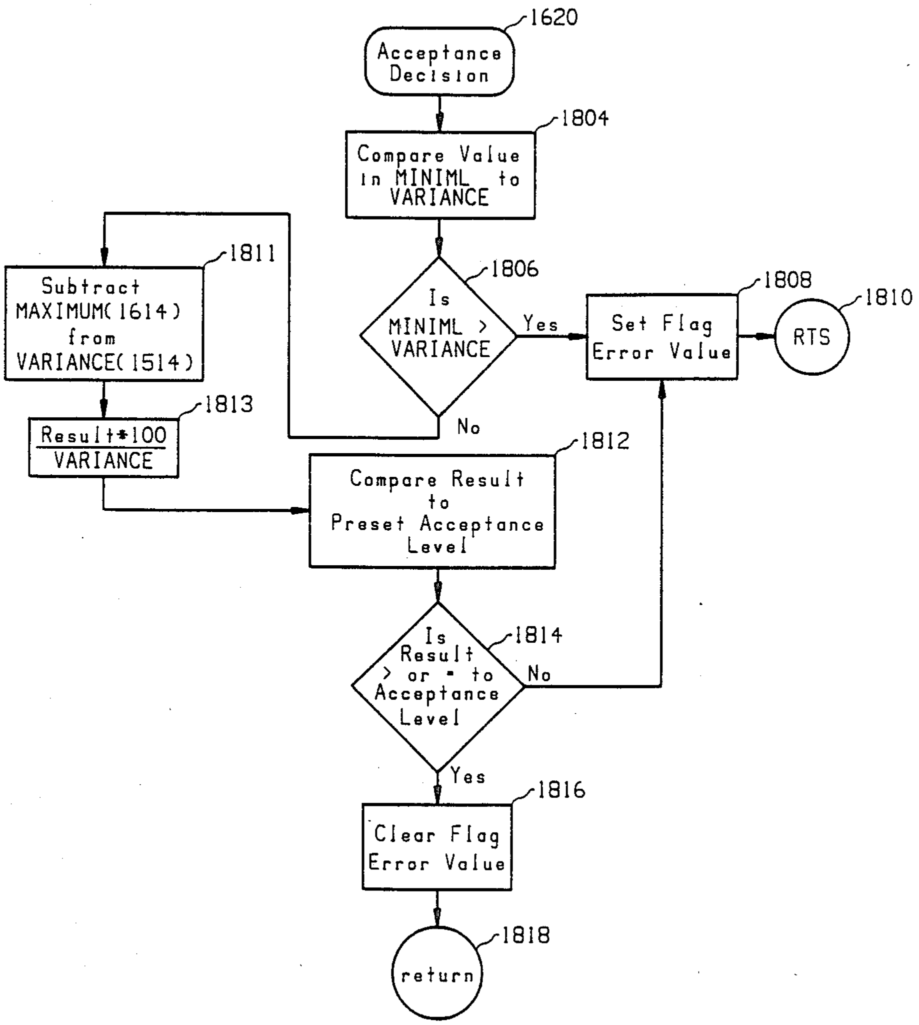
FIG. 22 is a flow diagram of the acceptance decision routine called by the position error computation routine of FIG. 19.

In position error computation routine 1600 (FIG. 19), after the cross-correlation maximum and minimum indicia is established, an acceptance test is performed (Step 1620). Referring now to FIG. 22, acceptance decision subroutine 1620 first compares the smallest cross-correlation coefficient of the coarse array, stored in register MINIML 7007 (FIG. 2A) to the maximum auto-correlation coefficient (VARIANCE) of the reference pattern. If the value of the minimum element is greater than VARIANCE, an error flag is set to indicate that the patterns did not match (Step 1808) and a return to the routine 1600 (FIG. 19) effected (Step 1810).

Assuming that the smallest element (MINIML) is not greater than the maximum auto-correlation element (VARIANCE), the value of the maximum coarse cross-correlation coefficient (stored in register MAXIML 7006) is subtracted from the maximum auto-correlation element VARIANCE (Step 1811). The difference is then divided by the maximum auto-correlation element and multiplied by 100 to generate a percentage (Step 1813). The result is then compared against the auto-correlation value in VARIANCE (Step 1812). If the result is not greater than or equal to the maximum auto-correlation coefficient in VARIANCE (Step 1814), the error flag is set (Step 1808), and a return is made to subroutine 1600 (FIG. 19) (Step 1810). If the result is greater than or equal to VARIANCE, the error flag is cleared to indicate that the patterns match (Step 1816), and a return to subroutine 1600 (FIG. 19) effected (Step 1818).

Figure 23:
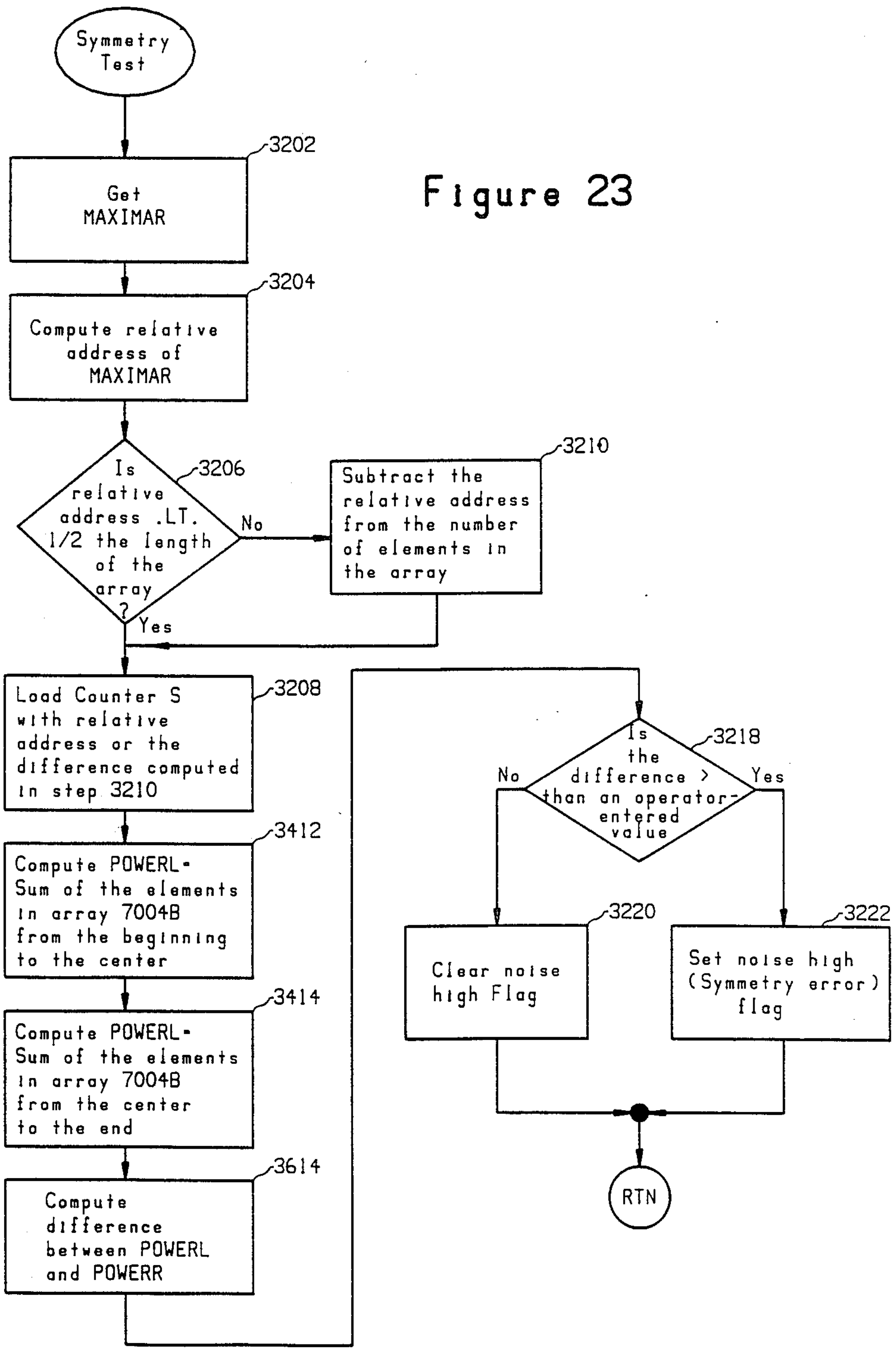
FIG. 23 is a flow diagram detailing the operation of the symmetry test subroutine called by the computation routine of FIG. 14A.

In position error computation routine 1600 (FIG. 16), if the cross-correlations meet the acceptance criteria (Step 1620), the symmetry of the cross-correlation is tested (Step 1640). Symmetry test subroutine 1640 is used to mitigate against locking onto spurious pattern characteristics (noise) which may appear similar to peaks of correlation. Referring now to FIG. 23, in executing symmetry test 1640, the address of the maximum element of cross-correlation array 7004B (previously established in register MAXIMAR 7018) is first accessed (Step 3202), and the relative address (number of locations from the beginning of array 7004B) of the maximum element determined (Step 3204). The relative address is tested against the relative address of the center of the array (e.g. 200) (Step 3206). If the relative address is less than half of the array, that is, the maximum element is in the first half of the array, the relative address is loaded into a counter S. If however, the maximum element is in the second half of array 7004B, the relative address is subtracted from the number of elements in the array (e.g. 400) to determine the distance (number of locations) from the maximum element to the end of the array, and that number is loaded into counter S.

The "power distribution" of coefficients on respective sides of the maximum element is then computed. The sum of the elements in array 7004B between the beginning of the array and the maximum element (i.e. relative addresses zero through counter S minus 1) is determined, and stored in a register designated POWERL (Step 3212). The sum of the elements from the maximum element to the end of array 7004B (i.e., the sum of the contents of relative locations counter S through 399) is computed and stored in a register designated POWERR (Step 3214).

The difference between the POWERL and POWERR values is then determined (Step 3216), and compared to an operator entered value (SIGNAL) (Step 3218). If the difference is less than or equal to the operator entered value, a noise high (symmetry error) flag is cleared (Step 3220) and a return to position error computation routine 1600 effected. If the difference is larger than the operator entered signal value, the noise high (symmetry error) flag is set prior to effecting the return (Step 3222).

Figure 24:
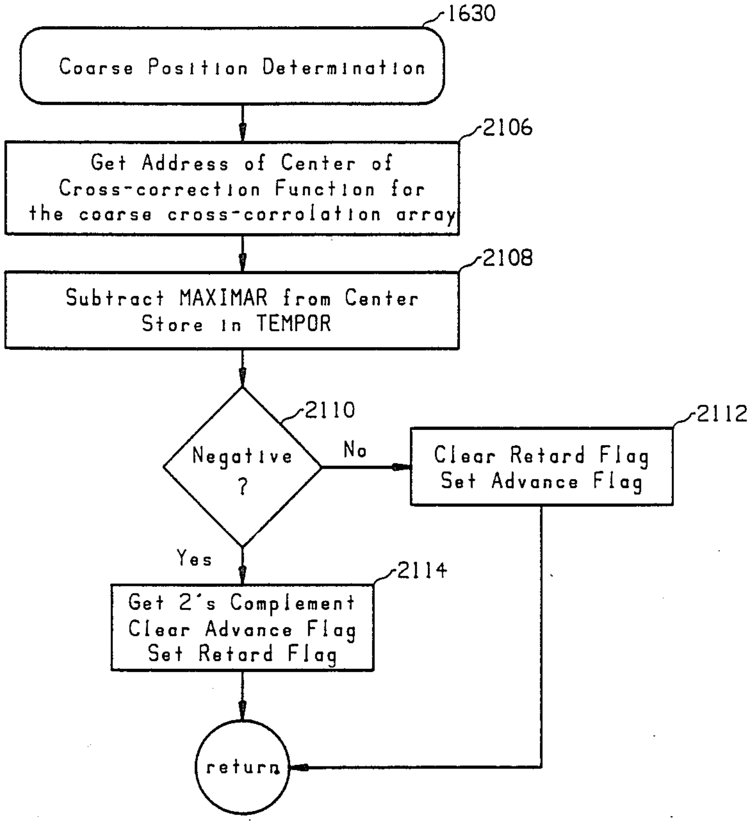
FIG. 24 is a flow diagram of the coarse position determination routine called by the position error computation routine of FIG. 19.

In position error computation subroutine 1600 (FIG. 19), if the cross-correlation array met acceptance and symmetry criteria (Steps 1620, 1640), a course measure of position offset is performed (Step 1630). Referring now to FIG. 24, subroutine 1630 begins by obtaining the address corresponding to the center location in the coarse cross-correlation array 7004B, i.e., relative address 200 (Step 2106). That address is then subtracted from the address of the maximum element of coarse cross-correlation array in MAXIMAR register and the result stored in register TEMPOR (Step 2108). The difference is indicative of position error. The magnitude of the difference in TEMPOR indicates the amount of correction required. The sign of the difference indicates the direction in which correction is required. Accordingly the sign of the difference is tested (Step 2110). A negative result indicates that the new pattern is lagging with respect to the reference pattern. In that event, the compensation motor 30 must be retarded to cause the new pattern to advance relative to the reference pattern. The 2's complement of the value contained in TEMPOR is derived and placed in TEMPOR, the advance flag is cleared and the retard flag is set to instruct the motor control to retard compensation motor 30 (Step 2114). If the value of TEMPOR is not negative, compensation motor 30 must be advanced. The retard flag is therefor cleared and the advance flag set (Step 2112). A return to subroutine 1600 (FIG. 19) is then effected.

As will be recalled, in routine 1600 (FIG. 19), if the course offset developed by routine 1630 is within ±1.0%, a precise position error is determined (Step 1632). Subroutine 1626 determines the offset of the maximum element of fine cross-correlation array 7004A from the center of the array. Referring now to FIGS. 25A and 25B, the address of the center element of the fine cross-correlation array is obtained (Step 1904) and subtracted from the address of the maximum cross-correlation coefficient stored in MAXIMA register 7008 (Step 1906). The resultant difference, generally indicative of position error, is placed in temporary register TEMPOR 7012 (FIG. 2A) (Step 1908).

The actual peak of correlation, however, may not correspond exactly to the maximum element in the array. The actual peak of correlation may occur at a point between the discrete points represented in the cross-correlation array. In accordance with one aspect of the present invention, an interpolation technique is used to determine the location of the actual peak of between discrete points reflected by the cross-correlation array. The interpolation function as follows:

$$\frac{([MAXIMA-1]\times 1)+([MAXIMA]\times 2)+([MAXIMA+1]\times 3)}{[MAXIMA-1]+[MAXIMA]+[MAXIMA+1]}$$

where: MAXIMA is the address of the maximum coefficient in fine cross-correlation array 7004A, and brackets ([]) are adopted as a convention meaning "the contents of," e.g., [MAXIMA−1] means the contents of the location designated by address MAXIMA−1.

The value of the coefficient in the address (MAXIMA−1) in the fine cross-correlation array just preceding the maximum element (MAXIMA) is determined (Step 1910). The coefficient value found at address MAXIMA−1 is stored in respective registers designated EMPSUM 7014 (FIG. 2) (Step 1912) and TEMPMUL 7016 (FIG. 2A) (Step 1914). The maximum coefficient (in MAXIML register 7006) is then added to the value (of the coefficient at MAXIMA−1) retained in TEMPSUM register 7014, and the resulting value is accumulated in TEMPSUM register 7014 (Step 1916). Next, the value of the maximum element (designated by MAXIMA) is multiplied by 2 (step 1918) and the product is added to current contents of TEMPMUL register 7016 (Step 1920). The cross-correlation array element next after the maximum element, i.e., at address (MAXIMA+1), is then added to the contents of TEMPSUM register 7014 and the resulting value accumulated in TEMPSUM register 7014 (Step 1926). The coefficient found at address MAXIMA+1 is then multiplied by three (Step 1928) and that result added to the contents of TEMPMUL register 7016 (Step 1930).

The contents of TEMPMUL register 7016 correspond to the numerator and the contents of TEMPSUM register 7014 correspond to the denominator in the above formula. Referring now to FIG. 25B, the contents of TEMPMUL register 7016 are then divided by the contents of TEMPSUM register 7014 (Step 2004). The resulting quotient is then added to the contents of TEMPOR register 7012, i.e., the difference between the center address of coefficient array 7004A and MAXIMA (Step 2006). If the resulting value in TEMPOR register 7012 is negative, this indicates that the new pattern is lagging with respect to the reference pattern. In that event, compensation motor 30 must be retarded to cause the new pattern to advance relative to the reference pattern. Accordingly, the 2's complement of the negative value in TEMPOR register 7012 is derived (Step 2010) to provide the magnitude of the required correction. The advance flag is cleared (Step 2014), and the retard flag is cleared (Step 2018) to instruct the motor control to retard compensation motor 30.

If the result in TEMPOR register 7012 is positive, compensation motor 30 must be advanced. In that event, the contents of TEMPOR register 7012 represent the magnitude of necessary correction. Accordingly, the retard flag is cleared (Step 2012) and the advance flag is set (Step 2016) to instruct the motor control to advance compensation motor 30. Once the retard or advance flag has been appropriately set, a return to the routine 1600 (FIG. 19) is effected (Step 2020).

As previously noted, system 10 generates indicia of position error in a signature pattern previously described or in a predetermined cutmark pattern mode. In the cutmark mode, cutmarks having a predetermined length are detected and deviations in position within the machine cycle of respective qualifying cutmarks employed to determine position error. In practice, a common cutmark may be approximately 1/16 inches in length. Assuming a 48 inch repeat, this corresponds to at least six incremental pulses (KLICKS) of the system encoder, i.e., at least 6 (six) data samples. In computation subroutine 1322 (FIG. 24), after a determination is made that the system is locked (i.e., indicia of both the reference pattern and new pattern are resident in RAMS 62 and 64), an initial determination is made as to desired operational mode (Step 1411). Referring to FIG. 26, indicia of the predetermined length of the cutmark is obtained from EEPROM 74 and suitably installed in a designated location in RAM 70 (MARKSIZE) (Step 2222). The preset cutmark length (value) is tested against zero (Step 2224). If the preset cutmark length (MARKSIZE) is zero, a return to the pattern recognition portion (Step 1650) of computation routine 1322 (FIG. 13) is effected.

If a non-zero MARKSIZE value was stored by the operator in EEPROM 74, the image data in RAM 64 is analyzed (Step 2232). Indicia of the position (CENTER) of the center of a qualifying mark having a length equal to MARKSIZE as entered by the operator is provided. In the absence of qualifying marks or failure of the data to meet acceptance criteria, error flags are set. Step 2232 will be more fully described in conjunction with FIG. 27.

A test of error flags is then made (Step 2234). If an error flag is set, resolution control signed SF/W* is deactivated (ensuring that the system is in regular resolution mode) (Step 2235). Return is then effected to computation routine 1332 (FIG. 14A) and ultimately to main loop 1305 (FIG. 13).

Assuming that a mark meeting the length criteria is found, and no error flags are set, position error is computed (Step 2260). The indicia of preset expected mark position is accessed from EEPROM 74 and installed in RAM 70 (OFFSET) (suitably in conjunction with Step 2222). If desired, a non-zero preset OFFSET value may be used to designate whether or not a high resolution window is desired. SF/W* would be inhibited in response to an initial zero value in EEPROM 74. In any event, if non-zero position reference information has not been preset by the operator, the CENTER of the mark meeting present length criteria, as established by Step 2232, will be used as the reference and loaded into OFFSET. The CENTER value is subtracted from the preset or previously saved value in OFFSET. The difference is stored in register TEMPOR, for subsequent use in generating position error information.

The difference is then tested against a predetermined range, suitably corresponding to the length of a high resolution window (e.g. mark size plus one inch) (Step 2261). If the difference is within limits, the locked flag is set (Step 2265), and the high resolution window established (Step 2238). Step 2238 will be more fully described in conjunction with FIG. 29.

Once the window is established, high resolution mode will preferably be maintained throughout the machine cycle. Thus, regular resolution operation is employed until a qualifying mark is identified, whereupon a high resolution window is established. During successive machine (cutting) cycles, unless and until lock on the cutmark is lost, data will be acquired only during the window. If the difference is not within limits (or in the event of either error), resolution control signal SF/W* is deactiviated (Step 2263) and window generation Step 2238 omitted and normal resolution mode operation will be resumed in the next data acquisition cycle. If desired, the SF/W* signal can be selectively generated to provide for regular resolution data collection during other parts of the machine cycle.

In either event, indicia of position error is established. The difference indicia in TEMPOR is tested against zero to determine the direction of necessary correction (Step 2239). If the difference is negative, the contents of TEMPOR is replaced with its 2's complement, the ADVANCE FLAG is cleared and the RETARD FLAG set (Step 2241). Conversely, if the difference is positive, the RETARD FLAG is cleared and the ADVANCE FLAG set (Step 2243). A return is then effected to computation routine 1322 (FIG. 14) and ultimately main loop 1305 (FIG. 13) where the position error indicia is submitted for motor control (Step 1316).

Referring now to FIG. 27, the process of identifying and determining the position of the center of marks meeting predetermined length criteria (Step 2232) will be described. As will be recalled, at the point when mark control routine 2200 is executed, image data is resident in arrays 6410 and 6422 in RAM 64 and arrays 6220 and 6232 in RAM 62. The address of the beginning of fine reference array 6210 is obtained and loaded in a designated POINTER (Step 2302), and the length of array 6210 (4800) is stored in a counter designated COUNTER (Step 2304). An operator entry is then tested to determine whether the mark chosen is dark-on-white or white-on-dark (Step 2308).

If the cutmark is a dark mark on a white web (dark-on-white), the system tests each element of the array in sequence to identify the address of the first rising edge (light-to-dark transition) in the array and stores the address in a designated location (e.g. EDGE 1) or sets an error flag if no such transition is detected (Step 2310). The error flag is checked (Step 2311), and if set, a return to mark control routine 2200 is effected. Assuming the error flag is not set, the succeeding elements in the array are tested in sequence to identify the address of the next subsequent falling edge (dark-to-light transition) in the array. That address is stored in a designated location (e.g. EDGE 2) (Step 2312), and an error check (Step 2313) is again made.

Conversely, if the mark chosen is a white mark on a dark web (white-on-dark), then the address of the first falling edge in the array is first determined and stored in EDGE 1 (Step 2314), and an error check made (Step 2315). The address of the next subsequent rising edge in the array is then determined and stored in EDGE 2 (Step 2316), and another error check is effected (Step 2317). If error flags are found to be set (Steps 2315, 2317), a return to mark control routine 2200 is effected. The process for detecting the rising and falling edges will be described in conjunction with FIG. 28.

Once the edges of a mark have been determined, the length of the cutmark is computed by subtracting the addresses of the edges, i.e. the contents of EDGE 1 from the contents of EDGE 2 (Step 2318). Once the length of the cutmark has been computed, it is compared with the reference length (MARKSIZE) (Step 2320). If the computed length does not equal MARKSIZE, the process is repeated beginning at Step 2308, with respect to the elements of array 6210 following the rejected mark, to identify the next mark, which is in turn compared to the MARKSIZE. The process is repeated until a qualifying mark is found or array 6210 exhausted.

Assuming that the computed length of the cutmark matches MARKSIZE, a calibrate flag (A3), set by the operator to establish new reference, is tested (Step 2324). If the CALIBRATE FLAG is set, then the address of the center of the computed mark is computed (LENGTH/2+EDGE1) and stored in CENTER for later use (Step 2325) and the locked flag is set. If the calibrate flag is not set, the LOCKED FLAG is cleared (Step 2328) and center computation Step 2325 omitted.

An acceptance test is then effected. The mean of array 6210 is computed, suitably in the manner described in conjunction with FIG. 15, and established in a designated location (e.g. MEAN0) (Step 2333). The LOCKED FLAG is then tested (Step 2335). If the LOCKED FLAG is set, the mean is copied into another designated location (e.g. MEANOR) (Step 2337), and a return effected to mark control routine 2200 (FIG. 26).

If the LOCKED FLAG is not set, the computed mean (MEAN0) is compared to the reference mean in MEANOR (Step 2339). If the difference does not exceed an operator entered value, then a return to mark control routine 2200 (FIG. 26) is effected. If the difference exceeds the operator entered value, the ACCEPTANCE error flag is set prior to effecting the return.

As will be recalled, in Mark detection routine 2232, each element of the array under examination (e.g. array 6210) is tested in sequence to detect light-to-dark or dark-to-light transitions in the image. The address of the element under examination is maintained in POINTER [initially loaded with the beginning location in the array] (Step 2302). The number of elements examined is tracked by COUNTER (initially loaded with the length of the array). Referring now to FIG. 28, a suitable process for detecting a light-to-dark transition (rising edge) in the image first increments the address in POINTER in the 80188 CPU (Step 3002) and decrements counter (Step 3004). The contents of counter are then tested against zero (Step 3006).

Assuming a non-zero value in COUNTER, the element of fine array 6210 designated by POINTER is tested to determine if it is a positive value (Step 3008). A positive value indicates a rising edge occurs at that location. If a positive value is found, its address is stored in a temporary storage area in RAM 70 and therefrom loaded into EDGE 1 or EDGE 2 as appropriate. Once a rising edge (i.e., positive value) is located, return to the subroutine 2310 (FIG. 27) is effected.

If the element being examined is not positive, the next successive location in the array is examined and the process is repeated beginning at Step 3002. This process will continue until either COUNTER becomes zero or a rising edge is located. If COUNTER reaches zero, each element of the array has been examined, and no rising edge found. Accordingly, a "mark-not-found" flag is set (Step 3011) and a return to the calling routine effected. The process of detecting dark-to-light transition is essentially identical to the process for detecting light-to-dark transitions, except that a test for a negative value is executed in the place of Step 3008.

As previously noted, in mark control routine 2200, if a qualifying mark is detected within a predetermined range (Step 2261), the LOCKED flag is set (Step 2265), and a high resolution window defined (Step 2238). As will be recalled, the image signal is generally sampled once during each incremental advancement of the machine cycle, represented by the pulse stream (KLICK). In normal resolution operation, incremental pulses (KLICKS) are provided by pulse generator 570 of sync unit 54 (FIG. 4) at a rate corresponding to, e.g., 0.010 inch resolution. During high resolution operation, expansion generator 57 (FIG. 11) is operatively interjected into sync unit 54 and APU control logic 67 by MUX 573 (FIG. 11) to provide incremental signals at an increased rate.

Referring now to FIGS. 29 and 11, the high resolution window is defined by first determining the actual regular resolution of the system (e.g. number of incremental advance pulses per inch). The number of increments per machine cycle, (e.g. 4800) is divided by indicia of the repeat length (e.g., size of the blanket cylinder of printing unit 16) (Step 3302). The resulting quotient is then saved in a register designated TICKS-PER-INCH. As will hereinafter be described in conjunction with FIGS. 28A and 30A, in response to each TDC pulse, indicia of the period of the machine cycle (number of timer interrupts occurring since the just previous TDC pulse) is established in a register designated NEWSPEED. The period in NEWSPEED is multiplied by 100 to make a percentage (Step 3306), then divided by the indicia of repeat length (e.g., size of the press blanket cylinder) (Step 3308). The result of this calculation is stored in a register designated KOEFF (Step 3310). The contents of KOEFF are then loaded into frequency divider 575 of expansion generator 57 (FIG. 11) (Step 3312).

Indicia of the beginning and duration of the window (in terms of number of klick pulses) are established in counters 561 and 563 of expansion generator 57 (FIG. 11). The value stored in TICKS-PER-INCH is divided by the predefined mark size (MARKSIZE) entered from the keyboard (Step 3314). The result of this calculation is stored in a register designated TICKS-PER-MARK. The value of TICKS-PER-INCH is then added to the value of TICKS-PER-MARK and that result is loaded in a register designated WINDOW SIZE (Step 3316) and into counter 563 of expansion generator 57 (FIG. 11) (Step 3318). The position of the beginning of the window is then determined by subtracting one-half the value of WINDOW SIZE from the reference mark position OFFSET (Step 3222) and loaded into counter 561. High resolution mode control signal SF/W* is then activated (Step 3324) and a return to mark control routine 2200 (FIG. 26) effected.

Referring now to FIG. 30A, the process of calculating the number of clock cycles between top-dead center interrupts will be described. This information is used to calculate both the operating speed of the press and changes in press speed. As will be recalled, encoder 51 generates a top-dead center pulse at the nominal beginning of the machine cycle. This pulse is applied to CPU68 and as an interrupt signal (TDCINT) (FIG. 4). In addition, a timer interrupt is generated to CPU 68 on a periodic basis for real time calculations. Upon each occurrence of a timer interrupt, a count in a register designated CLOCK1 is incremented. In response to each TDC interrupt, an analysis of press speed (machine cycle period) is made. The contents of NEWSPEED (reflecting period of the earlier cycle) are loaded into a register designated OLDSPEED (Step 2816). The contents of CLOCK1 are then loaded into register NEWSPEED (Step 2818), and CLOCK1 is cleared (Step 2820). Any speed changes occurring in the operation of the press are then determined (Step 2902). Referring now to FIG. 30B, the value of NEWSPEED is subtracted from the value of OLDSPEED to determine any difference in the periods of the two preceeding cycles (Step 2906). The difference is then tested against zero (Step 2908). If the difference (OLDSPEED—NEWSPEED) is not zero, then the sign of the result is tested (Step 2912). If the result is negative, it is converted into 2's complement form to represent the speed change (Step 2918).

In practice, minor speed changes may be acceptable. To determine if a minor speed change is within the acceptable range, a predetermined number (e.g. 1) is subtracted from the speed difference indicia (Step 2922). The result is again tested (Step 2926). If the result is, e.g., equal to zero, the speed change is within acceptable limits. If the speed change is not within acceptable limits, the speed change flag is set to indicate that the press speed has changed (Step 2930) and a return is effected to the point in the program where the TDC interrupt occurred.

If no press speed change occurred (Step 2908), or the speed change is within acceptable limits (Step 2926), the speed change flag is cleared (Step 2928). The press speed (NEWSPEED) is then tested to determine whether the actual speed of the press is above a minimum speed selected by the press operator (MINIMUM SPEED) (Step 2914). If NEWSPEED is less than the contents of the MINIMUM SPEED register, the press is operating below the minimum, and the speed flag (i.e., 'speed too low') is set accordingly to indicate that the press speed is too low (Step 2924). If the value in NEWSPEED is greater than the contents of the MINIMUM SPEED register, the speed flag is cleared to indicate that the press speed is acceptable (Step 2916). After the 'speed too low' flag has been set or cleared as appropriate, a return is effected.

As will be recalled, position error, as determined by computation routine 1322 (FIG. 14A), is reflected by the ADVANCE and RETARD FLAGS and the contents of TEMPOR register 7012. In addition, manual position changes may be effected by operator entry; the operator entered value is loaded into register MANUAL-MOVE-SIZE in RAM 70.

In main operation loop 1305 (FIG. 13), if a manual mode operation is selected (Step 1310) or in the automatic mode, after a valid indicia of position error has been generated, motor control routine 1316 is executed.

Referring now to FIG. 31, motor control routine 1316 will be described. In general, the appropriate relay 84 (in accordance with the ADVANCE and RETARD flags) is activated for a predetermined (operator-entered) period of time (Step time) for each unit count in TEMPOR or MANUAL-MOVE-SIZE. Accordingly, upon entry into motor control routine 1316, a motor control timer is tested to determine whether a compensation step is in process. As will be explained, the motor control timer is preset to a respective predetermined value in accordance with mode and detected amount of position error each time control signals are output to relays 84. If the step-time interval has not elapsed, a return to main loop 1305 (FIG. 13) is effected. Once the step-time interval has lapsed, the relay 84 is deactivated (Step 3106).

Manual compensator movement requested by the press operator is then examined. The contents of MANUAL-MOVE-SIZE are suitably decremented (Step 3107), then tested for a negative value (Step 3108). A non-negative value indicates that a manual position change is to be effected. In that event, a register AUTO-MOVEMENT SIZE in RAM 70 is incremented to facilitate accounting for manual movements in making automatic corrections (Step 3109).

Upon a negative decremented value of MANUAL-MOVE-SIZE, automatic mode computed position error is examined. MANUAL-MOVE-SIZE is cleared, and the contents of TEMPOR are decremented and adjusted by the contents of AUTMOVESIZE [the quantity (MANUAL-MOVE-SIZE+1) is algebraically subtracted from TEMPOR, and results retained in TEMPOR] (Step 3105). The adjusted TEMPOR count is then tested for a negative value (Step 3110).

If manual or auto position changes are called for, the ADVANCE flag is tested (Step 3112) and the appropriate relay 84 actuated (Steps 3114, 3116). If, however, no position change is found to be called for (Step 3110), relay setting Steps 3112, 3116 and 3114 are omitted.

A period for which the relay will remain actuated (or, if neither relay 84 is set, for which compensator motor actuation will be inhibited) is then determined. Different step-times are suitably used in connection with the manual and automatic modes of operation. Accordingly, the Auto-mode flag (Q) is tested (Step 3118). If the system is operating in the manual mode, the motor control timer loaded with a first predetermined number, (preset by the operator) (Step 3120). In automatic mode, the actuation time per step is adaptively selected in accordance with the size of the position correction to be made. The contents of TEMPOR are tested in sequence against a value corresponding to predetermined amounts, e.g., 0.05 inch (Step 3119) and 0.20 inch (Step 3121). If position correction TEMPOR is less than 0.05 inch, the motor control timer is set to an operator entered auto-mode value (Step 3122). If the position correction (TEMPOR) is greater than 0.20 inch, the motor control timer is set to manual step-time (Step 3120). If the position correction is greater than 0.05 inch but less than 0.20 inch, an intermediate step-time is employed. The average of the manual and auto mode step-times are taken (Steps 3123 and 3124), and the motor control time set to the average value (Step 3125). If desired, to facilitate quality control of the press product, a maximum allowable error value can be established by operator entry. The error value can also be tested against this value, and if the value is exceeded, output devices (e.g., alarms) may be activated.

After the motor control time is set to the appropriate value, a return to main loop 1305 (FIG. 13) is effected. The motor control timer is thereafter decremented in response to each timer interrupt and tested (Step 3104) in successive alterations of routine 1316.

It will be understood that while the various conductors/connectors may be depicted in the drawings as single lines, they are not so shown in a limiting sense and may comprise plural conductors/connectors as is understood in the art. Further, the above description is of a preferred exemplary embodiment of the present invention; the invention is not limited to the specific form shown. For example, while the system was described as using separate registers in connection with individual indexes or variables, a single register may be utilized at different times during the course of the program to contain plurality of variables and or indexes. Likewise, algorithms other that those described for effecting the various analyses or functions described, or different implementations of the algorithms may be utilized. These and other modifications may be made without departing from the scope of the the invention as expressed in the appended claims.

What is claimed is:

1. A system for relating a cyclical machine operation to the position of images on a moving web comprising:
- position adjustment means, responsive to control signals applied thereto, for controllably varying the effective position of said machine operation along said moving web;
- means for generating image signals indicative of the image on said web;
- means for sampling said image signals at respective sampling intervals during the machine cycle;
- means for selectively generating, from image signal samples of a first machine cycle, reference pattern indicia;
- means for selectively generating, from image signal samples of a successive machine cycle, new pattern indicia;
- a pipelined sum-of-products generator;
- means for selectively applying said reference pattern indicia and said new pattern indicia to said sum-of-products generator, to generate respective correlation coefficients between said reference pattern and a plurality of shifted versions of said new pattern indicia;
- means for processing said correlation coefficients to determine which of said plurality of shifted versions of said new pattern indicia produced the largest correlation coefficient and generating an indicating signal in response thereto; and
- means for generating said control signals to said position adjustment means in accordance with said indicating signal.

2. A system for relating a cyclical machine operation to the position of images on a moving web comprising:
- position adjustment means, responsive to control signals applied thereto, for controllably varying the effective position of said machine operation relative to said moving web;
- means for generating successive image signatures in respect of successive machine operation cycles, said image signatures comprising multiple bytes of data indicative of the image on said web in relation to an associated machine operation cycle;
- first storage means for selectively storing, as indicia of a reference image, a first image signature associated with a first machine operation cycle;
- second storage means for selectively storing as indicia of a successive image, a successive image signature associated with a successive machine operation cycle;
- digital multiplier means for generating indicia of a resultant value of the multiplication of respective input bytes applied thereto;
- addressing means, responsive to preset data applied thereto and cooperating with said first and second storage means, for applying a sequence of bytes of said reference image and successive image indicia beginning with a byte in accordance with said preset data as input bytes to said digital multiplier means such that said digital multiplier means multiplies, on a byte-by-byte bases, respective bytes of said reference image indicia and said successive image indicia, and outputs a resultant value for each byte-by-byte multiplication;
- accumulator means for accumulating each of said resultant values and selectively providing indicia of an accumulated resultant value;
- means for generating said preset data to said addressing means, such that indicia of accumulated resultant values are generated for respective sequences bytes of said reference image indicia relative to said successive image bytes; and
- means for evaluating said accumulated resultant values to determine the degree of correlation between said reference and successive image signatures and generating said control signal to said position adjustment means in response thereto.

3. The system of claim 1 wherein said sum-of-product generator comprises:
- a digital multiplier, having first and second input channels for generating an output having a value indicative of the product of the values of signals applied to said first and second input channels; and
- accumulator means receptive of indicia of said multiplier output, for periodically sampling said multiplier output and generating indicia of the sum of said samples.

4. The system of claim 1 further including means for selectively varying said sampling intervals during a portion of a machine cycle.

5. A system for controlling a predetermined cyclical operation upon a moving web, comprising:
- means for generating images on said moving web;
- a device for cyclically effecting a predetermined operation upon said web;
- adjustment means, responsive to control signals applied thereto, for selectively advancing or retarding said web relative to said device;
- means for generating signals representative of the image on said web;
- analog-to-digital converter means for generating respective data bytes indicative of the image signal associated with increments of said device operational cycle;
- means for storing, as indicia of a reference pattern, a set of data bytes corresponding to a first device operation cycle;
- means for storing, as indicia of a new pattern, a set of data bytes corresponding to a successive device operation cycle;
- means for generating a sequence of coefficients representing the cross-correlation function of the new pattern with the reference pattern;
- means for storing indicia of said cross-correlation coefficients;
- means for generating indicia of a dominant peak surrounded by a symmetrical shape in said cross-correlation function; and
- means, responsive to indicia of said dominant peak, for generating said control signals to said adjustment means, to control the relative position of said device with respect to images on said web.

6. The system of claim 5, wherein said means for generating control signals comprises:
- means for determining positional offset of the new pattern from the reference pattern; and means for generating said control signals in accordance with said positional offset.

7. The system of claim 5, wherein said means for generating said control signals comprises:

means for determining the deviation of said dominant peak from the center of an array of said cross-correlation coefficients.

8. The system of claim 5, wherein said means for generating images comprises at least one printing unit.

9. A system for relating a cyclical machine operation to images on a moving web, said machine operation having associated therewith adjustment means, responsive to control signals applied thereto, for varying the relationship of said operation to said web, said system comprising:

means for generating image data bytes indicative of said images in relation to cycles of said machine operation;

means for storing, as indicia of a reference pattern, a first set of said image data bytes corresponding to a first machine cycle;

means for storing, as indicia of a new pattern, a second set of image data bytes corresponding to a successive machine cycle;

a digital multiplier, having first and second input channels, for generating a product signal indicative of the product of the values of bytes applied to said first and second input channels;

accumulator means, responsive to indicia of said product signal, for generating an accumulation signal, indicative of the sum of said products;

means for selectively applying, in predetermined sequence, indicia of said first and second sets of image data bytes to the first and second input channels of said multiplier, respectively, to generate in said accumulator respective coefficients of the cross-correlation function of said new pattern with said reference pattern; and means for generating said control signals to said adjustment means in accordance with said cross-correlation function.

10. The system of claim 9, wherein said means for generating control signals comprises:

means for identifying a maximum value in said cross-correlation function; and means for generating said control signals in accordance with the deviation of said maximum from the center of said cross-correlation function.

11. The system of claim 9, wherein said means for generating control signals comprises:

means for identifying a dominant peak surrounded by a generally symmetrical shape in said cross-correlation function; and means, responsive to indicia of said dominant peak, for generating said control signals to said adjustment means.

12. The system of claim 9, wherein said means for selectively applying, in predetermined sequence, indicia of said first and second sets of image data bytes to said multiplier includes:

subtraction means, operationally interposed in at least one input channel of said multiplier, for subtracting an offset value from each data byte applied to said input channel in sequence.

13. The system of claim 12, further comprising:

means for determining the mean value of said data bytes and applying indicia of said mean value to said subtraction means as said offset value.

14. The system of claim 9, wherein:

said means for storing indicia of a new pattern comprises a first random access memory (RAM);

said means for storing indicia of a reference pattern comprises a second RAM; and said means for selectively applying indicia of said first and second sets of image data bytes comprises:

a first presettable address generator, responsive to clock signals applied thereto, for effecting access to particular locations in said first RAM;

a second presettable address generator, responsive to clock signals applied thereto, for effecting access to particular locations in said second RAM; and means for selectively presetting said address generators, such that said address generators, responsive to said clock signals, effect access to shifted sequences of said image data bytes for application to said multiplier input channels.

15. The system of claim 9 wherein said means for generating image data byte comprises:

means for generating an analog signal indicative of said image;

converter means, responsive to a clock signal applied thereto, for sampling and converting said analog signal in accordance with said clock signal;

means, responsive to signals indicative of a nominal beginning of said machine operation cycle and signals indicative of incremental advancement of said cycle, for generating gating signals indicative of a portion of said machine operation cycle;

means, responsive to said gating signal for generating, during said portion of said machine cycle, a high-resolution signal having a frequency corresponding to a desired resolution;

a multiplexer for selectively providing said incremental advancement signal or said high-resolution signal as said clock signal to said converter means.

16. A system for relating a cyclical operation of a device to images on a moving web, said device having associated therewith adjustment means, responsive to control signals applied thereto, for varying the relationship of said operation to said web, said system comprising:

means for generating image data bytes indicative of said images in relation to cycles of said machine operation;

means, responsive to a first set of said image data bytes comprising indicia of a reference pattern corresponding to a first device cycle and to a second set of image data bytes comprising indicia of a new pattern corresponding to a successive device cycle, for generating indicia of a sequence of coefficients, said sequence representing the cross-correlation of the new pattern with the reference pattern;

means for identifying a dominant peak surrounded by a generally symmetrical shape in said cross-correlation; and means, responsive to indicia of said dominant peak, for generating said control signals to said adjustment means.

17. A method for relating a cyclical machine operation to images on a moving web, said operation having associated therewith adjustment means, responsive to control signals applied thereto, for varying the relationship of said operation to said web, said method comprising the steps of:

(a) generating sequential data bytes indicative of said image, said data bytes corresponding to incremental advancements in said machine operation cycle;

(b) storing a set of bytes, including at least one byte corresponding to each incremental advancement in said machine operation cycle, in predetermined sequential locations in a first random access memory (RAM), as a new pattern array, indicative of a new pattern;

(c) determining whether or not a locked condition exists, said locked condition being indicative of the establishment of an acceptable reference pattern in a second RAM;

(d) if said locked condition does not exist, selectively establishing said reference pattern array in said second RAM, and effecting said locked condition, step (d) comprising the steps of:

copying said new pattern array into a first set of sequential locations in said second RAM;

copying a beginning portion of said new pattern array into sequential locations in said second RAM immediately following said first set of sequential locations;

copying an end portion of said new pattern array into sequential locations in said second RAM just preceding said first set of sequential locations in said second RAM;

(e) if said locked condition does exist, generating successive coefficient indicia corresponding to the sum of products of associated elements of said new pattern array and said reference pattern array, as the arrays are incrementally shifted in position relative to each other, to generate indicia of the cross-correlation function of said new pattern and said reference pattern, said step (e) comprising the steps of:

(i) addressing the first location of said new pattern array;

(ii) addressing an initial location of said reference pattern array;

(iii) applying indicia of the contents of the addressed locations of said new pattern array and said reference array as respective inputs to a digital multiplier to generate product indicia;

(iv) applying said product indicia to an accumulator to generate indicia of a cumulative sum of products;

(v) addressing the next successive locations in said new pattern array and in said reference pattern array;

(vi) repeating steps (e)(i) through (e)(v) a number of iterations corresponding to the number of locations in said new pattern array;

(f) generating said control signals to said adjustment means in accordance with said cross-correlation function.

18. The method of claim 17 further comprising the steps of:

determining the mean value of said cross-correlation function; and step (e)(iii) comprises subtracting said mean value from the contents of the addressed location of said new pattern array, and applying as said indicia of said addressed location of said new pattern array, indicia of said difference to said digital multiplier.

19. The method of claim 17 wherein step (f) includes the step of:

testing said cross-correlation function against predetermined criteria, and generating said control signals only upon a favorable test.

20. The method of claim 17 further comprising the steps of:

establishing a variance value relation to said reference pattern array; and said step (f) comprises:

determining at least one extrema of said cross-correlation function;

testing said extrema against said variance value; and generating said control signals only upon a favorable test.

21. The method of claim 20 wherein said establishing a variance value step comprises determining the maximum value of the auto-correlation function of said new pattern array.

22. The method of claim 20 wherein said testing step comprises the step of comparing a minimum of said cross-correlation function with said variance value, said test being favorable if said minimum is not greater than said variance value.

23. The method of claim 22 wherein said testing step further comprises the steps of:

determining the percentage difference between said variance value and the maximum of said cross-correlation function; and comparing said percentage difference against a predetermined value, said test being favorable if said percentage difference is at least equal to said predetermined value.

24. The method of claim 17 wherein step (f) includes the steps of testing the symmetry of said cross-correlation function and generating said control signals only upon a favorable test.

25. The method of claim 17 wherein step (f) includes the steps of:

generating indicia of the relative position of the maximum of said cross-correlation function;

generating indicia of a first calculated value corresponding to the values of the coefficients of said cross-correlation function positioned to a first side of said maximum in said cross-correlation function;

generating indicia of a second calculated value corresponding to the sum of the values of the coefficients of said cross-correlation function positioned to the other side of said maximum in said cross-correlation function;

comparing the difference between said first and second calculated values to a predetermined value; and generating said control signals only upon a favorable comparison.

26. The method of claim 17 wherein:

step (a) includes the steps of:

generating an analog signal indicative of said image;

multiplying said signal by a gain factor to generate a gain adjusted signal; and periodically sampling and converting said gain adjusted signal at a rate in accordance with incremental advancement of said machine operation to generate said data bytes;

and step (d) comprises:

determining if a gain factor has been established; and if said gain factor has not been established, establishing a gain factor to maintain the amplitude of said gain adjusted signal within a predetermined range.

27. The method of claim 26 wherein said establishing a gain factor step comprises the steps of:

initially setting said gain factor to a predetermined minimum value and an adjustment value to a predetermined maximum value;

thereafter determining the extrema values of said new pattern array;

comparing a first extrema with a first predetermined value, and a second extrema with a second predetermined value and upon a non-favorable comparison:

decreasing said gain factor by an amount corresponding to said adjustment value, and varying said adjustment value;

and upon a favorable comparison:

comparing said first extrema to a third predetermined value and said second extrema to a fourth predetermined value, and in response to an unfavorable comparison, increasing said gain factor by an amount corresponding to said adjustment value, and varying said adjustment value.

28. The method of claim 27 wherein said first predetermined value is zero, said second predetermined value is 3F hexidecimal, said third value is 6 hexidecimal and said fourth value is 3A hexidecimal.

29. The method of claim 17 wherein:

step (a) includes the steps of:

generating an analog signal indicative of said image;

multiplying the amplitude of said signal by a gain factor to generate a gain adjusted signal; and periodically sampling and converting said gain adjusted signal at a rate in accordance with incremental advancement of said machine operation to generate said data bytes;

and said method further comprises the step of selectively varying said sampling rate during said machine operation.

30. A method for controlling a cyclical operation upon a moving web, comprising the steps of:

generating images on said moving web;

cyclically effecting said operation upon said web;

selectively advancing or retarding said web relative to said device;

generating signals representative of the image on said web;

generating respective data bytes indicative of the image signal associated with increments of said device operational cycle;

storing, as indicia of a reference pattern, a set of data bytes corresponding to a first device operation cycle;

storing, as indicia of a new pattern, a set of bytes corresponding to a successive device operation cycle;

determining the mean value of said data bytes corresponding to said first device operation cycle and subtracting said mean value from each of said bytes corresponding to said first device operation cycle to generate a normalized reference pattern indicia;

determining the mean value of said set of data bytes corresponding to said successive device operation cycle and subtracting said mean value from each of said data bytes corresponding to said successive device operation cycle to generate a normalized new pattern indicia;

generating said control signals to said adjustment means to selectively advance or retard said web relative to said device in accordance with differences between said normalized new pattern indicia and said normalized reference pattern indicia.

31. A method for relating a cyclical machine operation to a repetitive image on a moving web, said operation having associated therewith adjustment means, responsive to control signals applied thereto, for varying the relationship of said operation to said web, said method comprising the steps of:

generating an analog signal indicative of said image;

multiplying said signal by a gain factor to generate a gain adjusted signal;

adaptively establishing said gain factor to maintain the amplitude of said gain adjusted signal within a predetermined range;

periodically sampling and converting said gain adjusted signal at a rate in accordance with incremental advancement of said machine operation to generate sequential data bytes indicative of said image at incremental advancements in said machine operation cycle;

storing, as indicia of a reference pattern, a first set of data bytes corresponding to a successive machine cycle;

storing, as indicia of a new pattern, a second set of sequential data bytes;

generating control signals to said adjustment means in accordance with differences between said new pattern indicia and said reference pattern indicia.

32. The method of claim 31, wherein said step of generating control signals comprises the steps of:

generating indicia of respective coefficients of the cross correlation function of said new pattern with said reference pattern; and generating control signals to said adjustment means in accordance with said cross correlation function.

33. The method of claim 31, wherein said step of establishing said gain factor comprises:

initially setting said gain factor to a predetermined minimum value and an adjustment value to a predetermined maximum value;

thereafter determining the extrema values of said new pattern array;

comparing a first extrema with a first predetermined value, and a second extrema with a second predetermined value and upon a non-favorable comparison:

decreasing said gain factor by an amount corresponding to said adjustment value, and varying said adjustment value;

and upon a favorable comparison:

comparing said first extrema to a third predetermined value and said second extrema to a fourth predetermined value, and in response to an unfavorable comparison, increasing said gain factor by an amount corresponding to said adjustment value, and varying said adjustment value.

* * * * *